(12) United States Patent
Yan et al.

(10) Patent No.: US 11,827,743 B2
(45) Date of Patent: Nov. 28, 2023

(54) POLYMERS HAVING STABLE CATIONIC PENDANT GROUPS FOR USE AS ANION EXCHANGE MEMBRANES

(71) Applicant: University of Delaware, Newark, DE (US)

(72) Inventors: Yushan Yan, Newark, DE (US); Keda Hu, Newark, DE (US); Junhua Wang, Newark, DE (US); Lan Wang, Newark, DE (US); Santiago Rojas-Carbonell, Newark, DE (US); Brian Setzler, Newark, DE (US)

(73) Assignee: University of Delaware, Newark, DE (US)

( * ) Notice: Subject to any disclaimer, the term of this patent is extended or adjusted under 35 U.S.C. 154(b) by 660 days.

(21) Appl. No.: 16/833,312

(22) Filed: Mar. 27, 2020

(65) Prior Publication Data

US 2020/0308341 A1 Oct. 1, 2020

Related U.S. Application Data

(60) Provisional application No. 62/825,551, filed on Mar. 28, 2019.

(51) Int. Cl.
*C08G 61/02* (2006.01)
*C08J 5/22* (2006.01)
(Continued)

(52) U.S. Cl.
CPC ............ *C08G 61/02* (2013.01); *C08G 65/263* (2013.01); *C08J 5/2243* (2013.01); *B01J 41/13* (2017.01);
(Continued)

(58) Field of Classification Search
CPC ...... C08G 61/02; C08G 65/263; C08G 10/00; C08G 2261/124; C08G 2261/146;
(Continued)

(56) References Cited

U.S. PATENT DOCUMENTS 3,480,626 A 11/1969 Pfleger et al.
5,393,432 A 2/1995 Tsuyumoto et al.
(Continued)

FOREIGN PATENT DOCUMENTS

CN 104829814 A 8/2015
CN 109320692 A 2/2019
(Continued)

OTHER PUBLICATIONS

Zolotukhin, Mikhail, et al., "Remarkable enhancement of reactivity of carbonyl compounds for polymerizations with hon-activated aromatic hydrocarbons," Chem. Commun., 2004, pp. 1030-1031, DOI: 10.1039/b317108f, published online on Mar. 25, 2004 (2 pages).

(Continued)

*Primary Examiner* — Shane Fang
(74) *Attorney, Agent, or Firm* — Lewis Rice LLC

(57) ABSTRACT

Poly(aryl alkylene) polymers or poly(aryl-crown ether-alkylene) polymers with pendant cationic groups are provided which have an alkaline-stable cation, such as imidazolium, introduced into a rigid aromatic polymer backbone free of ether bonds. Hydroxide exchange membranes or hydroxide exchange ionomers formed from these polymers exhibit superior chemical stability, hydroxide conductivity, decreased water uptake, good solubility in selected solvents, and improved mechanical properties in an ambient dry state as compared to conventional hydroxide exchange membranes or ionomers. Hydroxide exchange membrane fuel cells and hydroxide exchange membrane electrolyzers com-
(Continued)

prising the poly(aryl alkylene) polymers or poly(aryl-crown ether-alkylene) polymers with pendant cationic groups exhibit enhanced performance and durability at relatively high temperatures.

52 Claims, 14 Drawing Sheets

(51) Int. Cl.
  C08G 65/26 (2006.01)
  B01J 41/13 (2017.01)
(52) U.S. Cl.
  CPC . C08G 2261/146 (2013.01); C08G 2261/149 (2013.01); C08G 2261/312 (2013.01); C08G 2261/598 (2013.01); C08G 2261/62 (2013.01); C08G 2261/74 (2013.01); C08G 2261/90 (2013.01); C08G 2650/64 (2013.01); C08J 2365/00 (2013.01); C08J 2371/00 (2013.01)
(58) Field of Classification Search
  CPC .......... C08G 2261/20; C08G 2261/312; C08G 2261/332; C08G 2261/45; C08J 5/2243; A01N 29/00; C09D 5/14; C09D 165/00; C25B 13/08; H01M 8/1004; H01M 8/1039; H01M 8/1072; Y02P 70/50
  See application file for complete search history.

(56) References Cited

U.S. PATENT DOCUMENTS

| | | | |
|---|---|---|---|
| 5,869,655 | A | 2/1999 | Puckett et al. |
| 9,580,824 | B2 | 2/2017 | Masel et al. |
| 10,046,319 | B2 | 8/2018 | Meier-Haack |
| 10,435,504 | B2 | 10/2019 | Bae et al. |
| 2017/0203289 | A1 | 7/2017 | Bae et al. |
| 2017/0252707 | A1 | 9/2017 | Bahar et al. |
| 2017/0355811 | A1 | 12/2017 | Bae et al. |
| 2019/0036143 | A1 | 1/2019 | Yan et al. |

FOREIGN PATENT DOCUMENTS

| | | | | |
|---|---|---|---|---|
| CN | 109384908 | * | 2/2019 | ............ C08G 61/02 |
| JP | 2012033367 | A | 2/2012 | |
| JP | 2012049111 | A | 3/2012 | |
| WO | 2010055889 | A1 | 5/2010 | |
| WO | 2016/014636 | A1 | 1/2016 | |
| WO | 2016081432 | A1 | 5/2016 | |
| WO | 2016168468 | A2 | 10/2016 | |
| WO | 2017172824 | A1 | 10/2017 | |

OTHER PUBLICATIONS

Diaz, Adan M., "A Novel, One-Pot Synthesis of Novel 3F, 5F, and 8F Aromatic Polymers," Macromolecular Journals, Macromol. Rapid Commun. 2007, 28, pp. 183-187, 2007 Wiley-VCH Verlag GmbH & Co. KGaA, Weinheim, DOI: 10.1002/marc.200600656 (5 pages).
Guzman-Gutierrez, M.T., et al., "Synthesis and gas transport properties of new aromatic 3F polymers," Journal of Membrane Science 323 (2008), pp. 379-385, published online on Jun. 24, 2008 (7 pages).
Wang, Junhua, et al., "Stabilizing the Imidazolium Cation in Hydroxide-Exchange Membranes for Fuel Cells," ChemSusChem 2013, 6, pp. 2079-2082, Wiley Online Library, 2013 Wiley-VCH Verlag GmbH & Co. KGaA Weinheim, DOI: 10.1002/cssc.201300285, published online on Aug. 22, 2013 (4 pages).
Olvera, Lilian I., et al., "Novel High Molecular Weight Aromatic Fluorinated Polymers from One-Pot, Metal-Free Step Polymerizations," American Chemical Society, ACS Publications, Macromolecules 2013, 46, pp. 7245-7256, dx.doi.org/10.1021/ma401306s, published on Sep. 12, 2013 (12 pages).
Gu, Fenglou, et al., "Highly Stable N3-Substituted Imidazolium-Based Alkaline Anion Exchange Membranes: Experimental Studies and Theoretical Calculations," American Chemical Society, ACS Publications, Macromolecules 2014, 47, pp. 208-216, dx.doi.org/1001021/ma402334t, published on Dec. 19, 2013 (9 pages).
Hugar, Kristina M., et al., "Imidazolium Cations with Exceptional Alkaline Stability: A Systematic Study of Structure-Stability Relationships," ACS Publications, J. Am. Chem. Soc. 2015, 137, pp. 8730-8737, DOI: 10.1021/jacs.5b02879, published on Jun. 11, 2015 (8 pages).
Lee, Woo-Hyung, et al., "Robust Hydroxide Ion Conducting Poly(biphenyl alkylene)s for Alkaline Fuel Cell Membranes," American Chemical Society, ACS Publications, ACS Macro Letters 2015, 4, pp. 814-818, DOI: 10.1021/acsmacrolett.5b00375, pubs.acs.org/macroletters, published on Jul. 16, 2015 (5 pages).
Lee, Woo-Hyung, et al., "Poly(terphenylene) Anion Exchange Membranes: The Effect of Backbone Structure on Morphology and Membrane Property," American Chemical Society, ACS Publications, ACS Macro Letters 2017, 6, pp. 566-570, DOI: 10.1021/acsmacrolett.7b00148, pubs.acs.org/macroletters, published May 5, 2017 (5 pages).
Park, Eun Joo, et al., "Chemically durable polymer electrolytes for solid-state alkaline water electrolysis," Journal of Power Sources (2017), Elsevier B.V., http://dx.doi.org/10.1016/j.jpowersour.2017.07.090, accepted online on Jul. 24, 2017 (6 pages).
International Search Report issued for PCT/US2017/024615 dated Aug. 28, 2017, 4 pages.
Written Opinion issued for PCT/US2017/024615 dated Aug. 28, 2017, 5 pages.
Extended European Search Report for EP 17776496 dated Jul. 4, 2019, 7 pages.
Hansen, K.-A., et al., "Nitroxide Radical Polymers—A Versatile Material Class for High-Tech Applications," Polymer Chemistry, 2018, pp. 1479-1516, vol. 9.
Olsson, J. S., et al., "Functionalizing Polystyrene with N-Alicyclic Piperdine-Based Cations via Friedel-Crafts Alkylation for Highly Alkali-Stable Anion-Exchange Membranes," Macromolecules, 2020, pp. 4722-4732, vol. 53.
Extended European Search Report, European Patent Application No. 18863766.4, dated Jan. 14, 2022 (8 pages).
Dang, H.-S., et al., "A Comparative Study of Anion-Exchange Membranes Tethered With Different Heterocycloaliphatic Quaternary Ammonium Hydroxides," Journal of Materials Chemistry A, Oct. 2, 2017, pp. 21965-21978, vol. 5.
Jang, H., et al., "Preparation and Characterization of Tetra-Imidazolium Hydroxide Polyphenylene Membranes via Nickel Catalyzed C-C Coupling Polymerization," Energies, Apr. 6, 2016, pp. 1-10, vol. 9.
International Search Report and Written Opinion issued for Application No. PCT/US2020/025337, dated Jul. 31, 2020, 12 pages.
U.S. Appl. No. 16/651,622, filed Mar. 27, 2020.
U.S. Appl. No. 16/146,887, filed Sep. 28, 2018, now U.S. Pat. No. 10,290,890.
Supplementary European Search Report and Opinion dated Nov. 28, 2022, 13 Pages.
Sun, Zhe, et al .,"Anion-Exchange Membranes for Alkaline Fuel-Cell Applications: The Effects of Cations", Chemsuschem, 2018, vol. 11, pp. 58-70.
Warshawsky, A., et al., "Soluble, polymeric condensate of dibenzo-18-crown-6 and formaldehyde; synthesis, characterization and absorption of anionic copolymers", Reactive Polymers, 1990, vol. 12, pp. 261-268.

* cited by examiner

POLYMERS HAVING STABLE CATIONIC PENDANT GROUPS FOR USE AS ANION EXCHANGE MEMBRANES

CROSS REFERENCE TO RELATED APPLICATIONS

This application claims the benefit of U.S. Provisional Patent Application No. 62/825,551 filed Mar. 28, 2019. The entire contents of the above application is hereby incorporated by reference.

GOVERNMENT LICENSE RIGHTS

This invention was partly made with Government support under grant DE-AR0000814 awarded by Advanced Research Projects Agency—Energy of the United States Department of Energy. The Government has certain rights in the invention.

FIELD OF THE INVENTION

Anion exchange polymers capable of forming anion-exchange membranes (AEMs) and ionomers (AEIs) are provided for use in anion exchange membrane fuel cells (AEMFCs). More specifically, hydroxide exchange polymers are provided which are capable of forming hydroxide-exchange membranes (HEMs), and ionomers (HEIs) for use in various applications such as hydroxide exchange membrane fuel cells (HEMFCs) and hydroxide exchange membrane electrolyzers (HEMEL).

BACKGROUND OF THE INVENTION

Proton exchange membrane fuel cells (PEMFCs) are considered to be clean and efficient power sources. Steele et al., Nature 2001, 414, 345. However, the high cost and unsatisfactory durability of catalysts are major barriers for large-scale commercialization of PEMFCs. Borup et al., Chem Rev 2007, 107, 3904. By switching the polymer electrolyte from an "acidic" condition to a "basic" one, HEMFCs are able to work with non-precious metal catalysts and the catalysts are expected to be more durable. Other cheaper fuel cell components are also possible such as metal bipolar plates. Varcoe, et al., Fuel Cells 2005, 5, 187; Gu et al., Angew Chem Int Edit 2009, 48, 6499; Gu et al., Chem Commun 2013, 49, 131. However, currently available HEMs and HEIs exhibit low alkaline/chemical stability, low hydroxide conductivity, high water uptake, and low mechanical integrity under dry conditions, especially after wet-dry cycles.

The biggest challenge for HEMs/HEIs at present is achieving a high chemical stability at desired operation temperatures of 80° C. or more, and ideally 95° C. or more (e.g., in the presence of nucleophilic hydroxide ions). Varcoe et al., Energ Environ Sci 2014, 7, 3135. The most commonly encountered cationic functional groups (e.g., benzyl trimethyl ammonium and alkyl chain ammonium) can undergo a number of degradation processes in the presence of hydroxide ions nucleophiles by direct nucleophilic substitution and Hofmann elimination. Moreover, the polymer backbone of most base polymers for HEM/HEI applications (e.g., polysulfone and poly(phenylene oxide)) unavoidably contains ether linkages along the backbone, which makes the HEMs/HEIs potentially labile under high pH conditions. Lee et al., Acs Macro Lett 2015, 4, 453; Lee et al., Acs Macro Lett 2015, 4, 814. The strongly nucleophilic hydroxide ions attack these weak bonds and degrade the polymer backbone. Thus, alternative cationic groups, organic tethers, and polymer backbones are needed to enhance chemical stability of HEMs/HEIs.

Another concern regarding current HEMs/HEIs is their hydroxide conductivity. In comparison to Nafion, HEMs have intrinsically lower ionic conductivities under similar conditions, because the mobility of OH· is lower than that of H+. Hibbs et al., Chem Mater 2008, 20, 2566. Greater ion-exchange capacity (IEC) is needed for HEMs/HEIs to achieve greater hydroxide conductivity. However, high IEC usually leads to a membrane having high water uptake (i.e., a high swelling ratio), decreasing the morphological stability and mechanical strength of the membrane, especially after repeated wet-dry cycles. This highly swollen state when wet is a major reason for decreased flexibility and brittleness of HEMs when dry. The removal of the trade-off between high hydroxide conductivity and low water uptake has been a major setback in designing high-performance HEMs/HEIs. Pan et al., Energ Environ Sci 2013, 6, 2912. Chemical cross-linking, physical reinforcement, side-chain polymerization, and block-copolymer architecture have been tried to reduce water uptake while maintaining acceptable hydroxide conductivity, but these techniques bring challenging problems, e.g., reduced mechanical flexibility, decreased alkaline stability, and/or increased cost. Gu et al., Chem Commun 2011, 47, 2856; Park et al., Electrochem Solid St 2012, 15, B27; Wang et al., Chemsuschem 2015, 8, 4229; Ran et al., Sci Rep-Uk 2014, 4; Tanaka et al., J Am Chem Soc 2011, 133, 10646. Additionally, almost all side-chain or block-copolymer HEMs are based on flexible aliphatic polymer chains due to limited available synthesis methods. As a result, the membranes still cannot provide morphological stability (low swell ratio) at high IECs and high temperature. Wang et al., Chemsuschem 2015, 8, 4229; Ran et al., Sci Rep-Uk 2014, 4; Marino et al., Chemsuschem 2015, 8, 513; Li et al, M. Macromolecules 2015, 48, 6523.

An additional obstacle to using HEMs is achievement of mechanical flexibility and strength in an ambient dry state. Most HEMs exhibit low mechanical strength and are very brittle in a completely dry state especially after being completely swollen. It is difficult to obtain and handle thin membranes that are large in size as needed for commercial use of HEMs. Without good mechanical properties, the ionomers cannot form and keep an adequate triple phase structure in the fuel cell electrode at high temperature, such as at or above 80° C. Li et al., J Am Chem Soc 2013, 135, 10124.

Another highly desirable feature of an HEI is that the polymer be soluble in a mixture of lower boiling alcohol and water but insoluble in pure alcohol or water so that the HEIs can be readily incorporated into an electrode catalyst layer yet not be dissolved away by water or alcohol.

PEMFCs have recently been deployed as zero-emission power sources in commercially sold automobiles, with demonstrated long driving range and short refuelling time, which are two features preferred for customer acceptance. However, PEMFCs use platinum electrocatalysts and are not yet cost competitive with gasoline engines. Major approaches to PEMFC cost reduction include development of low-platinum-loading, high power density membrane electrode assemblies (MEAs), and platinum-group-metal-free (PGM-free) cathode catalysts. A fundamentally different pathway to low cost fuel cells is to switch from PEMFCs to hydroxide exchange membrane fuel cells (HEMFCs) that, due to their basic operating environment, can work with PGM-free anode and cathode catalysts, and thus are potentially economically viable. To replace PEMFCs, however, HEMFCs have to provide a performance that matches PEMFC's, performance which in turn requires highly active anode and cathode catalysts as well as the highly chemically stable, ionically conductive, and mechanically robust hydroxide exchange membranes (HEMs)/hydroxide exchange ionomers (HEIs) to build an efficient triple phase boundary and thus drastically improve the utilization of the catalyst particles and reduce the internal resistance.

HEMs/HEIs are typically composed of organic cations tethered on a polymer backbone, with OH— being the balancing anion. A chemically stable HEM/HEI requires a stable organic cation and a stable polymer backbone. These hydroxide conductive organic cations have been obtained by introducing quaternary ammonium, imidazolium, guanidinium, phosphonium, sulfonium, ruthenium and cobaltocenium using chloromethylation of aromatic rings or bromination on the benzylic methyl groups of the polymers. Various polymer backbone structures· poly(olefins), poly(styrenes) poly(phenylene oxides), poly(phenylenes), poly(arylene ethers) · have been investigated recently. So far, most of HEMs/HEIs based on traditional cation groups (such as benzyl trimethyl ammonium) and aromatic polymer backbones (such as polysulfone) have low alkaline/chemical stability, low hydroxide conductivity, high water uptake, and poor mechanical properties when dry.

Polymer backbones with ether linkages are generally vulnerable in alkaline medium and thus HEM/HEI having ether-free polymers backbones are highly desirable. Acid catalyzed hydroxylation reactions have been demonstrated to efficiently produce ether-free polymers backbones, and HEM/HEI with such backbones have proven to have good alkaline stability and mechanical properties. Zolotukhin et al. Chem. Comm. 2004, 1030. Diaz et al. Macromol. Rapid Commun. 2007, 28, 183. Lee et al. ACS Macro Lett. 2015, 4, 814. Bae et al. U.S. patent application Ser. No. 15/527, 967.

To further enhance the alkaline stability of HEM/HEI under both high temperature and low relative humidity, cations other than the conventional ammonium cations are highly needed. Imidazolium cations, when properly substituted, have shown improved alkaline stability. Gu et al. Macromolecules, 2014, 47, 208. Wang et al. ChemSusChem 2013, 6, 2079. Hugar et al. J. Am. Chem. Soc. 2015, 137, 8730.

SUMMARY OF THE INVENTION

A polymer is provided which comprises structural units of Formulae (1A); (3A) or (3'A); and optionally (4A), wherein the structural units of Formulae (1A), (3A), (3'A) and (4A) have the structures:

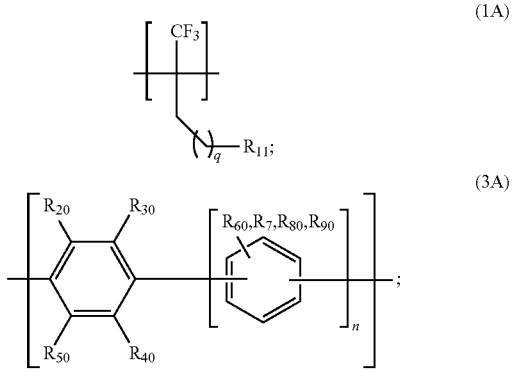

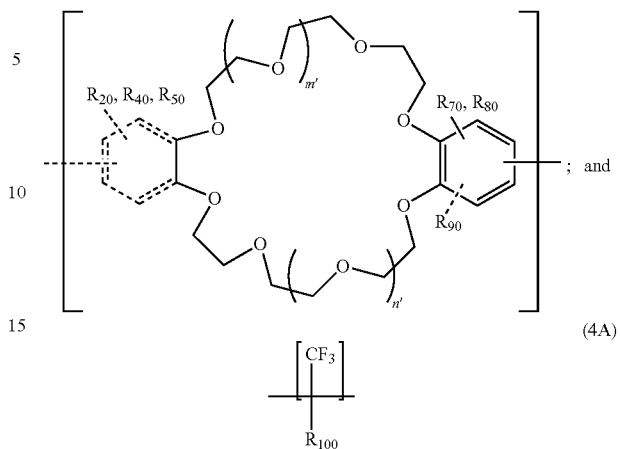

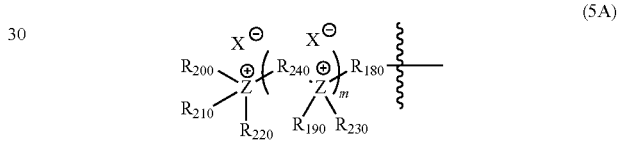

wherein:

$R_{11}$ are each independently a quaternary ammonium or phosphonium group or a nitrogen-containing heterocyclic group or a salt thereof, the quaternary ammonium or phosphonium group having the formula (5A):

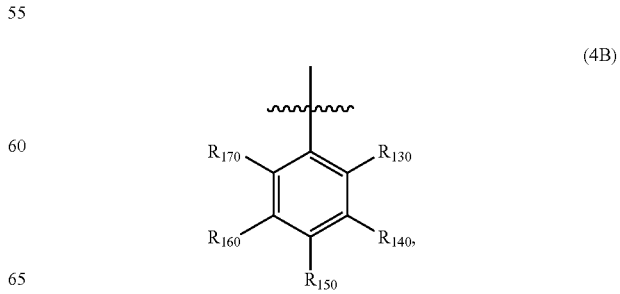

and the nitrogen-containing heterocyclic group being an optionally substituted pyrrole, pyrroline, pyrazole, pyrazoline, imidazole, imidazoline, triazole, pyridine, triazine, pyrazine, pyridazine, pyrimidine, azepine, quinoline, piperidine, pyrrolidine, pyrazolidine, imidazolidine, azepane, isoxazole, isoxazoline, oxazole, oxazoline, oxadiazole, oxatriazole, dioxazole, oxazine, oxadiazine, isoxazolidine, morpholine, thiazole, isothiazole, oxathiazole, oxathiazine, or caprolactam, wherein each substituent is independently alkyl, alkenyl, alkynyl, aryl, or aralkyl;

$R_{20}$, $R_{30}$, $R_{40}$, $R_{50}$, $R_{60}$, $R_{70}$, $R_{80}$, $R_{90}$, $R_{130}$, $R_{140}$, $R_{150}$, $R_{160}$, and $R_{170}$ are each independently hydrogen, halide, alkyl, alkenyl, alkynyl or aryl, and the alkyl, alkenyl, alkynyl or aryl are optionally substituted with halide, and wherein $R_{30}$ and $R_{60}$ are optionally linked to form a five membered ring optionally substituted with halide or alkyl;

each $R_{100}$ is independently alkyl, alkenyl, alkynyl, or a substituent having formula (4B):

and the alkyl, alkenyl, or alkynyl are optionally substituted with fluoride;

$R_{180}$ and $R_{240}$ are each independently alkylene;

$R_{190}$, $R_{200}$, $R_{210}$, $R_{220}$, and $R_{230}$ are each independently alkyl, alkenyl, or alkynyl;

q is 0, 1, 2, 3, 4, 5, 6, 7, 8, 9, 10, 11, 12, 13, 14, 15, 16, 17, 18, 19, or 20;

m is 0, 1, 2, 3, 4, 5 or 6;

n is 0, 1, 2 or 3;

each m' and each n' is independently 0, 1 or 2;

$X^-$ is an anion; and

Z is P when the structural unit of formula (3A) is present in the polymer but the structural unit of formula (3'A) is not present in the polymer, and Z is N or P when the structural unit of formula (3'A) is present in the polymer.

Also provided is a polymer comprising a reaction product of a polymerization mixture comprising:

(i) a cation-functionalized trifluoroketone monomer having the formula:

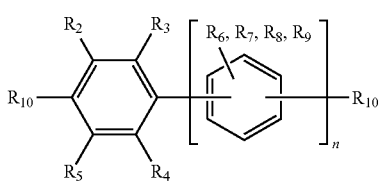

(1)

(ii) an aromatic monomer having the formula:

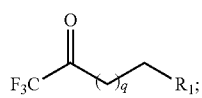

(3)

or a crown ether monomer having the formula:

(3')

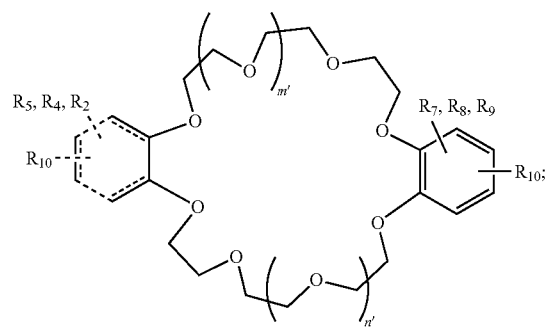

and (iii) optionally, a trifluoromethyl ketone monomer having the formula:

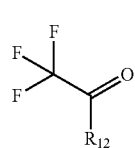

(4)

wherein:

$R_1$ are each independently a quaternary ammonium or phosphonium group or a nitrogen-containing heterocyclic group or a salt thereof, the quaternary ammonium or phosphonium group having the formula (5A):

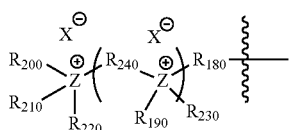

(5A)

and the nitrogen-containing heterocyclic group being an optionally substituted pyrrole, pyrroline, pyrazole, pyrazoline, imidazole, imidazoline, triazole, pyridine, triazine, pyrazine, pyridazine, pyrimidine, azepine, quinoline, piperidine, pyrrolidine, pyrazolidine, imidazolidine, azepane, isoxazole, isoxazoline, oxazole, oxazoline, oxadiazole, oxatriazole, dioxazole, oxazine, oxadiazine, isoxazolidine, morpholine, thiazole, isothiazole, oxathiazole, oxathiazine, or caprolactam, wherein each substituent is independently alkyl, alkenyl, alkynyl, aryl, or aralkyl;

$R_2$, $R_3$, $R_4$, $R_5$, $R_6$, $R_7$, $R_8$, $R_9$, $R_{10}$, $R_{13}$, $R_{14}$, $R_{15}$, $R_{16}$, and $R_{17}$ are each independently hydrogen, halide, alkyl, alkenyl, alkynyl or aryl, and the alkyl, alkenyl, alkynyl or aryl are optionally substituted with halide, and wherein $R_3$ and $R_6$ are optionally linked to form a five membered ring optionally substituted with halide or alkyl;

each $R_{12}$ is independently alkyl, alkenyl, alkynyl, or a substituent of formula (4C):

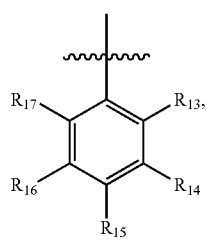

(4C)

and the alkyl, alkenyl, or alkynyl are optionally substituted with fluoride;

$R_{180}$ and $R_{240}$ are each independently alkylene;

$R_{190}$, $R_{200}$, $R_{210}$, $R_{220}$, and $R_{230}$ are each independently alkyl, alkenyl, or alkynyl;

m is 0, 1, 2, 3, 4, 5 or 6;

n is 0, 1, 2 or 3;

each m' and each n' is independently 0, 1 or 2;

q is 0, 1, 2, 3, 4, 5, 6, 7, 8, 9, 10, 11, 12, 13, 14, 15, 16, 17, 18, 19, or 20;

X⁻ is an anion; and

Z is P when the aromatic monomer of formula (3) is present in the polymerization mixture but the crown ether monomer of formula (3') is not present in the polymerization mixture, and Z is N or P when the crown ether monomer of formula (3') is present in the polymerization mixture.

Another polymer is provided which comprises a second reaction product of a second polymerization mixture comprising:
a quaternary ammonium or phosphonium compound or a nitrogen-containing heterocycle or a salt thereof; and
an intermediate polymer;
wherein:
the intermediate polymer comprises a first reaction product of a first polymerization mixture comprising:
(i) a halogenated trifluoromethyl ketone monomer having the formula:

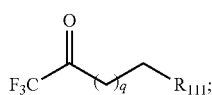

(2)

(ii) an aromatic monomer having the formula (3) as shown above, or a crown ether monomer having the formula (3') as shown above; and
(iii) optionally, a trifluoromethyl ketone monomer having the formula (4) as shown above, wherein:
the quaternary phosphonium compound has the formula (5):

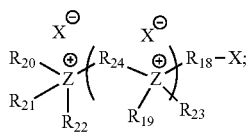

(5)

the nitrogen-containing heterocycle, m', n', n, q, $R_2$, $R_3$, $R_4$, $R_5$, $R_6$, $R_7$, $R_8$, $R_9$, $R_{10}$, $R_{12}$, $R_{13}$, $R_{14}$, $R_{15}$, $R_{16}$, and $R_{17}$ are as described above;

$R_{18}$ and $R_{24}$ are each independently alkylene;

$R_{19}$, $R_{20}$, $R_{21}$, $R_{22}$, and $R_{23}$ are each independently alkyl, alkenyl, or alkynyl;

$R_{111}$ is a halide;

m is 0, 1, 2, 3, 4, 5 or 6;

X– is an anion; and

Z is P when the aromatic monomer of formula (3) is present in the first polymerization mixture but the crown ether monomer of formula (3') is not present in the first polymerization mixture, and Z is N or P when the crown ether monomer of formula (3') is present in the first polymerization mixture.

An anion exchange polymer is also provided, which comprises a reaction product of a base and any one of the polymers as described above.

A method of making an anion exchange polymer membrane comprising the anion exchange polymer is also provided. The method comprises:
reacting the cation-functionalized trifluoroketone monomer, the optional trifluoromethyl ketone monomer, and the aromatic monomer or the crown ether monomer in the presence of an organic solvent and a polymerization catalyst to form a cation-functionalized polymer;
dissolving the cation-functionalized polymer in a solvent to form a polymer solution;
casting the polymer solution to form a polymer membrane; and
exchanging anions of the polymer membrane with hydroxide, bicarbonate, or carbonate ions or a combination thereof to form the anion exchange polymer membrane.

Another method of making an anion exchange polymer membrane comprising the anion exchange polymer is provided. The method comprises:
reacting the halogenated trifluoroketone monomer, the optional trifluoromethyl ketone monomer, and the aromatic monomer in the presence of an organic solvent and a polymerization catalyst to form a halogen-functionalized polymer;
reacting the halogen-functionalized polymer with the quaternary phosphonium compound or the nitrogen-containing heterocycle or a salt thereof in the presence of an organic solvent to form a cation-functionalized polymer;
dissolving the cation-functionalized polymer in a solvent to form a polymer solution;
casting the polymer solution to form a polymer membrane; and
exchanging anions of the polymer membrane with hydroxide, bicarbonate, or carbonate ions or a combination thereof to form the anion exchange polymer membrane.

Another method of making an anion exchange polymer membrane comprising the anion exchange polymer is provided. The method comprises:
reacting the halogenated trifluoroketone monomer, the optional trifluoromethyl ketone monomer, and the crown ether monomer in the presence of an organic solvent and a polymerization catalyst to form a halogen-functionalized polymer;
reacting the halogen-functionalized polymer with the quaternary ammonium compound or quaternary phosphonium compound or the nitrogen-containing heterocycle or a salt thereof in the presence of an organic solvent to form a cation-functionalized polymer;
dissolving the cation-functionalized polymer in a solvent to form a polymer solution;
casting the polymer solution to form a polymer membrane; and
exchanging anions of the polymer membrane with hydroxide, bicarbonate, or carbonate ions or a combination thereof to form the anion exchange polymer membrane.

An anion exchange membrane is also provided, optionally configured and sized to be suitable for use in a fuel cell, electrolyzer, electrodialyzer, solar hydrogen generator, flow battery, desalinator, sensor, demineralizer, water purifier, waste water treatment system, ion exchanger, or $CO_2$ separator, and the anion exchange membrane comprising the anion exchange polymer.

An anion exchange membrane fuel cell, electrolyzer, electrodialyzer, solar hydrogen generator, flow battery, desalinator, sensor, demineralizer, water purifier, waste water treatment system, ion exchanger, or $CO_2$ separator is also provided, the fuel cell, electrolyzer, electrodialyzer, solar hydrogen generator, flow battery, desalinator, sensor, demineralizer, water purifier, waste water treatment system, ion exchanger, or $CO_2$ separator comprising the anion exchange polymer.

Also provided is a reinforced electrolyte membrane, optionally configured and sized to be suitable for use in a fuel cell, electrolyzer, electrodialyzer, solar hydrogen generator, flow battery, desalinator, sensor, demineralizer, water purifier, waste water treatment system, ion exchanger, or $CO_2$ separator. The membrane comprises a porous substrate impregnated with the anion exchange polymer.

Other objects and features will be in part apparent and in part pointed out hereinafter.

DESCRIPTION OF THE PREFERRED EMBODIMENTS

Figure 1A:
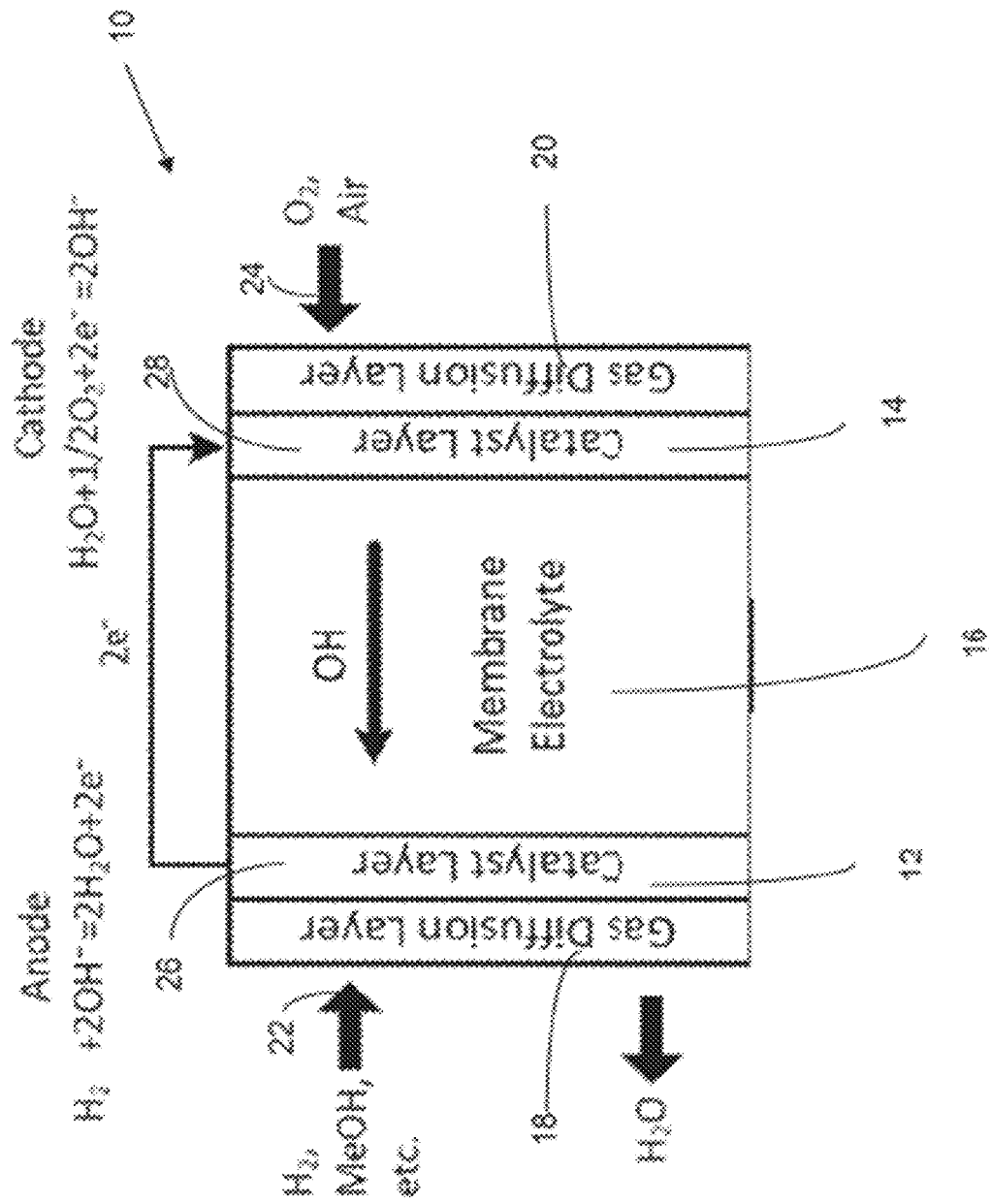
FIG. 1A illustrates an exemplary hydroxide exchange membrane fuel cell.

HEMs/HEIs formed from polymers with various pendant cationic groups and having intrinsic hydroxide conduction channels have been discovered which simultaneously provide improved chemical stability, conductivity, water uptake, good solubility in selected solvents, mechanical properties, and other attributes relevant to HEM/HEI performance. The attachment of the pendant side chains to the rigid aromatic polymer backbone of the polymer which is free of ether bonds allows fine tuning of the mechanical properties of the membrane and incorporation of alkaline stable cations, such as imidazoliums, phosphoniums and ammoniums, and provides enhanced stability to the polymer. HEMs/HEIs formed from these polymers exhibit superior chemical stability, anion conductivity, decreased water uptake, good solubility in selected solvents, and improved mechanical properties in an ambient dry state as compared to conventional HEM/HEIs. The inventive HEMFCs exhibit enhanced performance and durability at relatively high temperatures.

As a first aspect of the invention, a polymer is provided which comprises structural units of Formulae (1A); (3A) and/or (3'A); and optionally (4A).

The structural unit of Formulae (1A) has the structure:

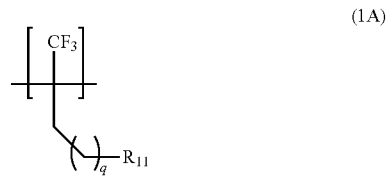

(1A)

wherein q is 0, 1, 2, 3, 4, 5, 6, 7, 8, 9, 10, 11, 12, 13, 14, 15, 16, 17, 18, 19, or 20; and $R_{11}$ are each independently a quaternary ammonium or phosphonium group or a nitrogen-containing heterocyclic group or a salt thereof.

The quaternary ammonium or phosphonium group has the formula (5A):

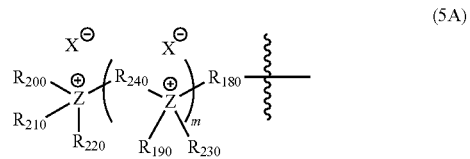

(5A)

wherein $R_{180}$ and $R_{240}$ are each independently alkylene; $R_{190}$, $R_{200}$, $R_{210}$, $R_{220}$, and $R_{230}$ are each independently alkyl, alkenyl, or alkynyl; m is 0, 1, 2, 3, 4, 5 or 6; X⁻ is an anion; and Z is P when the structural unit of formula (3A) is present in the polymer but the structural unit of formula (3'A) is not present in the polymer, and Z is N or P when the structural unit of formula (3'A) is present in the polymer. Preferably, X⁻ comprises a halide, $BF_4^-$, $PF_6^-$, $CO_3^{2-}$ or $HCO_3^-$.

For example, the quaternary ammonium or the quaternary phosphonium group of the formula (5A) can have $R_{180}$ and $R_{240}$ each independently be $C_1$-$C_{22}$ alkylene; $R_{190}$, $R_{200}$, $R_{210}$, $R_{220}$, and $R_{230}$ can each independently be $C_1$-$C_6$ alkyl; m can be 0, 1, 2, 3, 4, 5, or 6; and Z is N or P.

As another example, the quaternary ammonium or the quaternary phosphonium group of the formula (5A) can have $R_{180}$ and $R_{240}$ each independently be $C_1$-$C_6$ alkylene; $R_{190}$, $R_{200}$, $R_{210}$, $R_{220}$, and $R_{230}$ can each independently be $C_1$-$C_6$ alkyl; m can be 0, 1, 2, or 3; and Z is N or P.

As yet another example, the quaternary ammonium or the quaternary phosphonium group of the formula (5A) can have $R_{180}$ and $R_{240}$ each independently be $C_8$-$C_{22}$ alkylene; $R_{190}$, $R_{200}$, $R_{210}$, $R_{220}$, and $R_{230}$ each independently be $C_1$-$C_6$ alkyl; m be 0, 1, 2, or 3; and Z is N or P.

In other instances, the quaternary ammonium or the quaternary phosphonium group of the formula (5A) can have $R_{180}$ and $R_{240}$ each be $C_2$-$C_6$ alkylene; $R_{190}$, $R_{200}$, $R_{210}$, $R_{220}$, and $R_{230}$ each independently be methyl; m be 1; and Z is N or P.

In yet other instances, the quaternary ammonium or the quaternary phosphonium group of the formula (5A) can have $R_{180}$ and $R_{240}$ each be n-hexylene; $R_{190}$, $R_{200}$, $R_{210}$, $R_{220}$, and $R_{230}$ each be methyl; m be 1; and Z is N or P.

The nitrogen-containing heterocyclic group can be an optionally substituted pyrrole, pyrroline, pyrazole, pyrazoline, imidazole, imidazoline, triazole, pyridine, triazine, pyrazine, pyridazine, pyrimidine, azepine, quinoline, piperidine, pyrrolidine, pyrazolidine, imidazolidine, azepane, isoxazole, isoxazoline, oxazole, oxazoline, oxadiazole, oxatriazole, dioxazole, oxazine, oxadiazine, isoxazolidine, morpholine, thiazole, isothiazole, oxathiazole, oxathiazine, or caprolactam, wherein each substituent is independently alkyl, alkenyl, alkynyl, aryl, or aralkyl.

Preferably, the nitrogen-containing heterocyclic group is unsaturated such as pyrrole, pyrroline, pyrazole, pyrazoline, imidazole, imidazoline, triazole, pyridine, triazine, pyrazine, pyridazine, pyrimidine, azepine, or quinoline, and each substitutable position of the heterocycle is substituted independently with alkyl (e.g., methyl, ethyl, propyl, n-butyl) or aryl groups (e.g., phenyl with alkyl substituents).

The nitrogen-containing heterocyclic group can comprise an imidazolium having the formula (6A):

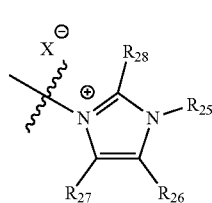

(6A)

wherein: $R_{25}$, $R_{26}$, $R_{27}$, and $R_{28}$ are each independently hydrogen, halide, alkyl, alkenyl, alkynyl or aryl, and the alkyl, alkenyl, alkynyl or aryl are optionally substituted with halide. Preferably, $R_{28}$ is 2,4,6-alkylphenyl, and $R_{25}$, $R_{26}$, and $R_{27}$ are each independently $C_1$-$C_6$ alkyl. An example of an imidazole as the nitrogen-containing heterocycle is 1-butyl-2-mesityl-4,5-dimethyl-1H-imidazole-imidazole which has the formula:

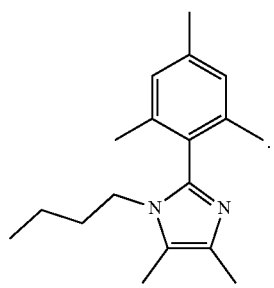 [SMILES: CCCCn1c(-c2c(C)cc(C)cc2C)nc(C)c1C]

The structural unit of Formulae (3A) has the structure:

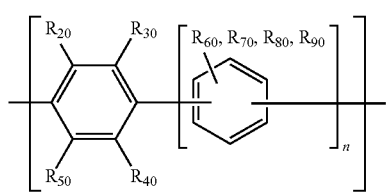

(3A)

wherein n is 0, 1, 2 or 3; $R_{20}$, $R_{30}$, $R_{40}$, $R_{50}$, $R_{60}$, $R_{70}$, $R_{80}$, and $R_{90}$ are each independently hydrogen, halide, alkyl, alkenyl, alkynyl or aryl, and the alkyl, alkenyl, alkynyl or aryl are optionally substituted with halide; and wherein $R_{30}$ and $R_{60}$ are optionally linked to form a five membered ring optionally substituted with halide or alkyl.

For example, in the structural unit of formula (3A), at least one of $R_{20}$, $R_{30}$, $R_{40}$, $R_{50}$, $R_{60}$, $R_{70}$, $R_{80}$, and $R_{90}$ can be halide or aryl, and the aryl can be optionally substituted with halide.

As another example, in the structural unit of formula (3A), $R_{30}$ and $R_{60}$ can be linked to form a five membered ring optionally substituted with halide or alkyl.

The structural unit of formula (3A) can be derived from an aromatic monomer comprising biphenyl, para-terphenyl, meta-terphenyl, para-quaterphenyl, 9,9-dimethyl-9H-fluorene, or benzene.

The structural unit of formula (3'A) has the structure:

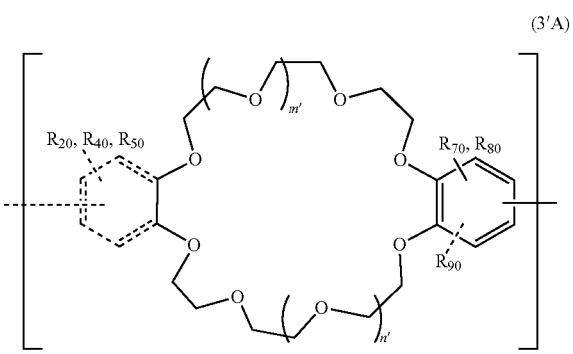

(3'A)

wherein $R_{20}$, $R_{40}$, $R_{50}$, $R_{70}$, $R_{80}$, and $R_{90}$ are each independently hydrogen, halide, alkyl, alkenyl, alkynyl or aryl, and the alkyl, alkenyl, alkynyl or aryl are optionally substituted with halide. The benzo ring shown in formula (3'A) as dashed lines and the $R_{90}$ group can be present or absent. If the benzo ring shown in formula (3'A) as dashed lines is absent, then the $R_{90}$ group is absent since the benzo ring of the structural unit would be bivalent. If the benzo ring shown in formula (3'A) as dashed lines is present, then the $R_{90}$ group is present since the benzo ring having the $R_{90}$ group would be monovalent.

For example, the structural unit can be derived from a dibenzo-18-crown-6 polyether as in formula (3'A-1) wherein m' and n' are 0, a dibenzo-21-crown-7 polyether as in formula (3'A-1) wherein m' is 0 and n' is 1, a dibenzo-24-crown-8 polyether as in formula (3'A-1) wherein m' and n' are 1, or a dibenzo-30-crown-10 polyether as in formula (3'A-1) wherein m' and n' are 2, and $R_{20}$, $R_{40}$, $R_{50}$, $R_{70}$, $R_{80}$, and $R_{90}$ are as defined for formula (3'A):

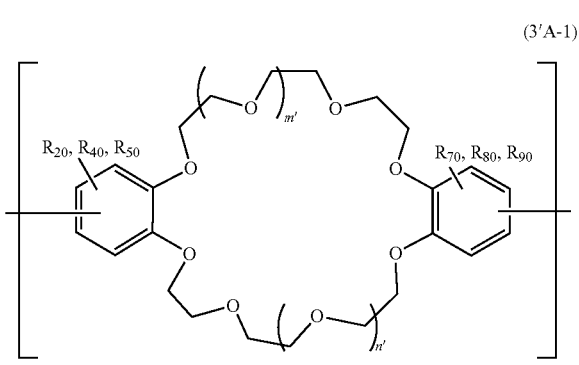

(3'A-1)

or a benzo-18-crown-6 polyether as in formula (3'A-2) wherein m' and n' are 2, and $R_{70}$ and $R_{80}$ are as defined for formula (3'A):

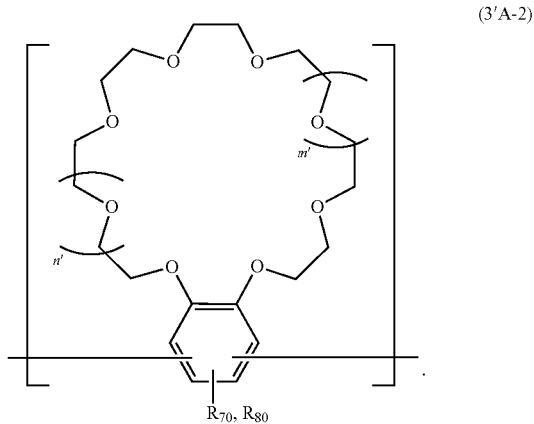

(3'A-2)

For example, in the structural unit of any of formulae (3'A)-(3'A-2), $R_{20}$, $R_{40}$, $R_{50}$, $R_{70}$, $R_{80}$, and $R_{90}$, if present, can be hydrogen or halide.

The structural unit of formula (3'A-1) can be derived from the respective dibenzo-crown ether wherein $R_{20}$, $R_{40}$, $R_{50}$, $R_{70}$, $R_{80}$, and $R_{90}$ are each hydrogen. Dibenzo-18-crown-6 polyether can be made from catechol and bis(chloroethyl) ether as described by Charles J. Pedersen, Org. Synth., 1972, 52, 66, and is commercially available. Dibenzo-21-crown-7 polyether, dibenzo-24-crown-8 polyether, and dibenzo-30-crown-10 polyether are also commercially available.

The structural unit of formula (3'A-2) can be derived from benzo-18-crown-6 polyether wherein $R_{70}$ and $R_{80}$ are each hydrogen. Benzo-18-crown-6 polyether is commercially available.

The optional structural unit of Formula (4A) has the structure:

(4A)

wherein each $R_{100}$ is independently alkyl, alkenyl, alkynyl, or a substituent having the formula (4B):

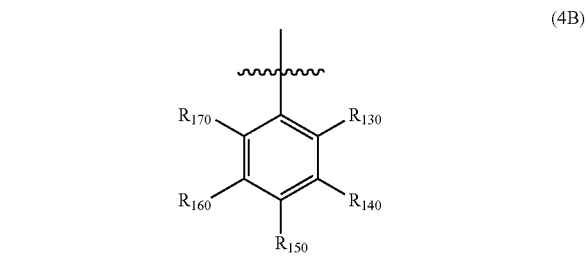

(4B)

and the alkyl, alkenyl, or alkynyl are optionally substituted with fluoride; $R_{130}$, $R_{140}$, $R_{150}$, $R_{160}$, and $R_{170}$ are each independently hydrogen, halide, alkyl, alkenyl, alkynyl or aryl, and the alkyl, alkenyl, alkynyl or aryl are optionally substituted with halide.

For example, in the structural unit of formula (4A), $R_{100}$ can be alkyl, alkenyl, or alkynyl, and the alkyl, alkenyl, or alkynyl can be optionally substituted with fluoride.

As another example, in the structural unit of formula (4A), $R_{100}$ can be the substituent of formula (4B) and at least one of $R_{130}$, $R_{140}$, $R_{150}$, $R_{160}$ and $R_{170}$ can be halide or aryl, and the aryl can be optionally substituted with fluoride.

As yet another example, $R_{20}$, $R_{40}$, $R_{50}$, $R_{70}$, $R_{80}$, $R_{90}$, $R_{130}$, $R_{140}$, $R_{150}$, $R_{160}$, and $R_{170}$ can each independently be hydrogen, or alkyl optionally substituted with fluoride, and $R_{100}$ can be alkyl optionally substituted with fluoride or the substituent of formula (4B).

In other instances, $R_{20}$, $R_{40}$, $R_{50}$, $R_{70}$, $R_{80}$, $R_{90}$, $R_{130}$, $R_{140}$, $R_{150}$, $R_{160}$, and $R_{170}$ can each independently be hydrogen, methyl, ethyl, propyl, butyl, pentyl, or hexyl, or methyl, ethyl, propyl, butyl, pentyl, or hexyl optionally substituted with fluoride, and $R_{100}$ can be methyl, ethyl, propyl, butyl, pentyl, or hexyl optionally substituted with fluoride or the substituent of formula (4B).

A sum of the mole fractions of the structural unit of Formula (1A) and Formula (4A) in the polymer can be about equal to a sum of the mole fractions of the structural units of Formulae (3A) and (3'A) in the polymer, and the ratio of the mole fraction of the structural unit of Formula (1A) in the polymer to the sum of the mole fractions of the structural units of Formulae (3A) and (3'A) in the polymer can be from about 0.01 to 1.

A mole ratio of a sum of the mole fractions of the structural unit of Formula (1A) and Formula (4A) to a sum of the mole fractions of Formulae (3A) and (3'A) in the polymer can be from about 0.95:1 to about 1.4:1, and the ratio of the mole fraction of the structural unit of Formula (1A) to the sum of the mole fractions of the structural units of Formulae (3A) and (3'A) can be from about 0.01 to 1.

The mole ratio of the sum of the mole fractions of the structural unit of Formula (1A) and Formula (4A) to the sum of the mole fractions of Formulae (3A) and (3'A) in the polymer can be from about 1:1 to about 1.2:1.

As a second aspect of the invention, a polymer is provided which comprises a reaction product of a polymerization mixture comprising a cation-functionalized trifluoroketone monomer; an aromatic monomer and/or crown ether monomer; and optionally a trifluoromethyl ketone monomer.

The cation-functionalized trifluoroketone monomer has the formula:

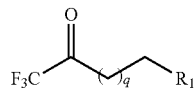
(1)

wherein q is 0, 1, 2, 3, 4, 5, 6, 7, 8, 9, 10, 11, 12, 13, 14, 15, 16, 17, 18, 19, or 20; and $R_1$ are each independently a quaternary ammonium or phosphonium group or a nitrogen-containing heterocyclic group or a salt thereof. The quaternary ammonium or phosphonium group and the nitrogen-containing heterocyclic group are as defined above for the first aspect of the invention.

The aromatic monomer has the formula:

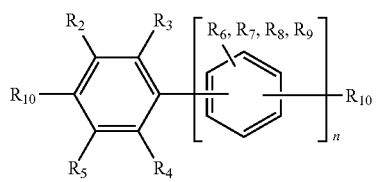
(3)

wherein n is 0, 1, 2 or 3; $R_2$, $R_3$, $R_4$, $R_5$, $R_6$, $R_7$, $R_8$, $R_9$, and $R_{10}$ are each independently hydrogen, halide, alkyl, alkenyl, alkynyl or aryl, and the alkyl, alkenyl, alkynyl or aryl are optionally substituted with halide, and wherein $R_3$ and $R_6$ are optionally linked to form a five membered ring optionally substituted with halide or alkyl.

For example, in the aromatic monomer of formula (3), at least one of $R_2$, $R_3$, $R_4$, $R_5$, $R_6$, $R_7$, $R_8$, $R_9$, and $R_{10}$ is halide or aryl, and the aryl is optionally substituted with halide.

As another example, in the aromatic monomer of formula (3), $R_3$ and $R_6$ are linked to form a five membered ring optionally substituted with halide or alkyl.

The aromatic monomer of formula (3) can comprise biphenyl, para-terphenyl, meta-terphenyl, para-quaterphenyl, 9,9-dimethyl-9H-fluorene, or benzene.

The crown ether monomer has the formula:

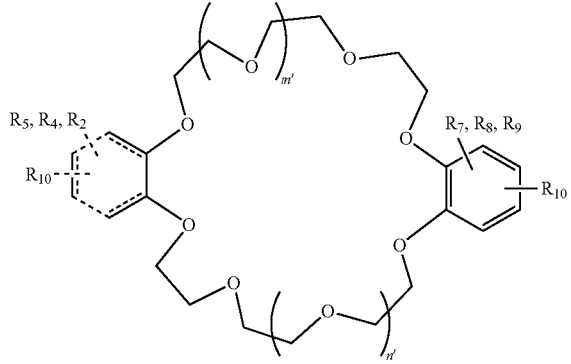
(3')

wherein $R_2$, $R_4$, $R_5$, $R_7$, $R_8$, $R_9$, and $R_{10}$, if present, are each independently hydrogen, halide, alkyl, alkenyl, alkynyl or aryl, and the alkyl, alkenyl, alkynyl or aryl are optionally substituted with halide and each m' and each n' is independently 0, 1 or 2. The benzo ring shown in formula (3') as dashed lines can be present or absent.

For example, the crown ether monomer can be a dibenzo-18-crown-6 polyether as in formula (3'-1) wherein m' and n' are 0, a dibenzo-21-crown-7 polyether as in formula (3'-1) wherein m' is 0 and n' is 1, a dibenzo-24-crown-8 polyether as in formula (3'-1) wherein m' and n' are 1, or a dibenzo-30-crown-10 polyether as in formula (3'-1) wherein m' and n' are 2, and $R_2$, $R_4$, $R_5$, $R_7$, $R_8$, $R_9$ and $R_{10}$ are as defined for formula (3'):

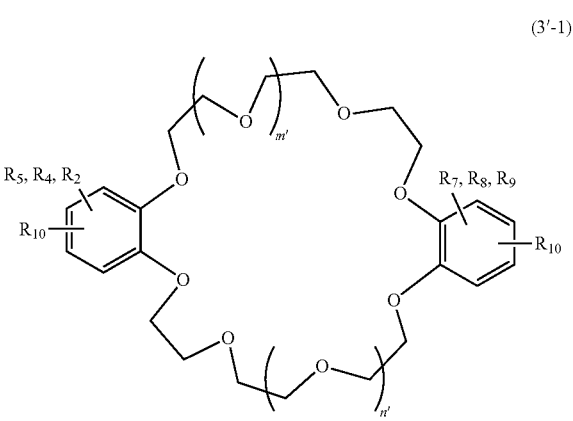
(3'-1)

or a benzo-18-crown-6 polyether as in formula (3'-2) wherein m' and n' are 2, and $R_7$, $R_8$, $R_9$ and $R_{10}$ are as defined for formula (3'):

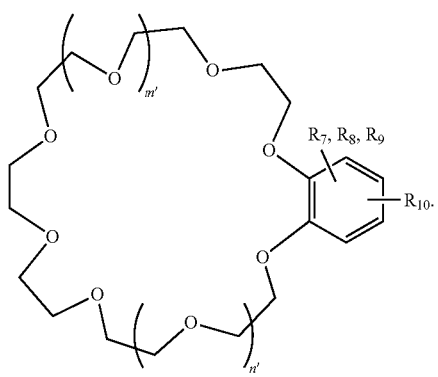
(3'-2)

The optional trifluoromethyl ketone monomer has the formula:

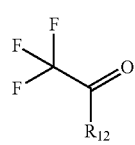
(4)

wherein each $R_{12}$ is independently alkyl, alkenyl, alkynyl, or a substituent of formula (4C):

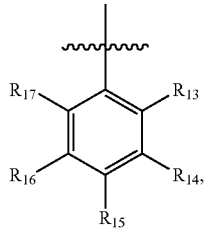

(4C)

and the alkyl, alkenyl, or alkynyl are optionally substituted with fluoride; and $R_{13}$, $R_{14}$, $R_{15}$, $R_{16}$, and $R_{17}$ are each independently hydrogen, halide, alkyl, alkenyl, alkynyl or aryl.

For example, in the trifluoromethyl ketone monomer of formula (4), $R_{12}$ is alkyl, alkenyl, or alkynyl, and the alkyl, alkenyl, or alkynyl is optionally substituted with fluoride.

As another example, in the trifluoromethyl ketone monomer of formula (4), $R_{12}$ is a substituent of formula (4C) and at least one of $R_{13}$, $R_{14}$, $R_{15}$, $R_{16}$ and $R_{17}$ is halide or aryl, and the aryl is optionally substituted with fluoride.

As yet another example, $R_2$, $R_3$, $R_4$, $R_5$, $R_6$, $R_7$, $R_8$, $R_9$, $R_{10}$, $R_{13}$, $R_{14}$, $R_{15}$, $R_{16}$, and $R_{17}$ are each independently hydrogen, or alkyl optionally substituted with fluoride, and $R_{12}$ is alkyl optionally substituted with fluoride or a substituent of formula (4C).

In other instances, $R_2$, $R_3$, $R_4$, $R_5$, $R_6$, $R_7$, $R_8$, $R_9$, $R_{10}$, $R_{13}$, $R_{14}$, $R_{15}$, $R_{16}$, and $R_{17}$ are each independently hydrogen, methyl, ethyl, propyl, butyl, pentyl, or hexyl, or methyl, ethyl, propyl, butyl, pentyl, or hexyl optionally substituted with fluoride, and $R_{12}$ is methyl, ethyl, propyl, butyl, pentyl, or hexyl optionally substituted with fluoride or a substituent of formula (4C).

A third aspect of the invention is a polymer which comprises a second reaction product of a second polymerization mixture. The second polymerization mixture comprises a quaternary ammonium or phosphonium compound or a nitrogen-containing heterocycle or a salt thereof; and an intermediate polymer.

The intermediate polymer comprises a first reaction product of a first polymerization mixture. The first polymerization mixture comprises a halogenated trifluoromethyl ketone monomer; an aromatic monomer and/or crown ether monomer; and optionally, a trifluoromethyl ketone monomer.

The halogenated trifluoromethyl ketone monomer has the formula:

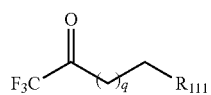

(2)

wherein q is 0, 1, 2, 3, 4, 5, 6, 7, 8, 9, 10, 11, 12, 13, 14, 15, 16, 17, 18, 19, or 20; and $R_{111}$ is a halide. Preferably, the halide is fluoride, chloride, bromide or iodide.

The aromatic monomer has the formula (3) and is as described for the polymer in the second aspect of the invention.

The crown ether has the formula (3') and is as described for the polymer in the second aspect of the invention.

The trifluoromethyl ketone monomer has the formula (4) and is as described for the polymer in the second aspect of the invention.

The quaternary ammonium or phosphonium compound has the formula (5):

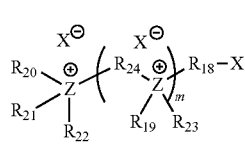

(5)

wherein m is 0, 1, 2, 3, 4, 5 or 6; $R_{18}$ and $R_{24}$ are each independently alkylene; $R_{19}$, $R_{20}$, $R_{21}$, $R_{22}$, and $R_{23}$ are each independently alkyl, alkenyl, or alkynyl; $X^-$ is an anion; and Z is P when the aromatic monomer of formula (3) is present in the first polymerization mixture but the crown ether monomer of formula (3') is not present in the first polymerization mixture, and Z is N or P when the crown ether monomer of formula (3') is present in the first polymerization mixture. Preferably, $X^-$ comprises a halide, $BF_4^-$, $PF_6^-$, $CO_3^{2-}$ or $HCO_3^-$.

For example, the quaternary ammonium or phosphonium compound of the formula (5) can have $R_{18}$ and $R_{24}$ each independently be $C_1$-$C_{22}$ alkylene; $R_{19}$, $R_{20}$, $R_{21}$, $R_{22}$, and $R_{23}$ can each independently be $C_1$-$C_6$ alkyl; m can be 0, 1, 2, 3, 4, 5, or 6; and Z is N or P.

As another example, the quaternary ammonium or phosphonium compound of the formula (5) can have $R_{18}$ and $R_{24}$ each independently be $C_1$-$C_6$ alkylene; $R_{19}$, $R_{20}$, $R_{21}$, $R_{22}$, and $R_{23}$ can each independently be $C_1$-$C_6$ alkyl; m can be 0, 1, 2, or 3; and Z is N or P.

As yet another example, the quaternary ammonium or phosphonium compound of the formula (5) can have $R_{18}$ and $R_{24}$ each independently be $C_8$-$C_{22}$ alkylene; $R_{19}$, $R_{20}$, $R_{21}$, $R_{22}$, and $R_{23}$ can each independently be $C_1$-$C_6$ alkyl; m can be 0, 1, 2, or 3; and Z is N or P.

In other instances, the quaternary ammonium or phosphonium compound of the formula (5) can have $R_{18}$ and $R_{24}$ each be $C_2$-$C_6$ alkylene; $R_{19}$, $R_{20}$, $R_{21}$, $R_{22}$, and $R_{23}$ can each independently be methyl; m can be 1; and Z is N or P.

In yet other instances, the quaternary ammonium or phosphonium compound of the formula (5) can have $R_{18}$ and $R_{24}$ each be n-hexylene; $R_{19}$, $R_{20}$, $R_{21}$, $R_{22}$, and $R_{23}$ can each be methyl; m can be 1; and Z is N or P.

The nitrogen-containing heterocycle can be an optionally substituted pyrrole, pyrroline, pyrazole, pyrazoline, imidazole, imidazoline, triazole, pyridine, triazine, pyrazine, pyridazine, pyrimidine, azepine, quinoline, piperidine, pyrrolidine, pyrazolidine, imidazolidine, azepane, isoxazole, isoxazoline, oxazole, oxazoline, oxadiazole, oxatriazole, dioxazole, oxazine, oxadiazine, isoxazolidine, morpholine, thiazole, isothiazole, oxathiazole, oxathiazine, or caprolactam, wherein each substituent is independently alkyl, alkenyl, alkynyl, aryl, or aralkyl.

Preferably, the nitrogen-containing heterocycle is unsaturated such as pyrrole, pyrroline, pyrazole, pyrazoline, imidazole, imidazoline, triazole, pyridine, triazine, pyrazine, pyridazine, pyrimidine, azepine, or quinoline, and each substitutable position of the heterocycle is substituted independently with alkyl (e.g., methyl, ethyl, propyl, n-butyl) or aryl groups (e.g., phenyl with alkyl substituents).

The nitrogen-containing heterocycle can comprise an imidazole having the formula (6):

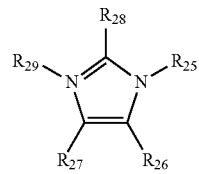
(6)

wherein: $R_{25}$, $R_{26}$, $R_{27}$, $R_{28}$, and $R_{29}$ are each independently hydrogen, halide, alkyl, alkenyl, alkynyl or aryl, and the alkyl, alkenyl, alkynyl or aryl are optionally substituted with halide. Preferably, $R_{29}$ is hydrogen, $R_{28}$ is 2,4,6-alkylphenyl, and $R_{25}$, $R_{26}$, and $R_{27}$ are each independently $C_1$-$C_6$ alkyl. An example of an imidazole as the nitrogen-containing heterocycle is 1-butyl-2-mesityl-4,5-dimethyl-1H-imidazole-imidazole which has the formula:

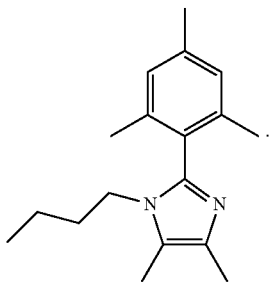 [SMILES: CCCCn1c(-c2c(C)cc(C)cc2C)nc(C)c1C]

The nitrogen-containing heterocycle can be an optionally substituted pyrrole, pyrroline, pyrazole, pyrazoline, imidazole, imidazoline, triazole, pyridine, triazine, pyrazine, pyridazine, pyrimidine, azepine, quinoline, piperidine, pyrrolidine, pyrazolidine, imidazolidine, azepane, isoxazole, isoxazoline, oxazole, oxazoline, oxadiazole, oxatriazole, dioxazole, oxazine, oxadiazine, isoxazolidine, morpholine, thiazole, isothiazole, oxathiazole, oxathiazine, or caprolactam, wherein each substituent is independently alkyl, alkenyl, alkynyl, aryl, or aralkyl.

A fourth aspect of the invention is an anion exchange polymer which comprises a reaction product of a base and any one of the polymers as described above in the first, second or third aspects of the invention.

Preferably, the base comprises a hydroxide-containing base such as sodium hydroxide or potassium hydroxide; a bicarbonate-containing base such as sodium bicarbonate or potassium bicarbonate; or a carbonate-containing base such as sodium carbonate or potassium carbonate.

Representative anion exchange polymers include the following wherein x is 0.01-1:

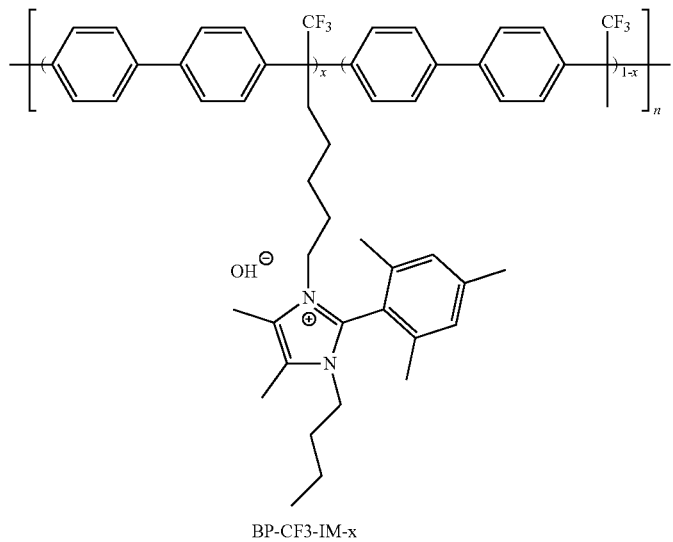

BP-CF3-IM-x

-continued
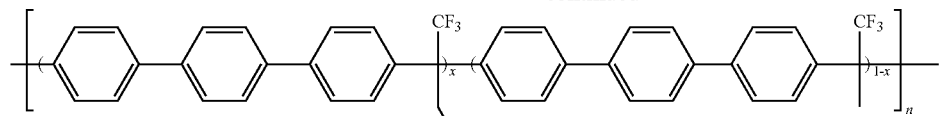
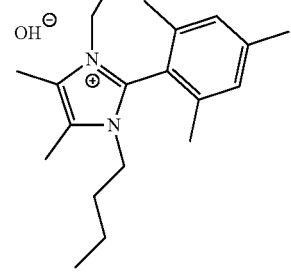
TP-CF3-IM-x
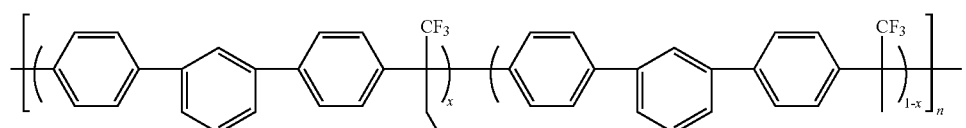
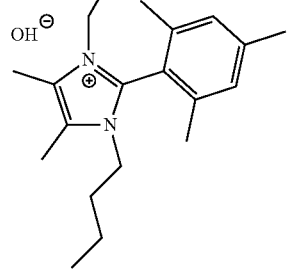
mTP-CF3-IM-x
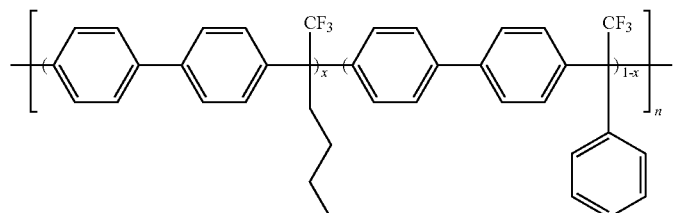
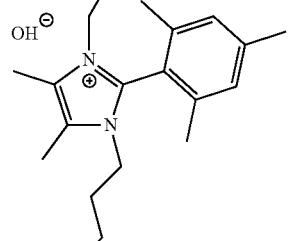
BP-phCF3-IM-x -continued
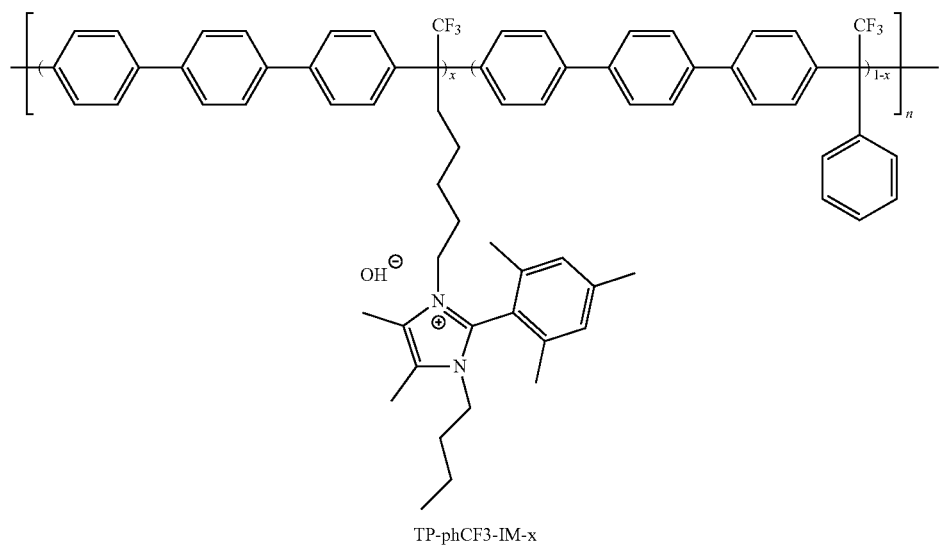
TP-phCF3-IM-x
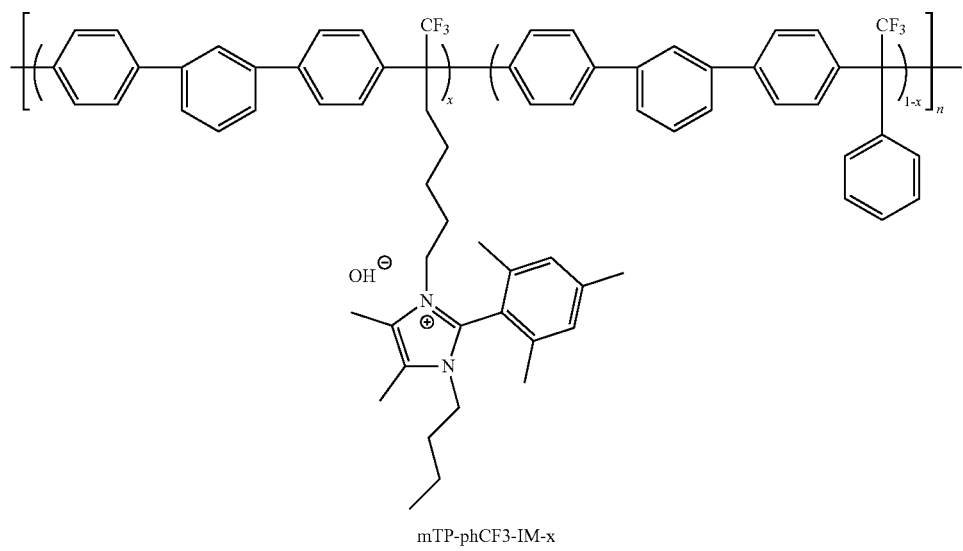
mTP-phCF3-IM-x

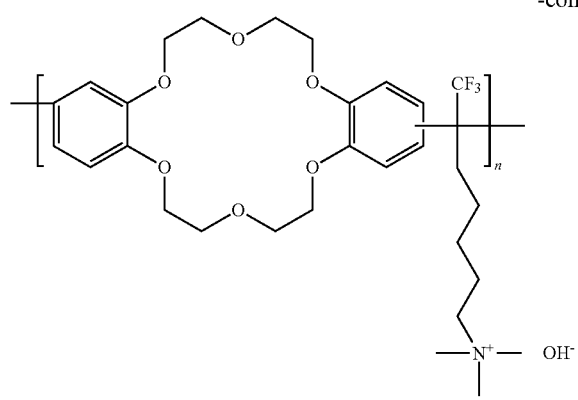

poly(aryl-crown ether-alkylene)-CF3-QA

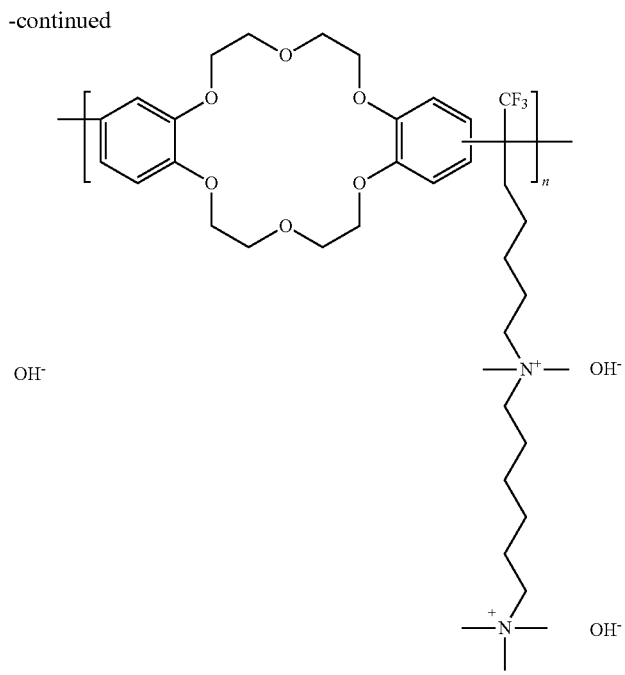

poly(aryl-crown ether-alkylene)-CF3-d-QA

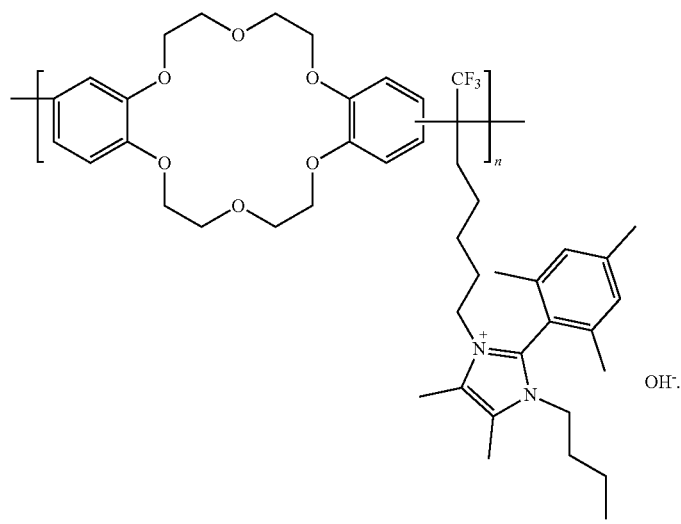

poly(aryl-crown ether-alkylene)-CF3-IM

The imidazolium tethered-poly(aryl alkylene) polymer or imidazolium tethered-poly(aryl-crown ether-alkylene) polymer can be an hydroxide exchange polymer comprising a poly(aryl alkylene) or poly(aryl-crown ether-alkylene) backbone free of ether linkages, and having: water uptake of not more than 47% based on the dry weight of the polymer when immersed in pure water at 80° C.; or hydroxide conductivity in pure water at 20° C. of at least 31 mS/cm. Also, the polymer can be: stable to degradation (as evidenced by no change in the $^1$H NMR spectra) when immersed in 1 M potassium hydroxide at 130° C. for 1,200 hours; stable to degradation (as evidenced by no change in the $^1$H NMR spectra) when immersed in 10 M potassium hydroxide at 80° C. for 300 hours; stable to degradation (as evidenced by no change in the $^1$H NMR spectra) when kept at relative humidity of 23.3% and 50.9% at 95° C. for 300 hours; insoluble in pure water and isopropanol at 100° C., but soluble in a 50/50 mixture by weight of water and ethanol at 100° C. Also, the polymer can have a tensile strength of at least 30 MPa and/or elongation at break of at least 250%.

Uptake of the imidazolium tethered-poly(aryl-crown ether-alkylene) polymer can be no more than 47% when the polymer is crosslinked with a crosslinking agent or is chemically bound to a membrane. For example, the water uptake of polycrownether-CF3-TMA (also known as PCE-C5-QA-1) of Example 10 was 364% and of poly(aryl-crown ether-alkylene)-CF3-IM of Example 7 was about 200% when measured, but can be decreased by crosslinking or chemically binding the polymer to a membrane.

Crosslinking agents for use in crosslinking any of the polymers described herein include, for example, dibromoalkanes (dibromohexanes, dibromobutane), diiodoalkanes (diiodohexanes, diiodobutane), and ammonium cation-containing dibromoalkanes and diiodoalkanes.

The imidazolium tethered-poly(aryl alkylene) polymer or imidazolium tethered-poly(aryl-crown ether-alkylene) polymer can be an hydroxide exchange polymer comprising an imidazolium-tethered poly(aryl alkylene) or poly(aryl-crown ether-alkylene) backbone free of ether linkages, and having a peak power density of at least 130 mW/cm² when the polymer is used as an hydroxide exchange membrane of an hydroxide exchange membrane fuel cell and is loaded at 20% as an hydroxide exchange ionomer in cathodic and anodic catalyst layers of the fuel cell, the fuel cell having 0.4 $mg_{Pt}$ $cm^{-2}$ PtRu/C on anode, 0.4 $mg_{Pt}$ $cm^{-2}$ PtRu/C on cathode and test conditions being hydrogen flow rate of 1.0 L/min, oxygen flow rate of 2.0 L/min, cell temperature of 95° C., and anode and cathode humidifier temperature at 90° C., and 97° C., respectively.

Preferably, the aryl linkages of the imidazolium tethered-poly(aryl alkylene) polymer backbone free of ether linkages comprise p-phenyl, and the alkylene linkages comprise hydroxide bicarbonate, or carbonate anions, or a combination thereof. The imidazolium tethered-poly(aryl-crown ether-alkylene) polymer backbone free of ether linkages also preferably comprises dibenzo-18-crown-6, dibenzo-21-crown-7 polyether, dibenzo-24-crown-8 polyether, or dibenzo-30-crown-10 polyether.

The aryl linkages of the imidazolium tethered-poly(aryl alkylene) polymer backbone can be derived, for example, from biphenyl, para-terphenyl, meta-terphenyl, para-quaterphenyl, 9,9-dimethyl-9H-fluorene, or benzene monomers. The imidazolium tethered-poly(aryl-crown ether-alkylene) polymer backbone free of ether linkages can be derived, for example, from dibenzo-18-crown-6, dibenzo-21-crown-7 polyether, dibenzo-24-crown-8 polyether, or dibenzo-30-crown-10 polyether.

The alkylene linkages of the imidazolium tethered-poly (aryl alkylene) backbone are derived from 7-bromo-1,1,1-trifluoroheptan-2-one monomers.

The imidazolium tethered-poly(aryl alkylene) polymer backbone or imidazolium tethered-poly(aryl-crown ether-alkylene) polymer backbone can further comprise 2,2,2-trifluoroethylbenzene linkages derived from 2,2,2-trifluoroacetophenone monomer, or trifluoromethyl methylene linkages derived from trifluoromethyl ketone monomer, such as 1,1,1-trifluoropropane linkages derived from 1,1,1-trifluoroacetone.

A fifth aspect of the invention is a method of making an anion exchange polymer membrane comprising the anion exchange polymer in the fourth aspect of the invention. The method comprises: reacting the cation-functionalized trifluoroketone monomer, the optional trifluoromethyl ketone monomer, and the aromatic monomer and/or crown ether monomer in the presence of an organic solvent and a polymerization catalyst to form a cation-functionalized polymer; dissolving the cation-functionalized polymer in a solvent to form a polymer solution; casting the polymer solution to form a polymer membrane; and exchanging anions of the polymer membrane with hydroxide, bicarbonate, or carbonate ions or a combination thereof to form the anion exchange polymer membrane.

For example, a cation-functionalized trifluoroketone monomer such as an imidazolium functionalized 7-bromo-1,1,1-trifluoroheptan-2-one, an optional trifluoromethyl ketone monomer such as 2,2,2-trifluoroacetophenone or 1,1,1-trifluoroacetone, and an aromatic monomer such as benzene, biphenyl, p-terphenyl, m-terphenyl or p-quaterphenyl or a crown ether monomer such as dibenzo-18-crown-6, dibenzo-21-crown-7 polyether, dibenzo-24-crown-8 polyether, or dibenzo-30-crown-10 polyether can be placed in a stirred container and dissolved or dispersed into an organic solvent. A polymerization catalyst in a solvent can then be added dropwise over up to 60 minutes at −78 to 60° C. Thereafter, the reaction is continued at this temperature for about 1 to about 120 hours. The resulting solution is poured slowly into an aqueous solution of ethanol. The solid obtained is filtered, washed with water and immersed in 1 M K2CO3 at room temperature for about 1 to 48 hours. Finally, the product is filtered, washed with water and dried completely under vacuum to form a cation-functionalized polymer. The cation functionalized polymer is then subjected to anion exchange, for example in 1 M KOH for hydroxide exchange, at about 20 to 100° C. for about 12 to 48 hours, followed by washing and immersion in DI water for about 12 to 48 hours under an oxygen-free atmosphere to remove residual KOH.

A representative reaction scheme for the fifth aspect of the invention is shown below, wherein $R_5$, $R_6$, $R_7$, $R_8$, and $R_{100}$ are each independently hydrogen, alkyl, alkenyl, phenyl or alkynyl, and the alkyl, alkenyl, phenyl or alkynyl are optionally substituted with a halide; $R_{11}$ is phosphonium or nitrogen-containing heterocycle; n is the number of repeat units in the polymer; q is 0-20; and x is 0.01-1:

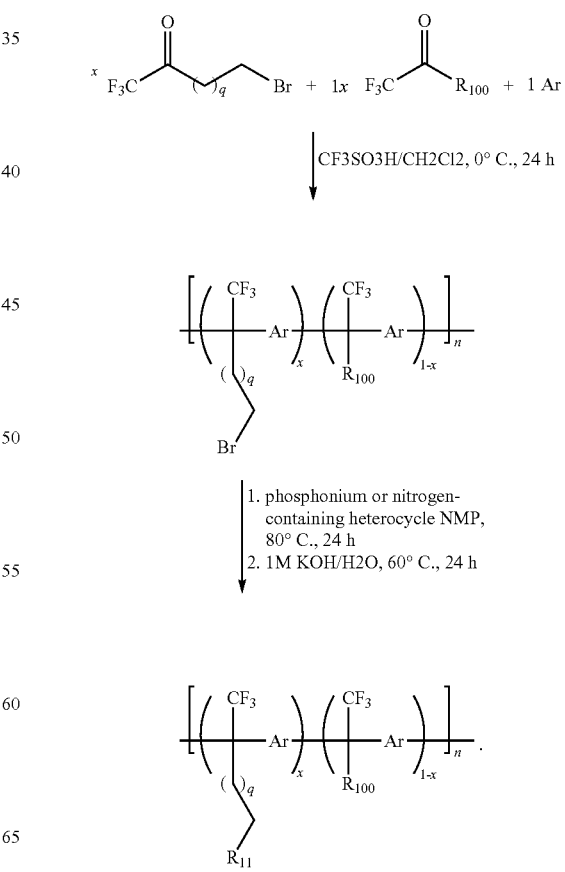

-continued

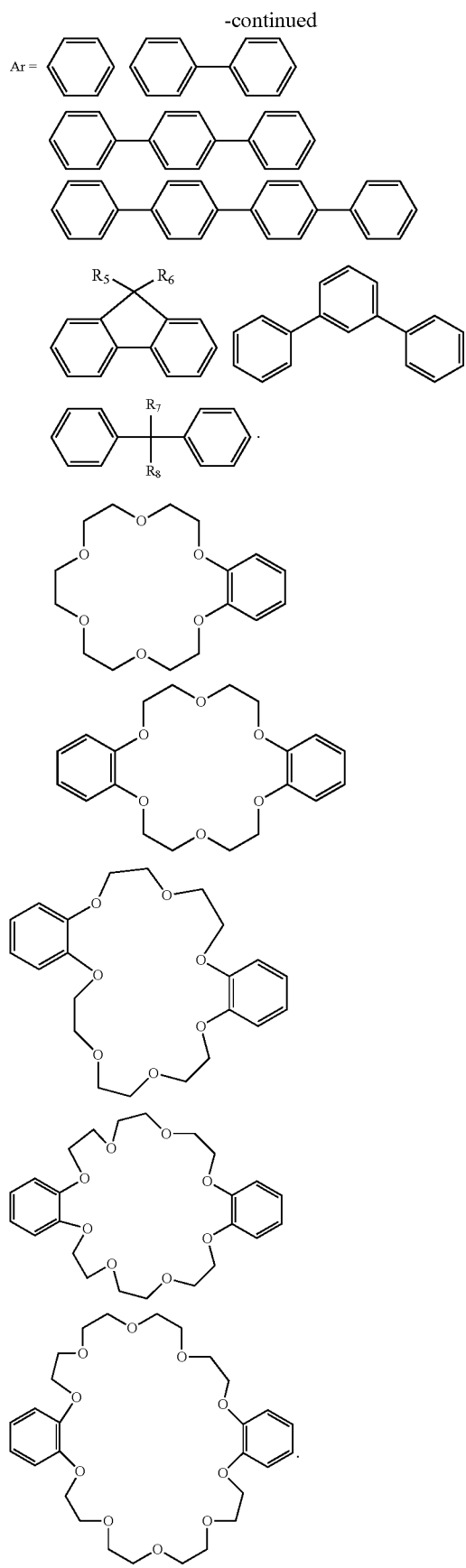

A sixth aspect of the invention is a method of making an anion exchange polymer membrane comprising the anion exchange polymer in the fourth aspect of the invention. The method comprises: reacting the halogenated trifluoroketone monomer, the optional trifluoromethyl ketone monomer, and the aromatic monomer and/or crown ether monomer in the presence of an organic solvent and a polymerization catalyst to form a halogen-functionalized polymer; reacting the halogen-functionalized polymer with the quaternary phosphonium compound or the nitrogen-containing heterocycle or a salt thereof in the presence of an organic solvent to form a cation-functionalized polymer; dissolving the cation-functionalized polymer in a solvent to form a polymer solution; casting the polymer solution to form a polymer membrane; and exchanging anions of the polymer membrane with hydroxide, bicarbonate, or carbonate ions or a combination thereof to form the anion exchange polymer membrane.

For example, a halogenated trifluoroketone monomer such as 7-bromo-1,1,1-trifluoroheptan-2-one, an optional trifluoromethyl ketone monomer such as 2,2,2-trifluoroacetophenone or 1,1,1-trifluoroacetone, and an aromatic monomer such as benzene, biphenyl, p-terphenyl, m-terphenyl or p-quaterphenyl or crown ether monomer such as dibenzo-18-crown-6, dibenzo-21-crown-7 polyether, dibenzo-24-crown-8 polyether, or dibenzo-30-crown-10 polyether can be placed in a stirred container and dissolved or dispersed into an organic solvent. A polymerization catalyst in a solvent can then be added dropwise over up to 60 minutes at −78 to 60° C. Thereafter, the reaction is continued at this temperature for about 1 to about 120 hours. The resulting solution is poured slowly into an aqueous solution of ethanol. The solid obtained is filtered, washed with water and immersed in 1 M K2CO3 at room temperature for about 1 to 48 hours. Finally, the product is filtered, washed with water and dried completely under vacuum to form a halogen-functionalized polymer.

The halogen functionalized polymer is then placed in a stirred container with the quaternary phosphonium compound or the nitrogen-containing heterocycle or a salt thereof such as a functionalized imidazole and dissolved or dispersed into an organic solvent. The reaction is continued at a temperature of about 50 to 100° C. for about 1 to about 120 hours. The resulting solution is then cast to form a polymer membrane. The polymer membrane is then subjected to anion exchange, for example in 1 M KOH for hydroxide exchange, at about 20 to 100° C. for about 12 to 48 hours, followed by washing and immersion in DI water for about 12 to 48 hours under an oxygen-free atmosphere to remove residual KOH.

A representative reaction scheme for the sixth aspect of the invention is shown below, wherein $R_5$, $R_6$, $R_7$, $R_8$, and $R_{100}$ are each independently hydrogen, alkyl, alkenyl, phenyl or alkynyl, and the alkyl, alkenyl, phenyl or alkynyl are optionally substituted with a halide; $R_{11}$ is a quaternary ammonium or phosphonium group or nitrogen-containing heterocyclic group as defined in the first aspect of the invention; n is the number of repeat units in the polymer; q is 0-20; and x is 0.01-1:

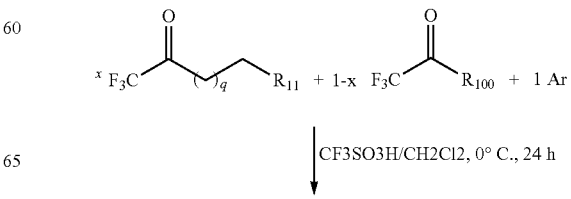

-continued

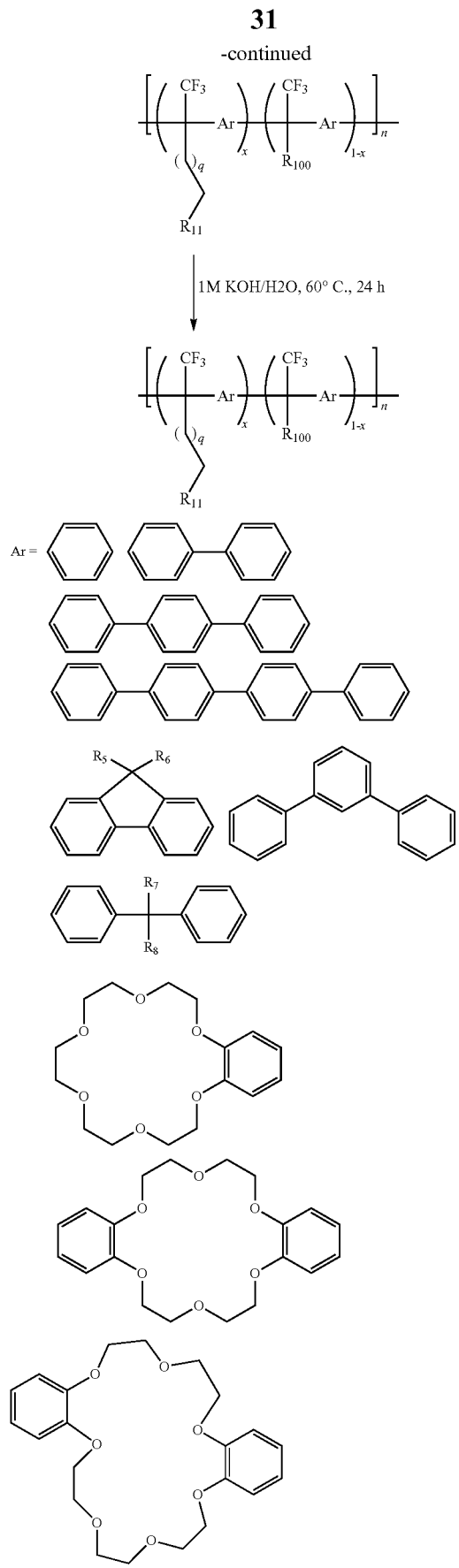

1M KOH/H2O, 60° C., 24 h

-continued

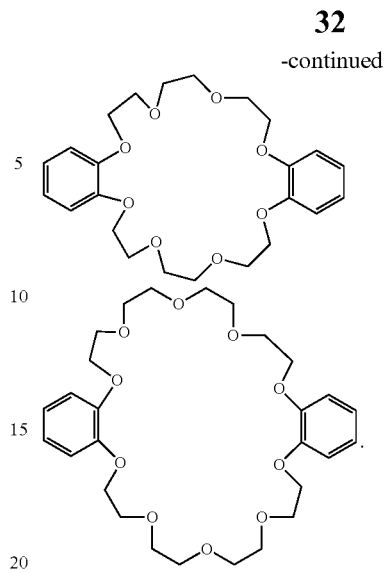

A seventh aspect of the invention is an anion exchange membrane, optionally configured and sized to be suitable for use in a fuel cell, electrolyzer, electrodialyzer, solar hydrogen generator, flow battery, desalinator, sensor, demineralizer, water purifier, waste water treatment system, ion exchanger, or $CO_2$ separator, and comprising the anion exchange polymer of the fourth aspect of the invention.

The anion exchange polymer can be made into reinforced hydroxide exchange membranes as described below. Such reinforced hydroxide exchange membranes can be prepared by a method which comprises wetting a porous substrate in a liquid to form a wetted substrate; dissolving the poly(aryl alkylene) polymer in a solvent to form a homogeneous solution; applying the solution onto the wetted substrate to form the reinforced membrane; drying the reinforced membrane; and exchanging anions of the reinforced membrane with hydroxide ions to form the reinforced hydroxide exchange polymer membrane. The solution can be applied to the wetted substrate by any known membrane formation technique such as casting, spraying, or doctor knifing.

The resulting reinforced membrane can be impregnated with the poly(aryl alkylene) polymer multiple times if desired by wetting the reinforced membrane again and repeating the dissolving, casting and drying steps.

The polymerization catalyst used in forming the polymer can comprise trifluoromethanesulfonic acid, pentafluoroethanesulfonic acid, heptafluoro-1-propanesulfonic acid, trifluoroacetic acid, perfluoropropionic acid, heptafluorobutyric acid, or a combination thereof.

Each of the organic solvents used in the any of the above methods can be independently selected from polar aprotic solvents (e.g., dimethyl sulfoxide, 1-methyl-2-pyrrolidinone, 1-methyl-2-pyrrolidone, 1-methyl-2-pyrrolidone, or dimethylformamide) or other suitable solvents including, but are not limited to, methylene chloride, trifluoroacetic acid, trifluoromethanesulfonic acid, chloroform, 1,1,2,2-tetrachloroethane, dimethylacetamide or a combination thereof.

The solvent in the dissolving step can comprise methanol, ethanol, n-propanol, isopropanol, n-butanol, sec-butanol, tert-butanol, a pentanol, a hexanol, dimethyl sulfoxide, 1-methyl-2-pyrrolidone, dimethylformamide, chloroform, ethyl lactate, tetrahydrofuran, 2-methyltetrahydrofuran, water, phenol, acetone, or a combination thereof.

The liquid used to wet the porous substrate can be a low boiling point solvent such as a lower alcohol (e.g., methanol, ethanol, propanol, isopropanol) and/or water. Preferably, the liquid is anhydrous ethanol.

Additional aspects of the invention are described below.

An anion exchange membrane such as a hydroxide exchange membrane is also provided. The membrane is configured and sized to be suitable for use in a fuel cell, electrolyzer, electrodialyzer, solar hydrogen generator, flow battery, desalinator, sensor, demineralizer, water purifier, waste water treatment system, ion exchanger, or $CO_2$ separator, and comprises any of the poly(aryl alkylene) polymers as described herein.

A reinforced electrolyte membrane such as a reinforced hydroxide exchange membrane is also provided to increase the mechanical robustness of the anion exchange membrane for stability through numerous wet and dry cycles (relative humidity cycling) in a fuel cell. The membrane is configured and sized to be suitable for use in a fuel cell, electrolyzer, electrodialyzer, solar hydrogen generator, flow battery, desalinator, sensor, demineralizer, water purifier, waste water treatment system, ion exchanger, or $CO_2$ separator, and comprises a porous substrate impregnated with any of the poly(aryl alkylene) polymers as described herein. Methods for preparing reinforced membranes are well known to those of ordinary skill in the art such as those disclosed in U.S. Pat. Nos. RE37,656 and RE37,701, which are incorporated herein by reference for their description of reinforced membrane synthesis and materials.

The porous substrate can comprise a membrane comprised of polytetrafluoroethylene, polypropylene, polyethylene, poly(ether ketone), polyaryletherketone, imidazolium-tethered poly(aryl alkylene), imidazole-tethered poly(aryl alkylene), polysulfone, perfluoroalkoxyalkane, or a fluorinated ethylene propylene polymer, or other porous polymers known in the art such as the dimensionally stable membrane from Giner for use in preparing reinforced membranes for fuel cells. Such porous substrates are commercially available, for example, from W.L. Gore & Associates.

The porous substrate can have a porous microstructure of polymeric fibrils. Such substrates comprised of polytetrafluoroethylene are commercially available. The porous substrate can comprise a microstructure of nodes interconnected by fibrils.

The interior volume of the porous substrate can be rendered substantially occlusive by impregnation with the poly(aryl alkylene) polymer as described herein.

The porous substrate can have a thickness from about 1 micron to about 10, 15, 20, 25, 30, 35, 40, 45, 50, 55, 60, 65, 70, 75, 80, 85, 90, 95 or 100 microns. Preferably, the porous substrate has a thickness from about 5 microns to about 30 microns, or from about 7 microns to about 20 microns.

An anion exchange membrane fuel cell, electrolyzer, electrodialyzer, solar hydrogen generator, flow battery, desalinator, sensor, demineralizer, water purifier, waste water treatment system, ion exchanger, or $CO_2$ separator is also provided, the fuel cell, electrolyzer, electrodialyzer, solar hydrogen generator, flow battery, desalinator, sensor, demineralizer, water purifier, waste water treatment system, ion exchanger, or $CO_2$ separator comprising the anion exchange polymer.

Polymers of the invention having high water uptake are useful as ionomers in electrolyzers or fuel cells if the polymers are adhered to a catalyst layer so as not to be washed away during operation of the electrolyzer or fuel cell. Adherence can be achieved by chemically binding the polymer to a membrane or catalyst layer within the electrolyzer or fuel cell, or by crosslinking the polymer with crosslinkers such as those described above. For example, functional groups on a polymer of the invention such as bromoalkyl groups can be reacted with functional groups on a membrane, such as amine groups, to bind the polymer ionomer to the membrane.

When polymers of the invention are used as a membrane, it is preferred that the water uptake of the polymer ranges from about 20 to about 50% to maintain the mechanical strength of the membrane.

The poly(aryl alkylene) polymers or poly(aryl-crown ether-alkylene) polymers can be used in HEMFCs such as a typical fuel cell 10 as shown in FIG. 1A. FIG. 1A illustrates a typical fuel cell 10 with an anode portion 12 (illustrated on the left) and a cathode portion 14 (illustrated on the right) which are separated by an electrolyte membrane 16. The electrolyte membrane 16 can be any membrane comprising any of the poly(aryl alkylene) polymers or poly(aryl-crown ether-alkylene) polymers as described herein, and can be a reinforced membrane. Supporting members are not illustrated. The anode portion carries out an anode half-reaction which oxidizes fuel releasing electrons to an external circuit and producing oxidized products. The cathode portion carries out a cathode half-reaction which reduces an oxidizer consuming electrons from the external circuit. The gas diffusion layers (GDLs) 18 and 20 serve to deliver the fuel 22 and oxidizer 24 uniformly across the respective catalyst layers 26 and 28. Charge neutrality is maintained by a flow of ions from the anode to the cathode for positive ions and from cathode to anode for negative ions. The dimensions illustrated are not representative, as the electrolyte membrane is usually selected to be as thin as possible while maintaining the membrane's structural integrity.

In the case of the illustrated hydroxide exchange membrane fuel cell (HEMFC), the anode half-reaction consumes fuel and OH— ions and produces waste water (as well as carbon dioxide in the case of carbon containing fuels). The cathode half reaction consumes oxygen and produces OH— ions, which flow from the cathode to the anode through the electrolyte membrane. Fuels are limited only by the oxidizing ability of the anode catalyst and typically include hydrogen gas, methanol, ethanol, ethylene glycol, and glycerol. Preferably, the fuel is H2 or methanol. Catalysts are usually platinum (Pt), silver (Ag), or one or more transition metals, e.g., Ni. In the case of a PEMFC, the anode half-reaction consumes fuel and produces H+ ions and electrons. The cathode half reaction consumes oxygen, H+ ions, and electrons and produces waste water, and H+ ions (protons) flow from the anode to the cathode through the electrolyte membrane.

It can, therefore, be appreciated how an electrolyte membrane made from a poly(aryl alkylene) polymer or poly(aryl-crown ether-alkylene) polymer significantly improves fuel cell performance. First, greater fuel cell efficiency requires low internal resistance, and therefore, electrolyte membranes with greater ionic conductivity (decreased ionic resistance) are preferred. Second, greater power requires greater fuel cell currents, and therefore, electrolyte membranes with greater ion-current carrying capacity are preferred. Also, practical electrolyte membranes resist chemical degradation and are mechanically stable in a fuel cell environment, and also should be readily manufactured.

Figure 1B:
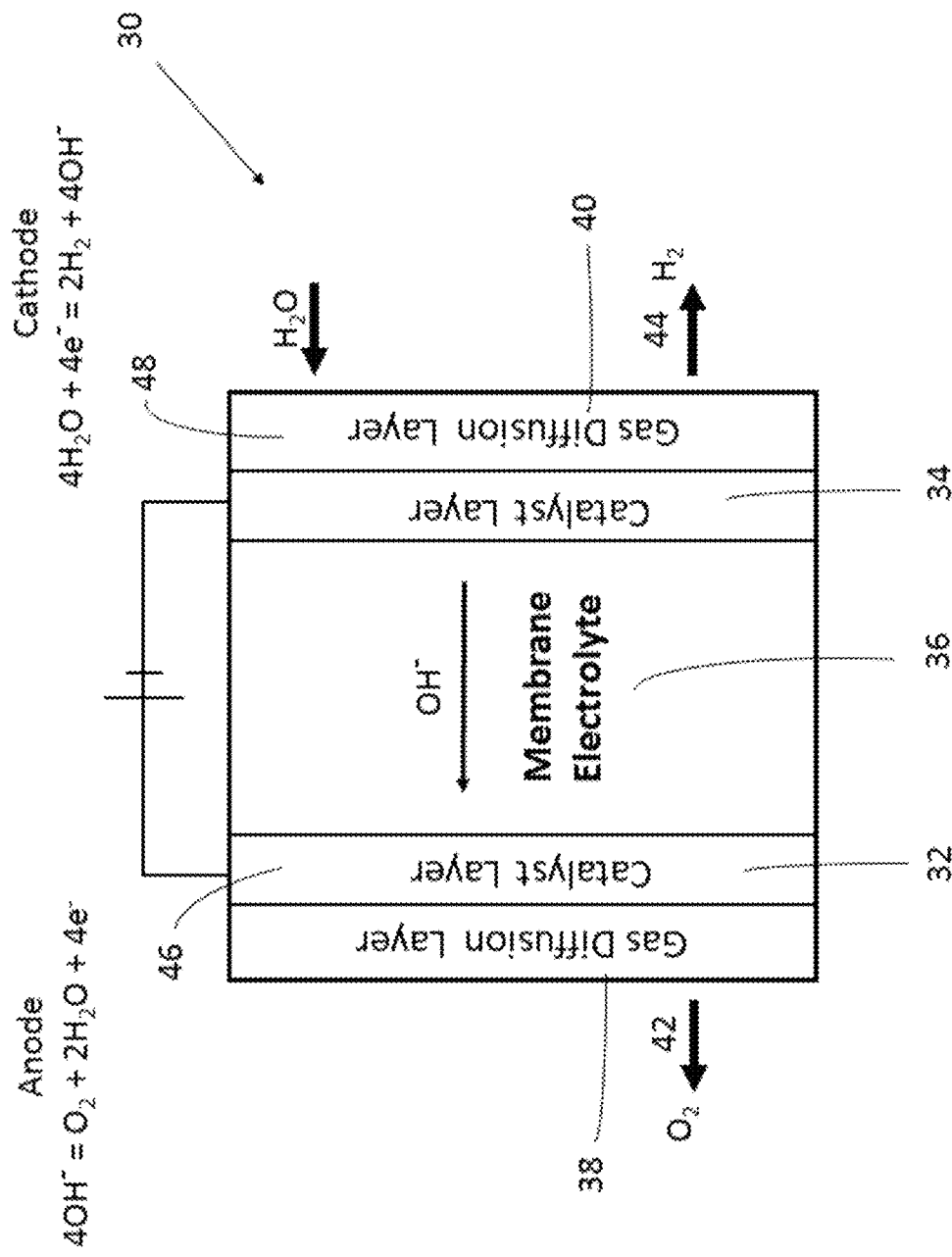
FIG. 1B illustrates an exemplary hydroxide exchange membrane electrolyzer.

The poly(aryl alkylene) polymers or poly(aryl-crown ether-alkylene) polymers can be used in HEMELs such as an electrolyzer 30 as shown in FIG. 1B. FIG. 1B illustrates an electrolyzer 30 with an anode portion 32 (illustrated on the left) and a cathode portion 34 (illustrated on the right) which are separated by an electrolyte membrane 36. The electrolyte membrane 36 can be any membrane comprising any of the poly(aryl alkylene) polymers or poly(aryl-crown ether-alkylene) polymers as described herein, and can be a reinforced membrane. Supporting members are not illustrated. The anode portion carries out an anode half-reaction which oxidizes ions releasing electrons to an external circuit and producing oxidized products. The cathode portion carries out a cathode half-reaction which reduces an oxidizer consuming electrons from the external circuit. The gas diffusion layers (GDLs) 38 and 40 serve to release the oxidizer 42 and fuel 44 uniformly across the respective catalyst layers 46 and 48. Charge neutrality is maintained by a flow of ions from the anode to the cathode for positive ions and from cathode to anode for negative ions. The dimensions illustrated are not representative, as the electrolyte membrane is usually selected to be as thin as possible while maintaining the membrane's structural integrity.

In the case of the illustrated hydroxide exchange membrane fuel cell (HEMFC), the anode half-reaction consumes OH— ions and produces oxygen. The cathode half reaction consumes water and produces hydrogen and OH— ions, which flow from the cathode to the anode through the electrolyte membrane. Fuels are limited only by the oxidizing ability of the cathode catalyst and typically include hydrogen gas, methanol, ethanol, ethylene glycol, and glycerol. Preferably, the fuel is $H_2$ or methanol. Catalysts are usually platinum (Pt), silver (Ag), or one or more transition metals, e.g., Ni.

It can, therefore, be appreciated how an electrolyte membrane made from a poly(aryl alkylene) polymer or poly(aryl-crown ether-alkylene) polymer significantly improves electrolyzer performance. First, greater electrolyzer efficiency requires low internal resistance, and therefore, electrolyte membranes with greater ionic conductivity (decreased ionic resistance) are preferred. Second, greater fuel production requires greater electrolyzer currents, and therefore, electrolyte membranes with greater ion-current carrying capacity are preferred. Also, practical electrolyte membranes resist chemical degradation and are mechanically stable in an electrolyzer environment, and also should be readily manufactured.

Although a principal application for the poly(aryl alkylene) polymers or poly(aryl-crown ether-alkylene) polymers is for energy conversion such as in use in anion exchange membranes, hydroxide exchange membranes, anion exchange membrane fuel cells, and hydroxide exchange membrane fuel cells, the anion/hydroxide exchange ionomers and membranes can be used for many other purposes such as use in fuel cells (e.g., hydrogen/alcohol/ammonia fuel cells); electrolyzers (e.g., water/carbon dioxide/ammonia electrolyzers), electrodialyzers; ion-exchangers; solar hydrogen generators; desalinators (e.g., desalination of sea/brackish water); demineralizers (e.g., demineralization of water); water purifiers (e.g., ultra-pure water production); waste water treatment systems; concentration of electrolyte solutions in the food, drug, chemical, and biotechnology fields; electrolysis (e.g., chlor-alkali production and H2/O2 production); energy storage (e.g., super capacitors, metal air batteries and redox flow batteries); sensors (e.g., pH/RH sensors); and in other applications where an anion-conductive ionomer is advantageous.

Also provided is a reinforced electrolyte membrane, optionally configured and sized to be suitable for use in a fuel cell, electrolyzer, electrodialyzer, solar hydrogen generator, flow battery, desalinator, sensor, demineralizer, water purifier, waste water treatment system, ion exchanger, or $CO_2$ separator. The membrane comprises a porous substrate impregnated with the anion exchange polymer.

Having described the invention in detail, it will be apparent that modifications and variations are possible without departing from the scope of the invention defined in the appended claims.

EXAMPLES

The following non-limiting examples are provided to further illustrate the present invention.

Example 1

An imidazolium-tethered poly(aryl alkylene) polymer was prepared from 7-bromo-1,1,1-trifluoroheptan-2-one, 1,1,1-trifluoroacetone and biphenyl (referred to as BP-CF3-IM-x, wherein x is the mole ratio of 7-bromo-1,1,1-trifluoroheptan-2-one to biphenyl and is from 1 to 100). BP-CF3-IM-x was prepared by three major steps: (1) synthesis of a bromide-functionalized polymer, (2) synthesis of an imidazolium-functionalized polymer, and (3) membrane casting and hydroxide exchange. The reaction scheme is depicted below, wherein n is the number of repeat units in the polymer:

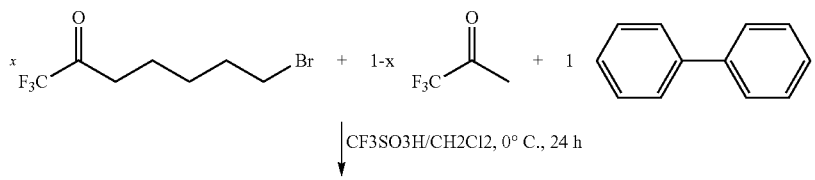

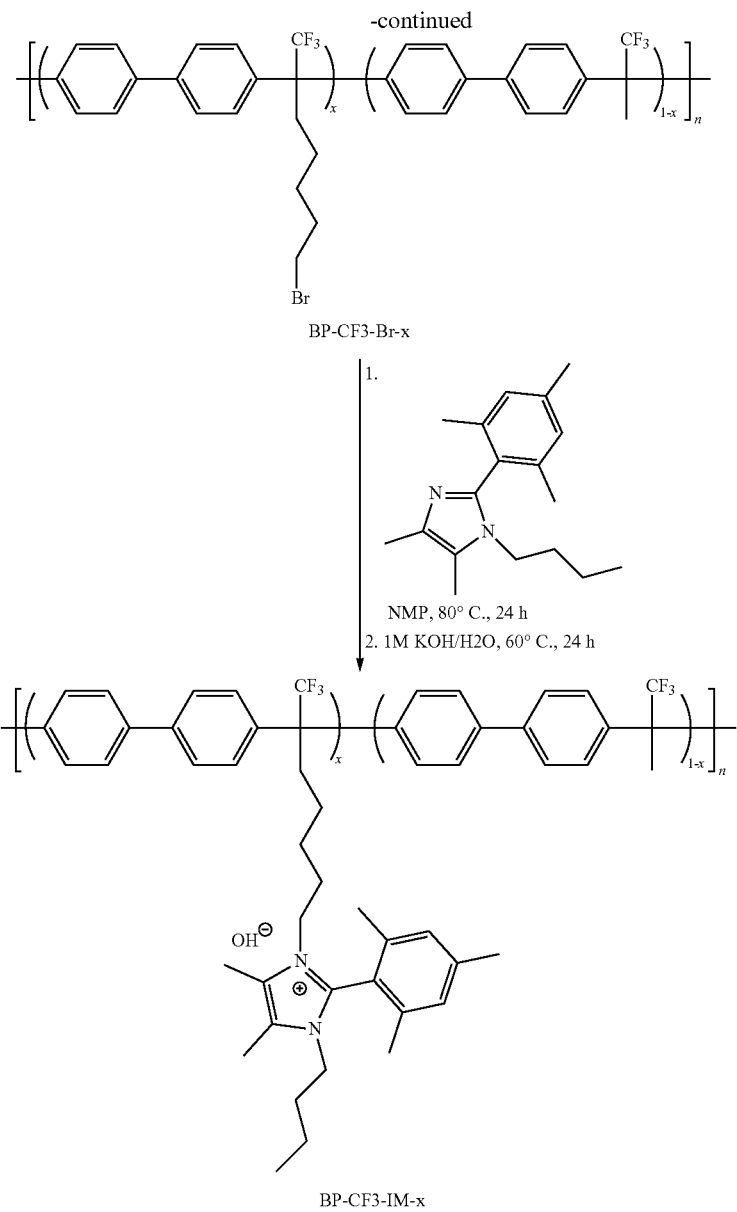

BP-CF3-Br-x

Figure 2:
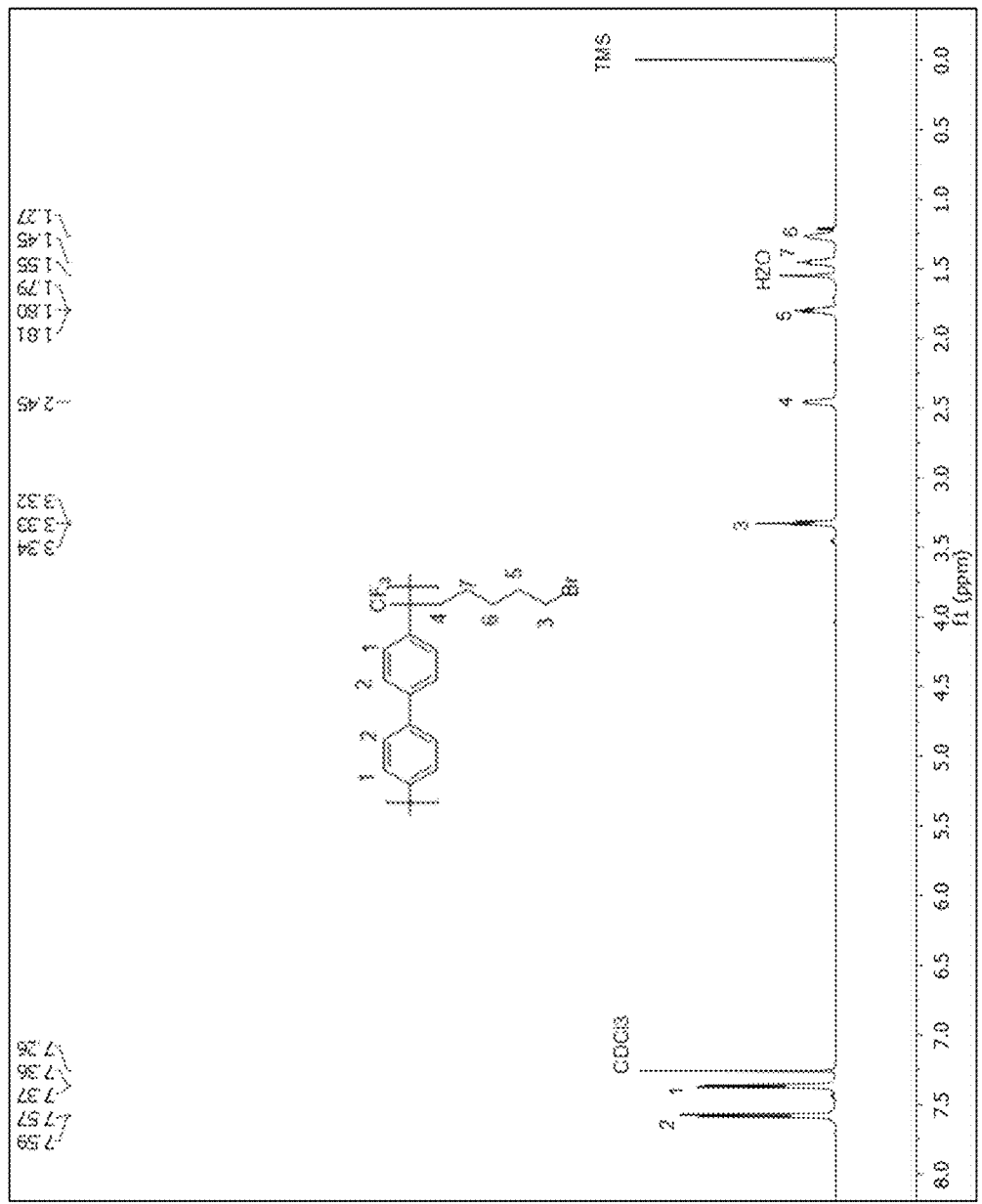
FIG. 2 depicts an 1H NMR spectrum of BP-CF3-Br-1 in CDCl3.

BP-CF3-IM-x (1) Synthesis of the bromide-functionalized polymer (BP-CF3-Br-1). To a 100 mL three-necked flask equipped with overhead mechanical stirrer, 7-bromo-1,1,1-trifluoroheptan-2-one (3.000 g, 12.1 mmol) and biphenyl (1.560 g, 10.1 mmol) were dissolved into methylene chloride (6.7 mL). Trifluoromethanesulfonic acid (TFSA) (6.7 mL) were then added dropwise over 30 minutes at 0° C. Thereafter, the reaction was continued at this temperature for 24 hours. The resulting viscous, brown solution was poured slowly into ethanol. The precipitated solid was filtered, washed with water and immersed in 1 M $K_2CO_3$ at room temperature for 12 hours. Finally, the product was filtered, washed with water and dried completely at 60° C. under vacuum. The yield of the polymer was nearly 100%. $^1H$ NMR ($CDCl_3$, ·, ppm): 7.58 ($H_2$, 4H), 7.36 ($H_1$, 4H), 3.33 ($H_3$, 2H), 2.45 ($H_4$, 2H), 1.80 ($H_5$, 2H), 1.45 ($H_7$, 2H) and 1.27 ($H_6$, 2H) (see FIG. 2).

Figure 3:
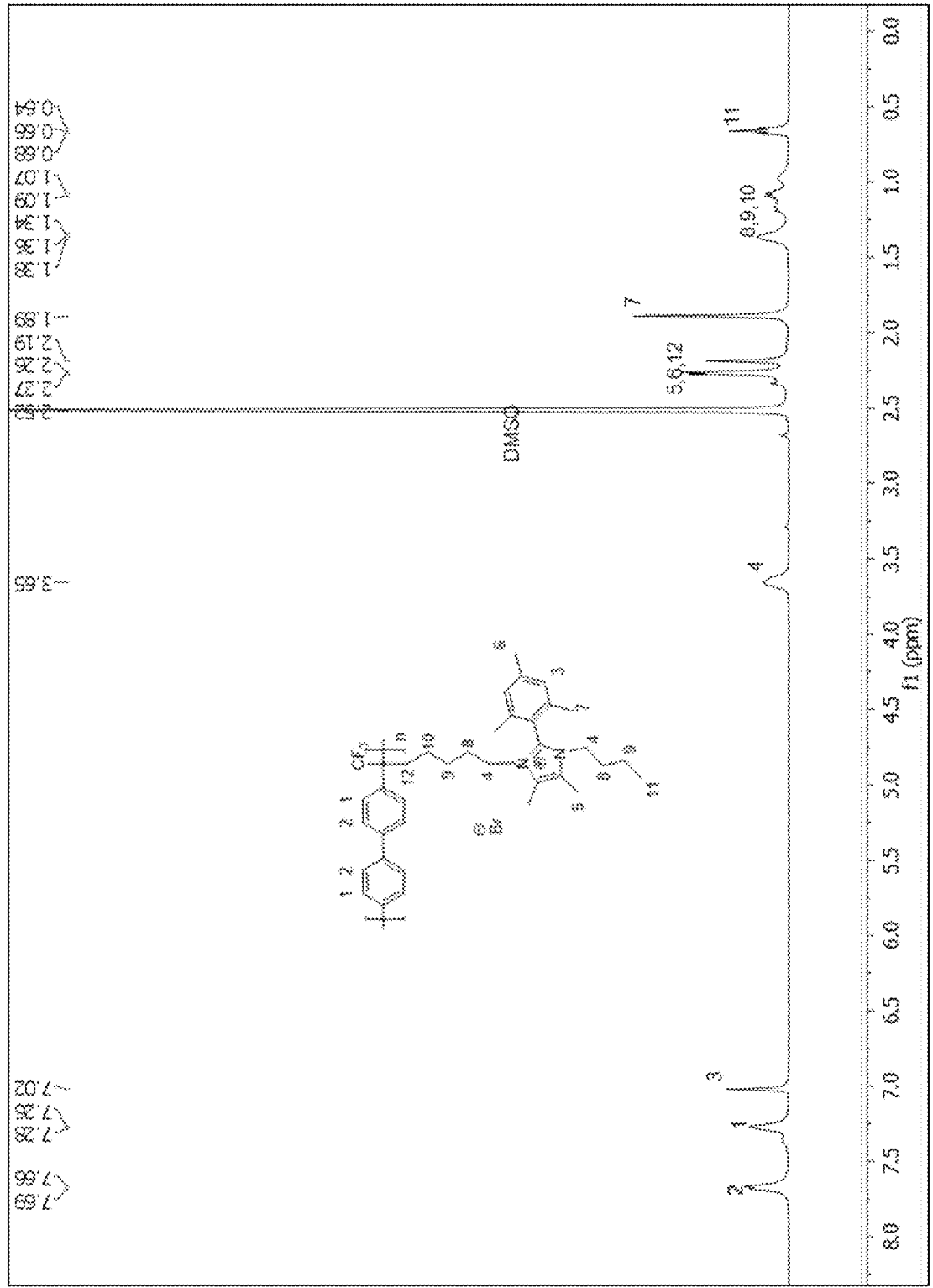
FIG. 3 depicts an 1H NMR spectrum of BP-CF3-IM-1 in DMSO-d6.

(2) Synthesis of imidazolium-functionalized polymer (BP-CF3-IM-1). To a 50 mL one-necked flask equipped with magnetic bar, the bromide-functionalized polymer (2.0 g, 5.2 mmol) and the imidazole (1.7 g, 6.3 mmol) were added into NMP (37 mL). The solution was stirred over 12 hours 75° C. The resulting yellow solution was used to cast a membrane. The membrane was washed consequently three times with hydrochloride solution (pH 1) and DI water, and dried completely at 60° C. under vacuum. The yield of the polymer BP-CF3-IM-1 was almost 100%. 1H NMR (DMSO-d6, ·, ppm): 7.70 (H2, 4H), 7.29 (H1, 4H), 7.02 (H3, 2H), 3.67 (H4, 4H), 2.27-2.19 (H5, H6, H12, 11H), 1.89 (H7, 6H), 1.38-1.07 (H8, H9, H10, 10H), 0.68 (H11, 3H) (see FIG. 3).

(3) BP-CF3-IM-1 membrane casting and hydroxide exchange. Membrane was prepared by dissolving the BP-CF3-IM-1 polymer (1.0 g) in NMP (10 mL) and casting on a clear glass plate at 80° C. for 8 hours. The membrane (in bromide form) was peeled off from a glass plate in contact with deionized (DI) water. The membrane in hydroxide form was obtained by ion exchange in 1 M KOH at 60°

C. for 24 hours, followed by washing and immersion in DI water for 48 hours under argon to remove residual KOH.

Other BP-CF3-IM-x membranes are prepared by using different mole ratios of 7-bromo-1,1,1-trifluoroheptan-2-one to biphenyl.

Figure 4A:
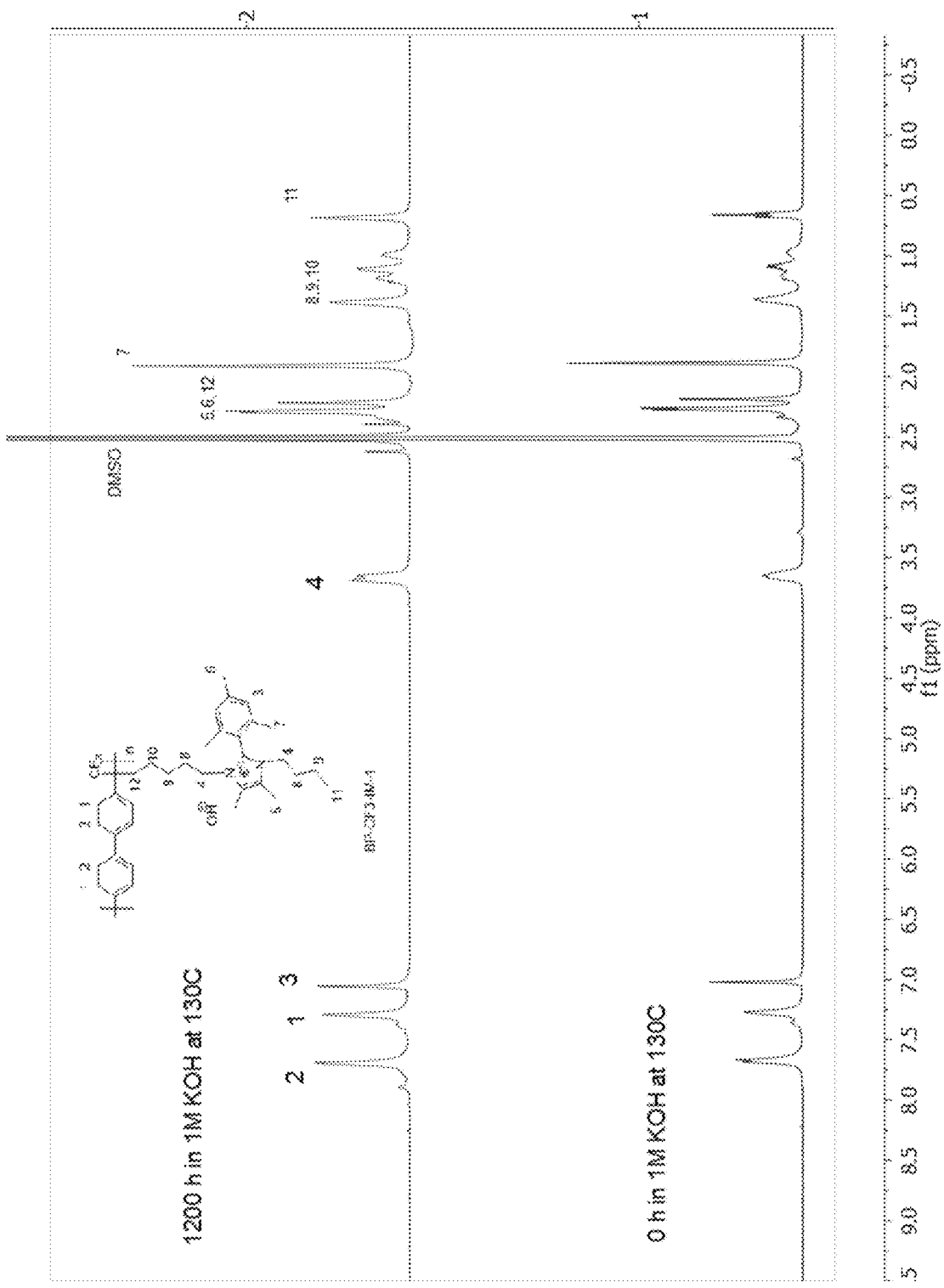
FIG. 4A shows 1H NMR spectra of BP-CF3-IM-1 before and after an alkaline stability test for 1200 hours at 130° C. in 1M KOH (10% TFA in DMSO-d6).
Figure 4B:
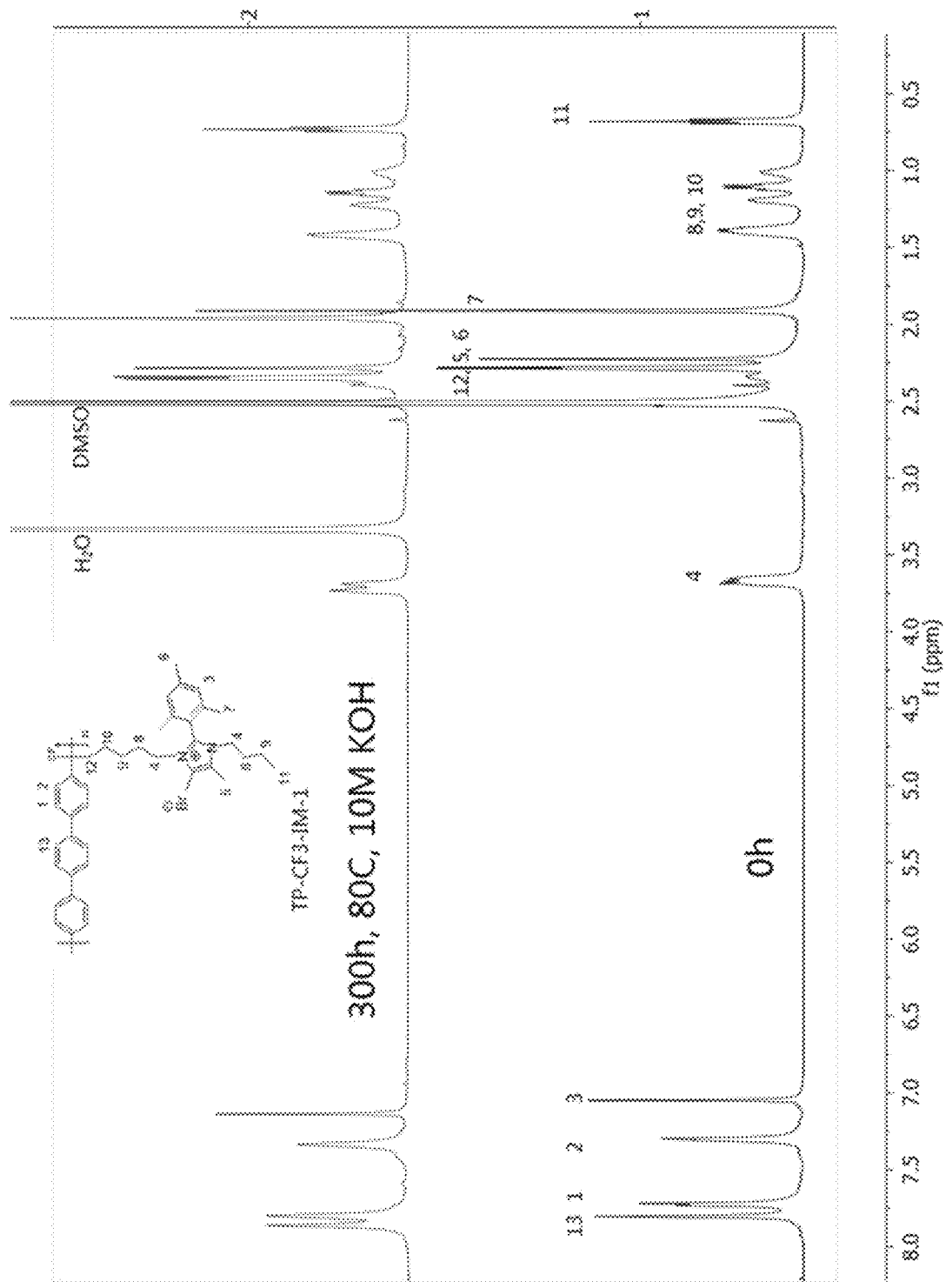
FIG. 4B shows 1H NMR spectra of TP-CF3-IM-1 before and after an alkaline stability test for 300 hours at 80° C. in 10M KOH. (in DMSO-d6).
Figure 4C:
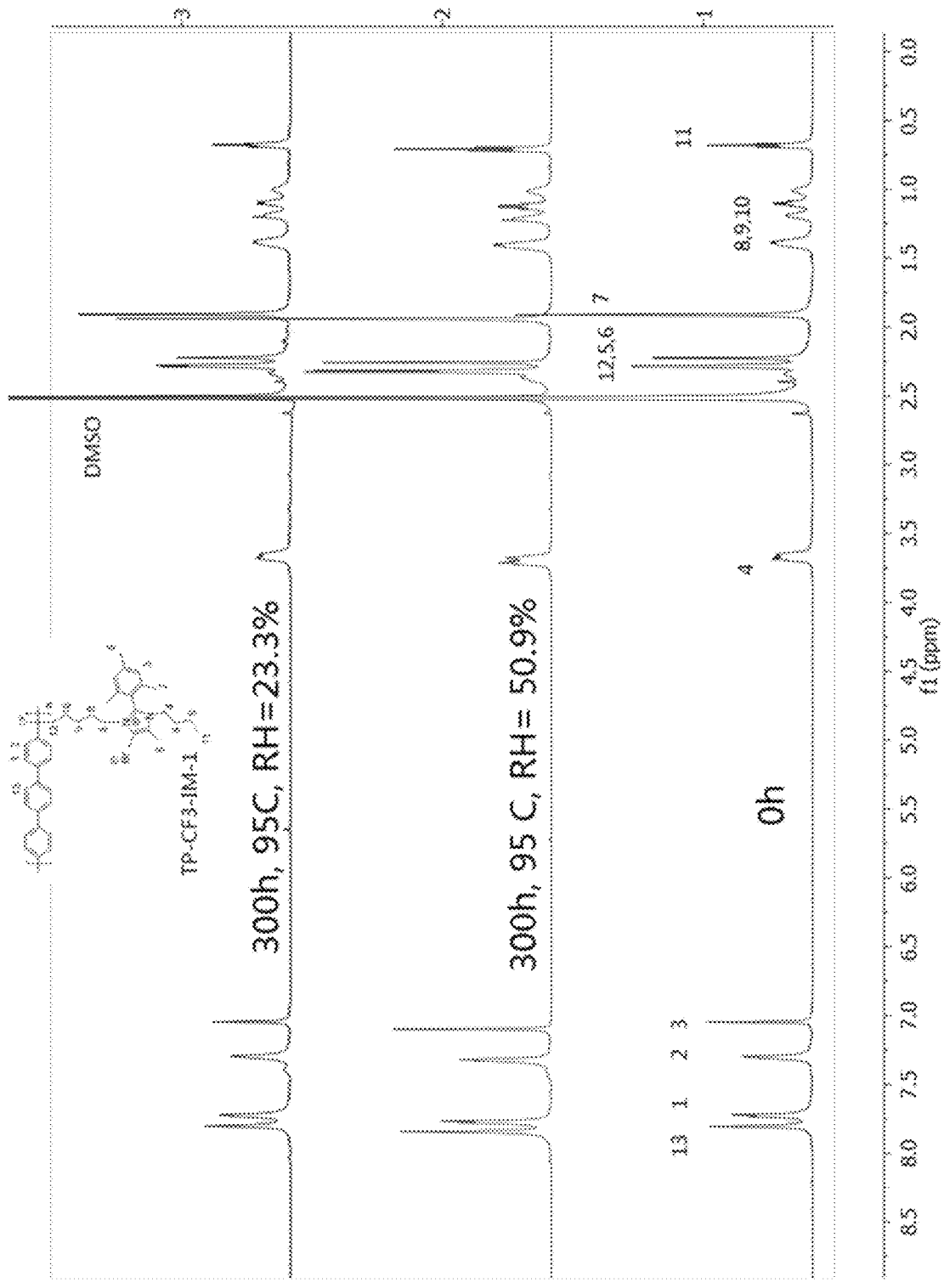
FIG. 4C shows 1H NMR spectra of TP-CF3-IM-1 before and after an alkaline stability test for 300 hours at 95° C. with RH of 50.9% and 23.3%, respectively. (10% TFA in DMSO-d6).

(4) Alkaline stability. Alkaline stability of the imidazolium containing polymer was evaluated under various conditions to probe its high chemical stability. BP-CF3-IM-1 membrane was immersed into 1 M KOH water solution at 130° C. for 1200 h and the 1H NMR spectra showed no change before and after the alkaline test (FIG. 4A). TP-CF3-IM-1 membrane was immersed into 10 M KOH solution at 80° C. for 300 h and no degradation was observed based on the 1H NMR spectra shown in FIG. 4B. Moreover, TP-CF3-IM-1 membrane kept for 300 h at 95° C. under low relative humidity (RH) of 23.3% and 50.9%, respectively, also did not shown sign of degradation as shown in FIG. 4C. These results strongly suggested that highly alkaline stable imidazolium cation tethered to a rigid poly(aryl alkylene) polymer backbone structure can indeed yield remarkable chemical stability HEMs.

(5) Water uptake and hydroxide conductivity. An ideal material for HEMs/HEIs should have good ion conductivity with low water uptake. All membranes are expected to show very high conductivity in pure water. For example, at 20° C. the hydroxide conductivity of a BP-CF3-IM-x polymer is expected to be much greater than PSFQN (the benchmark HEM) which has an IEC value of 36 mS/cm. PSFQN is derived from benzyl trimethyl ammonium polysulfone and has the formula:

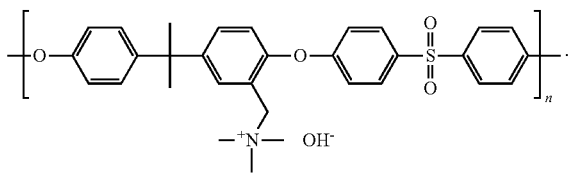

Increasing the temperature also enhances the hydroxide conductivity of the membrane samples.

(6) Solubility and mechanical properties. The BP-CF3-IM-x polymers are expected to exhibit excellent solubility in dimethylformamide, N-methylpyrrolidone, dimethyl sulfoxide, and isopropanol/water (1/1 weight ratio), but are expected not to dissolve in pure water and isopropanol.

(7) Hydroxide exchange membrane fuel cell (HEMFC) performance. Although BP-CF3-IM-x polymer membranes are expected to have superior chemical stability, hydroxide conductivity, low water uptake, good solubility and mechanical properties, the most practical evaluation of these materials is their performance in HEMFC single cells as an HEI in the catalyst layer and as the HEM. Membrane-electrode assemblies (MEAs) can be fabricated by depositing 5 cm$^2$ electrode onto both sides of a BP-CF3-IM-x polymer membrane with a robotic sprayer (Sono-Tek ExactaCoat). The electrode ink is prepared by adding 250 mg of catalyst (Tanaka Kikinzoku Kogyo, or TKK, 50% Pt on high-surface-area C) and a desired amount of ionomer (a BP-CF3-IM-x polymer, prepared by dissolving the BP-CF3-IM-x polymer in a water and isopropanol mixture) to 10 g of water and 10 g of isopropanol, followed by sonicating for 1 hour. The catalyst loading is 0.4 mg Pt/cm$^2$. The sandwich is completed by adding a rubber gasket, a GDL (SGL25CC), and a graphite flow field (ElectroChem) to each side of the MEA. Performance is characterized with a fuel cell test system equipped with a back pressure module (Scribner 850e). Normally, the cell is activated for 30 minutes at 100 mA/cm$^2$ and another 30 minutes at 200 mA/cm$^2$. After activation, performance is recorded by scanning current.

Example 2

An imidazolium-tethered poly(aryl alkylene) polymer was prepared from 7-bromo-1,1,1-trifluoroheptan-2-one, 1,1,1-trifluoroacetone and p-terphenyl (referred to as TP-CF3-IM-x, wherein x is the mole ratio of 7-bromo-1,1,1-trifluoroheptan-2-one to p-terphenyl and is from 1 to 100). TP-CF3-IM-x was prepared by three major steps: (1) synthesis of a bromide-functionalized polymer, (2) synthesis of an imidazolium-functionalized polymer, and (3) membrane casting and hydroxide exchange. The reaction scheme is depicted below, wherein n is the number of repeat units in the polymer:

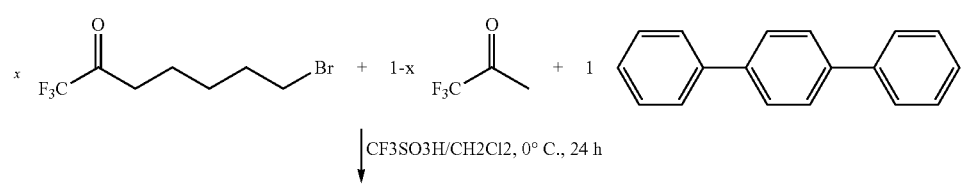

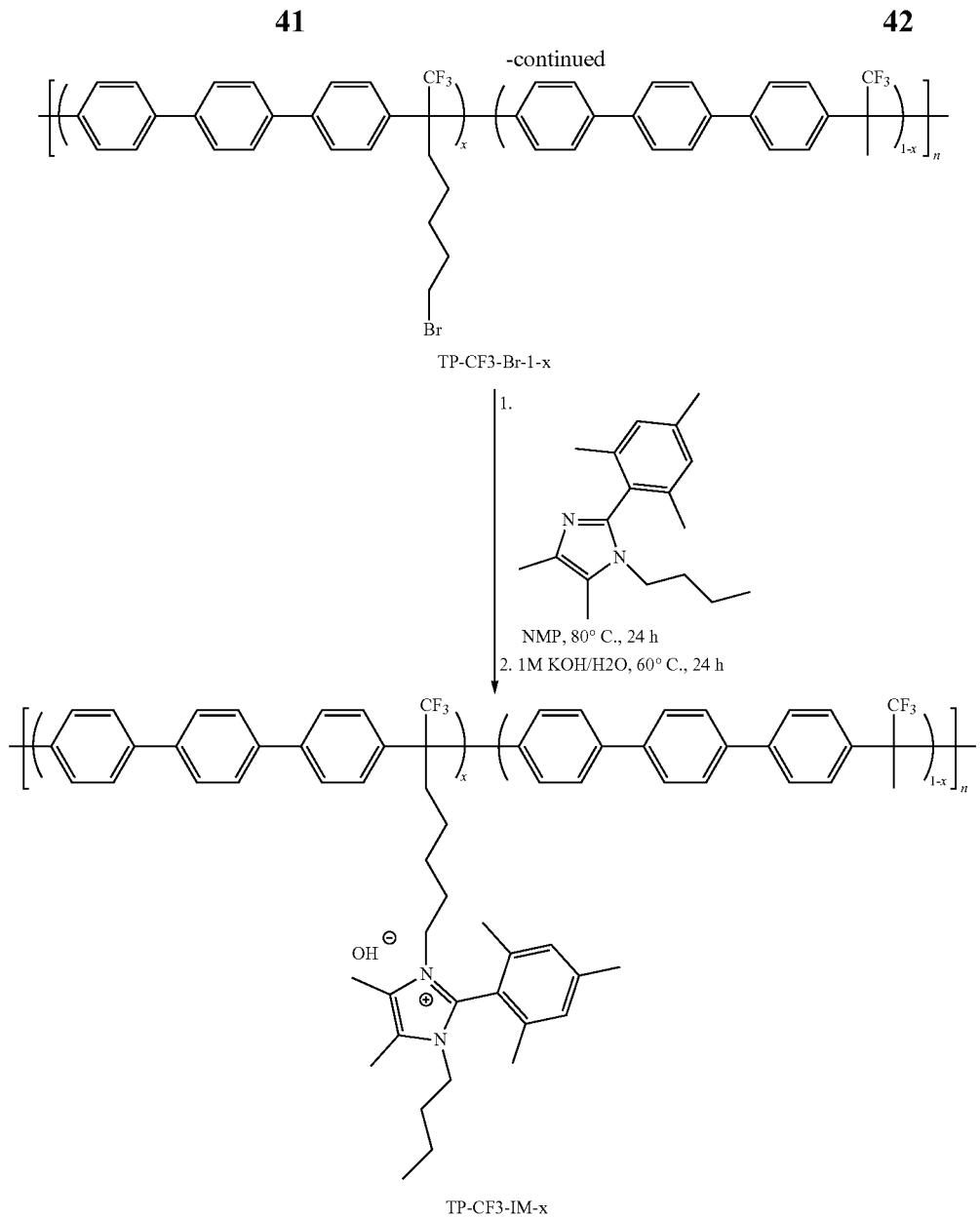

Figure 5:
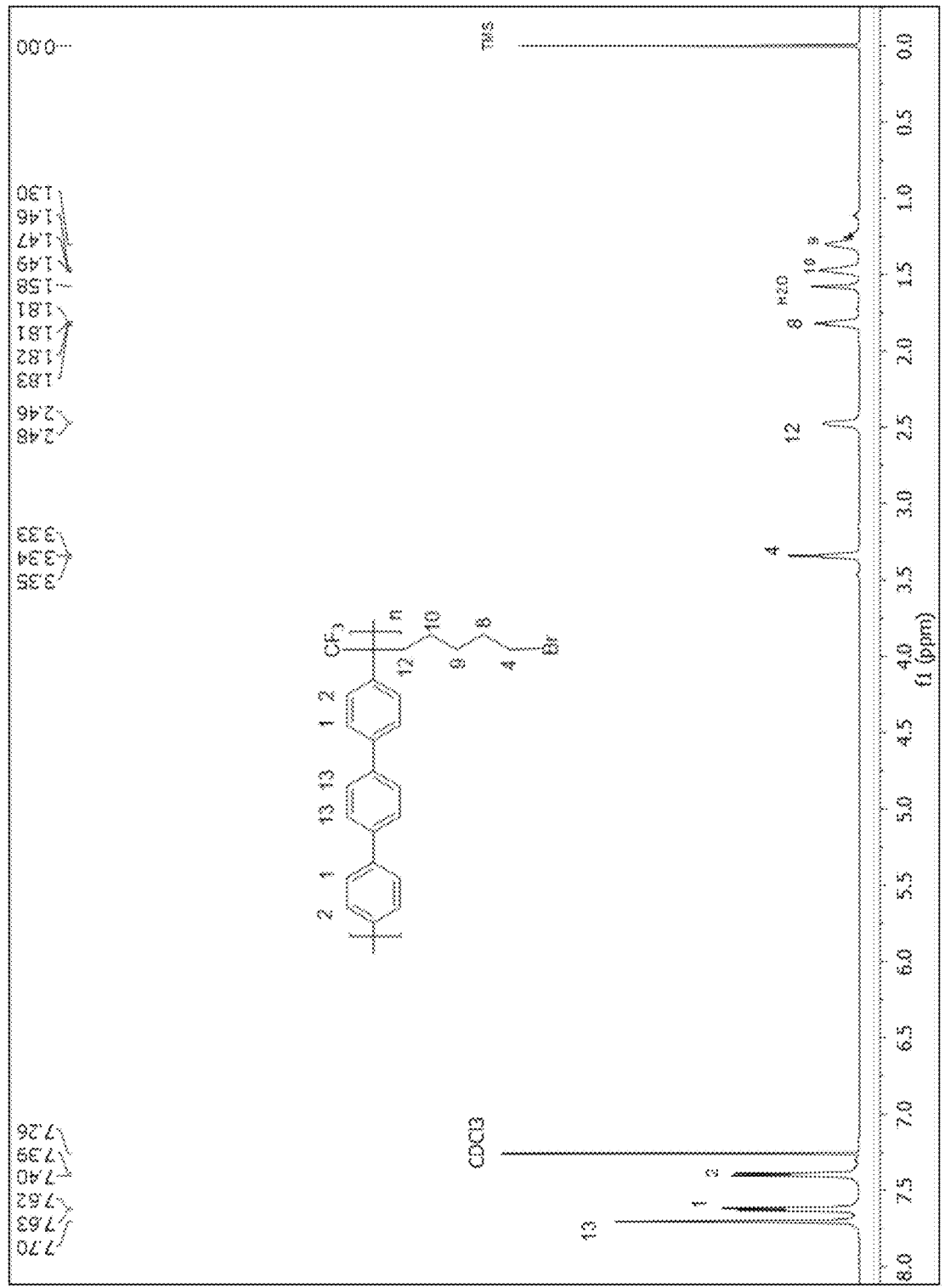
FIG. 5 depicts an 1H NMR spectrum of TP-CF3-Br-1 in CDCl3.

TP-CF3-IM-x (1) Synthesis of a bromide-functionalized polymer (TP-CF3-Br-1). To a 100 mL three-necked flask equipped with overhead mechanical stirrer, 7-bromo-1,1,1-trifluoroheptan-2-one (3.600 g, 14.6 mmol) and p-terphenyl (2.797 g, 12.1 mmol) were dissolved into methylene chloride (30 mL). Trifluoromethanesulfonic acid (TFSA) (30 mL) was then added dropwise over 30 minutes at 0° C. Thereafter, the reaction was continued at this temperature for 24 hours. The resulting viscous, brown solution was poured slowly into ethanol. The precipitated solid was filtered, washed with water and immersed in 1 M $K_2CO_3$ at room temperature for 12 hours. Finally, the product was filtered, washed with water and dried completely at 60° C. under vacuum. The yield of the polymer was nearly 100%. $^1$H NMR ($CDCl_3$, ·, ppm): 7.70 ($H_{13}$, 4H), 7.62 ($H_1$, 4H), 7.40 ($H_2$, 4H), 3.34 ($H_4$, 2H), 2.47 ($H_{12}$, 2H), 1.82 ($H_8$, 2H), 1.47 ($H_{10}$, 2H), 1.30 ($H_9$, 2H) (FIG. 5).

Figure 6:
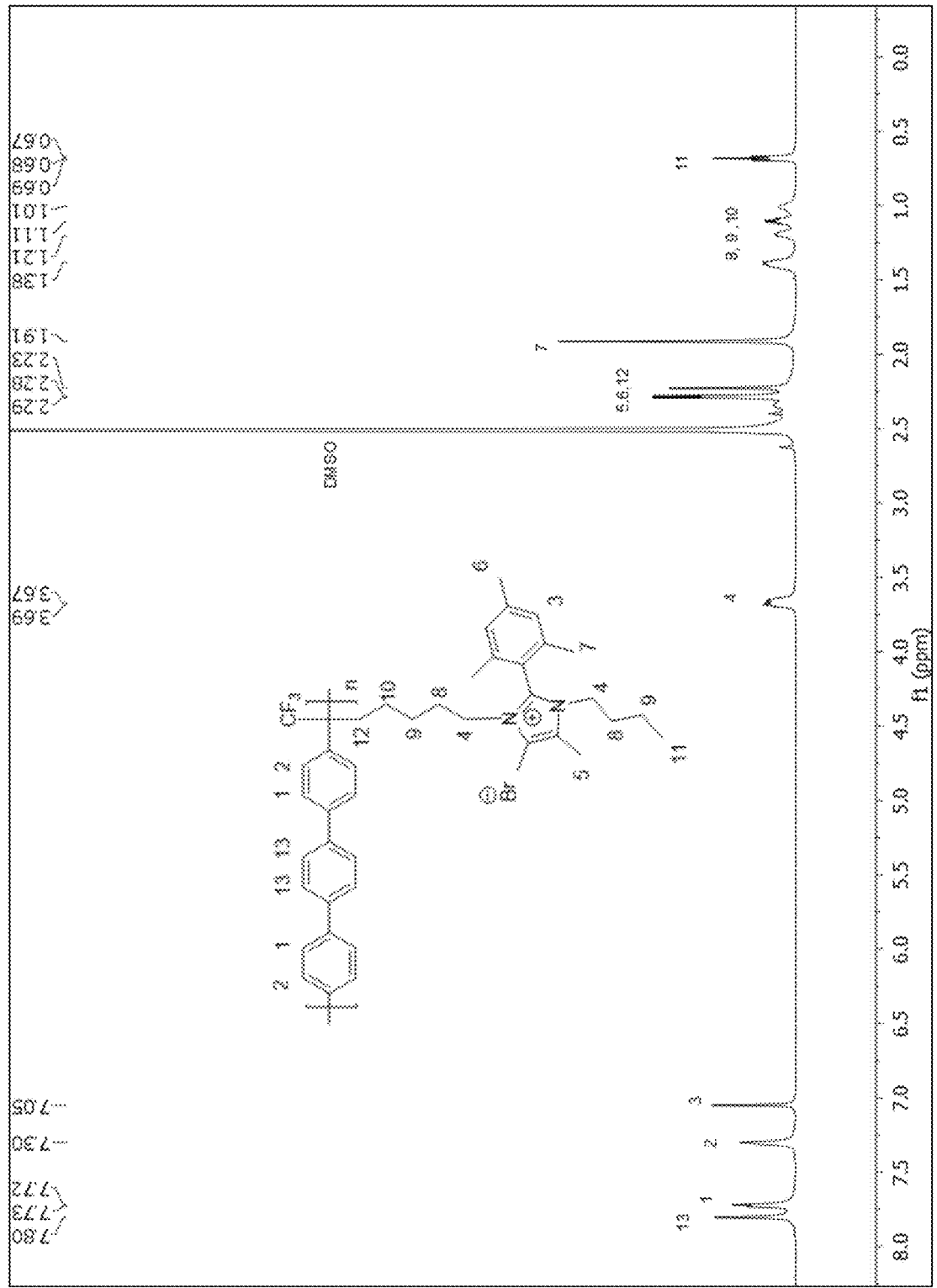
FIG. 6 shows an 1H NMR spectrum of TP-CF3-IM-1 in DMSO-d6.
Figure 7:
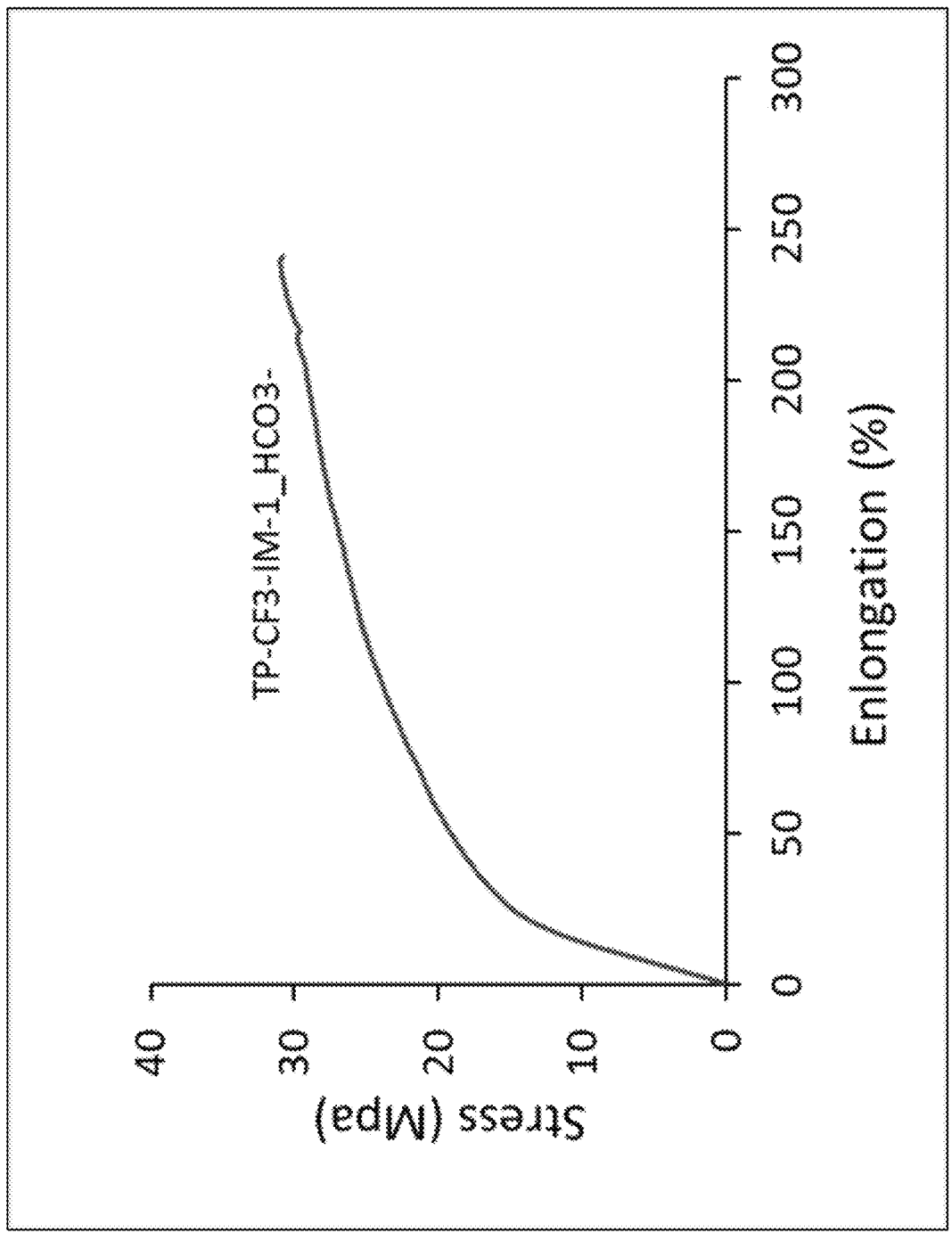
FIG. 7 is a graph depicting tensile stress as a function of elongation for TP-CF3-IM-1 polymers in bicarbonate form.

(2) Synthesis of imidazolium-functionalized polymer (TP-CF3-IM-1). To a 50 mL one-necked flask equipped with magnetic bar, the bromide-functionalized polymer (2.0 g, 4.4 mmol) and the functionalized imidazole (1.5 g, 5.5 mmol) were added into NMP (25 mL). The solution was stirred over 12 hours 75° C. The resulting yellow solution was used to cast a membrane. The membrane was washed consequently three times with hydrochloride solution (PH=1) and DI water, and dried completely at 60° C. under vacuum. The yield of the polymer TP-CF3-IM-x was almost 100%. 1H NMR (DMSO-d6, ·, ppm): 7.80 (H13, 4H), 7.72 (H1, 4H), 7.30 (H2, 4H), 7.05 (H3, 4H), 3.69-3.67 (H4, 4H), 2.29-2.23 (H5, H6, H12, 11H), 1.91 (H7, 6H), 1.38-1.01 (H8, H9, H10, 10H), 0.68 (H11, 3H) (FIG. 6).

(3) TP-CF3-IM-x membrane casting and hydroxide exchange. Membrane was prepared by dissolving the TP-CF3-IM-x polymer (1.0 g) in NMP (10 mL) and casting on a clear glass plate at 80° C. for 8 hours. The membrane (in bromide form) was peeled off from a glass plate in contact with deionized (DI) water. The membrane in hydroxide form was obtained by ion exchange in 1 M KOH at 60°

C. for 24 hours, followed by washing and immersion in DI water for 48 hours under argon to remove residual KOH.

(4) Water uptake and hydroxide conductivity. When x=1, TP-CF3-IM-1 has conductivity of 31.4 mS/cm at 20° C. It has low water uptake and dimensional swelling ratio in bicarbonate form (as shown in Table 1) in pure water from 20° C. to 80° C.

TABLE 1

Water uptake and dimensional swelling ratio of TP-CF3-IM-1 membrane

| Temperature (° C.) | Water uptake (%) | Swelling ratio (%) |
|---|---|---|
| 20 | 43 | 21 |
| 80 | 47 | 28 |

Figure 8:
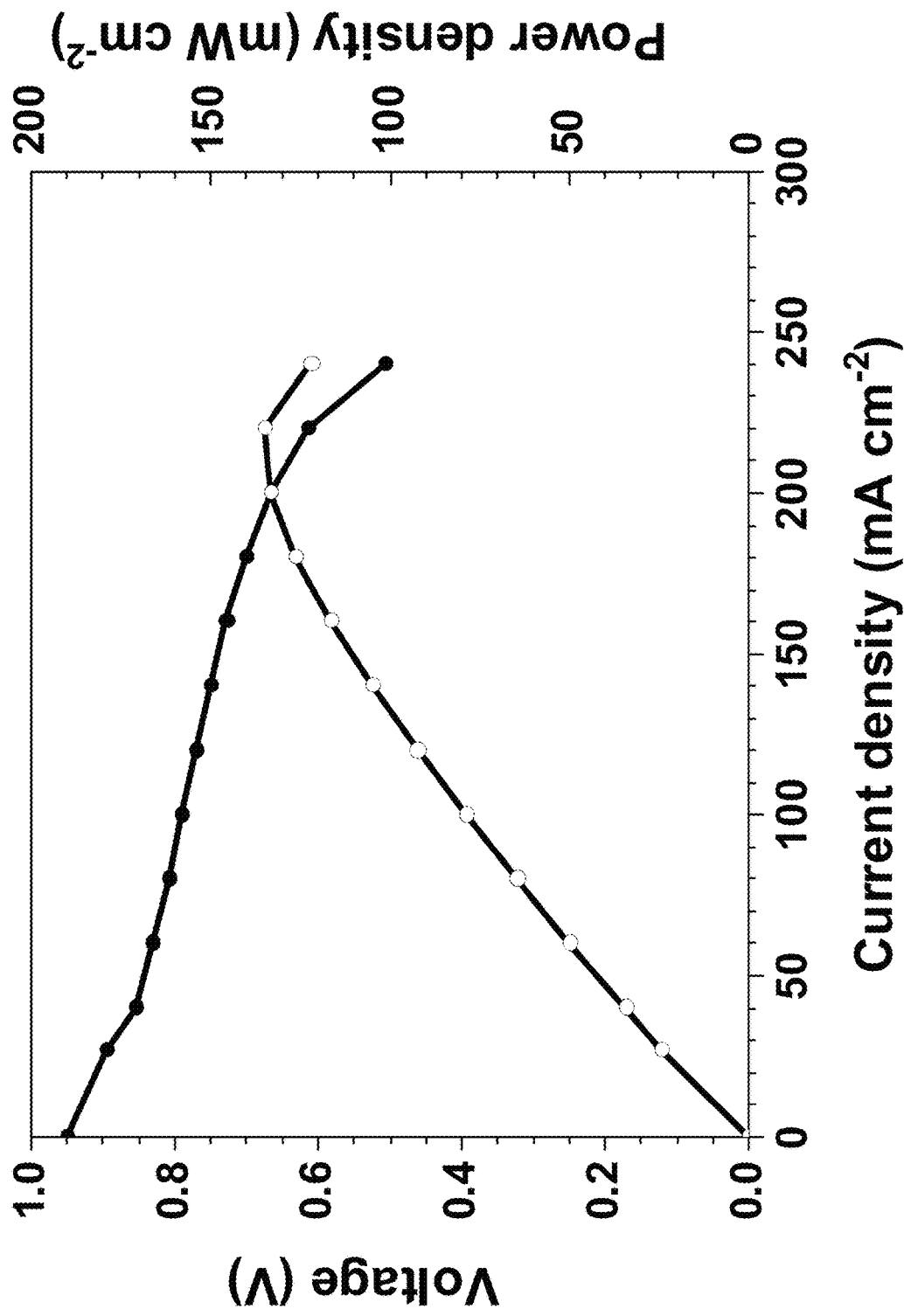
FIG. 8 illustrates polarization (voltage as a function of current density) and power density (power density as a function of current density) curves of an HEMFC at 95° C. Materials: TP-CF3-IM-1 membrane, ionomer loading of 20%, catalyst: 0.4 mgPt cm·2 PtRu/C on anode, 0.4 mgPt cm·2 PtRu/C on cathode. Test conditions: 95° C., anode humidifier temperature: 90° C., cathode anode humidifier temperature: 97° C., $H_2$ flow rate: 1.0 L/min, $O_2$ flow rate: 2.0 L/min.

(5) Hydroxide exchange membrane fuel cell (HEMFC) performance. Although TP-CF3-IM-x polymer membranes are expected to have superior chemical stability, hydroxide conductivity, low water uptake, good solubility and mechanical properties, the most practical evaluation of these materials is their performance in HEMFC single cells as an HEI in the catalyst layer and as the HEM. Membrane-electrode assemblies (MEAs) can be fabricated by depositing 5 cm$^2$ electrode onto both sides of a TP-CF3-IM-x polymer membrane with a robotic sprayer (Sono-Tek ExactaCoat). The electrode ink is prepared by adding 250 mg of catalyst (Tanaka Kikinzoku Kogyo, or TKK, 50% Pt on high-surface-area C) and a desired amount of ionomer (a TP-CF3-IM-x polymer, prepared by dissolving the BP-CF3-IM-x polymer in a water and isopropanol mixture) to 10 g of water and 10 g of isopropanol, followed by sonicating for 1 hour. The catalyst loading is 0.4 mg$_{Pt}$ cm$^{-2}$ PtRu/C on anode, 0.4 mg$_{Pt}$ cm$^{-2}$ PtRu/C on cathode. The sandwich is completed by adding a rubber gasket, a GDL (SGL25CC), and a graphite flow field (ElectroChem) to each side of the MEA. Performance is characterized with a fuel cell test system equipped with a back pressure module (Scribner 850e) (Materials: TP100-CF3-IM-1 membrane, ionomer loading of 20%, catalyst: 0.4 mg$_{Pt}$ cm$^{-2}$ PtRu/C on anode, 0.4 mg$_{Pt}$ cm$^{-2}$ PtRu/C on cathode. Test conditions: 95° C., anode humidifier temperature: 90° C., cathode anode humidifier temperature: 97° C., H$_2$ flow rate: 1.0 L/min, O$_2$ flow rate: 2.0 L/min.). Normally, the cell is activated for 30 minutes at 100 mA/cm$^2$ and another 30 minutes at 200 mA/cm$^2$. After activation, performance is recorded by scanning current. Results are shown in FIG. 8.

Figure 9:
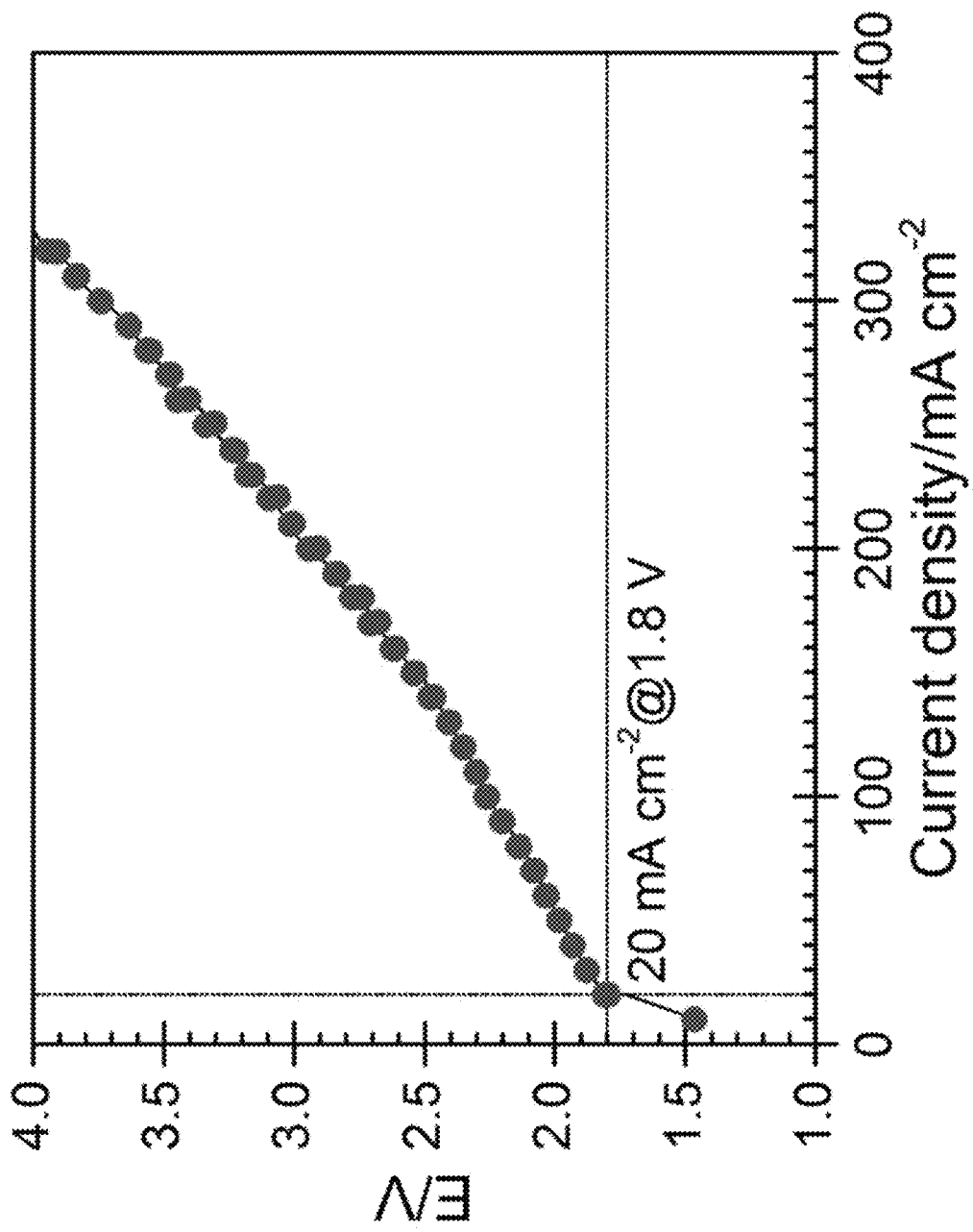
FIG. 9 illustrates polarization (voltage as a function of current density) curves of an HEMEL at 80° C. Materials: TP-CF3-IM-1 membrane, ionomer loading of 30%, catalyst: 4.0 mg$_{Pt}$ cm·2 Pt/C on anode, 2.9 mg cm·2 IrO$_2$ on cathode. Test conditions: 80° C. for water and electrolyzer, water flow rate: 3.0 mL/min.

(6) Hydroxide exchange membrane electrolyzer (HEMEL) performance. Although TP-CF3-IM-x polymer membranes are expected to have superior chemical stability, hydroxide conductivity, low water uptake, good solubility and mechanical properties, the most practical evaluation of these materials is their performance in HEMEL cells as an HEI in the catalyst layer and as the HEM. Membrane-electrode assemblies (MEAs) were fabricated by depositing 5 cm$^2$ electrode onto both sides of a TP-CF3-IM-x polymer membrane with a robotic sprayer (Sono-Tek ExactaCoat). The electrode ink was prepared by adding 250 mg of catalyst (Tanaka Kikinzoku Kogyo, or TKK, 50% Pt on high-surface-area C) and a desired amount of ionomer (a TP-CF3-IM-x polymer, prepared by dissolving the TP-CF3-IM-x polymer in a water and ethanol mixture) to 10 g of water and 10 g of ethanol, followed by sonicating for 1 hour. The catalyst loading was 4 mg Pt/cm$^2$. Pt-coated Ti plate and TGP-H-060 Toray carbon paper (5% wet proofing) were the gas diffusion layers for the anode and cathode sides, respectively. The cell and de-ionized water temperatures were kept at a constant temperature. Performance was characterized with an Arbin testing system (Materials: TP100-CF3-IM-1 membrane, ionomer loading of 30%, catalyst: 4.0 mg$_{Pt}$ cm$^{-2}$ Pt/C on anode, 2.9 mg cm$^{-2}$ IrO$_2$ on cathode. Test conditions: 80° C. for water and electrolyzer, water flow rate: 3.0 mL/min.). Normally, the cell was activated for 30 minutes at 100 mA/cm$^2$ and another 30 minutes at 200 mA/cm$^2$. After activation, performance was recorded by scanning current. Results are shown in FIG. 9.

Example 3

Another imidazolium-tethered poly (aryl alkylene) polymer is prepared from 7-bromo-1,1,1-trifluoroheptan-2-one, 1,1,1-trifluoroacetone and m-terphenyl (referred to as mTP-CF3-IM-x, wherein x is the mole ratio of 7-bromo-1,1,1-trifluoroheptan-2-one to biphenyl and is from 1 to 100). mTP-CF3-IM-x is prepared by three major steps similar to that of TP-CF3-IM-x: (1) synthesis of a bromide-functionalized polymer, (2) synthesis of a imidazolium-functionalized polymer, and (3) membrane casting and hydroxide exchange. The reaction scheme is depicted below, wherein n is the number of repeat units in the polymer:

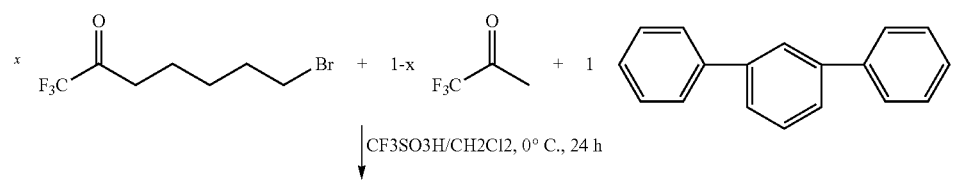

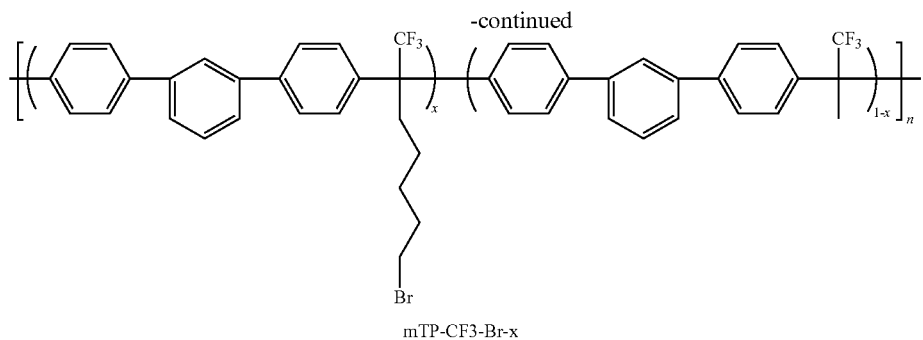

mTP-CF3-Br-x

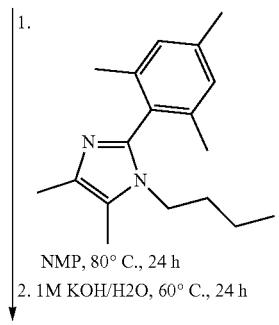

1. NMP, 80° C., 24 h
2. 1M KOH/H2O, 60° C., 24 h

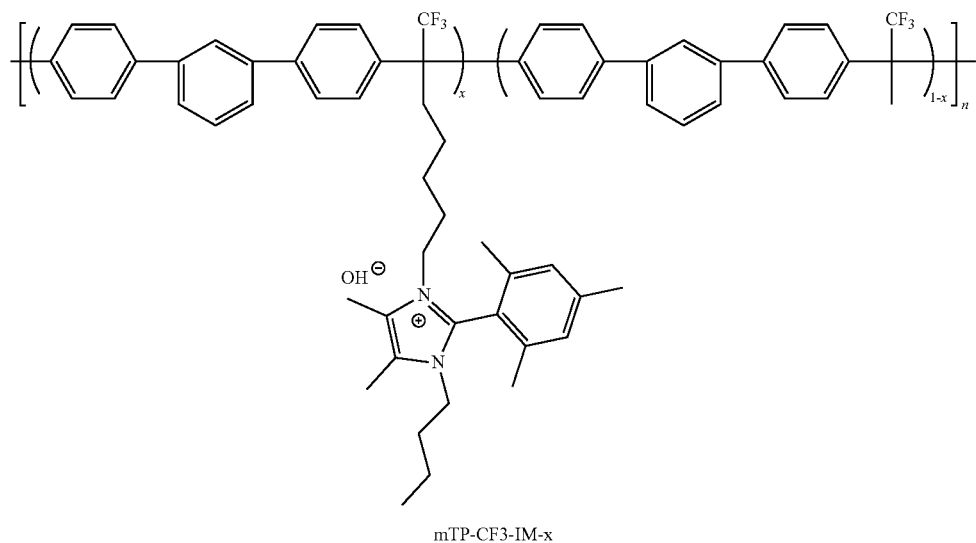

mTP-CF3-IM-x

Example 4

Another method of preparing the BP-CF3-IM-x polymer of Example 1 is from the reaction of imidazolium functionalized 7-bromo-1,1,1-trifluoroheptan-2-one, 1,1,1-trifluoroacetone and biphenyl (referred to as BP-CF3-IM-x, wherein x is the mole ratio of imidazolium functionalized 7-bromo-1,1,1-trifluoroheptan-2-one to biphenyl and is from 1 to 100). BP-CF3-IM-x is prepared by two major steps: (1) synthesis of an imidazolium-functionalized polymer, and (2) membrane casting and hydroxide exchange. The reaction scheme is depicted below, wherein n is the number of repeat units in the polymer:

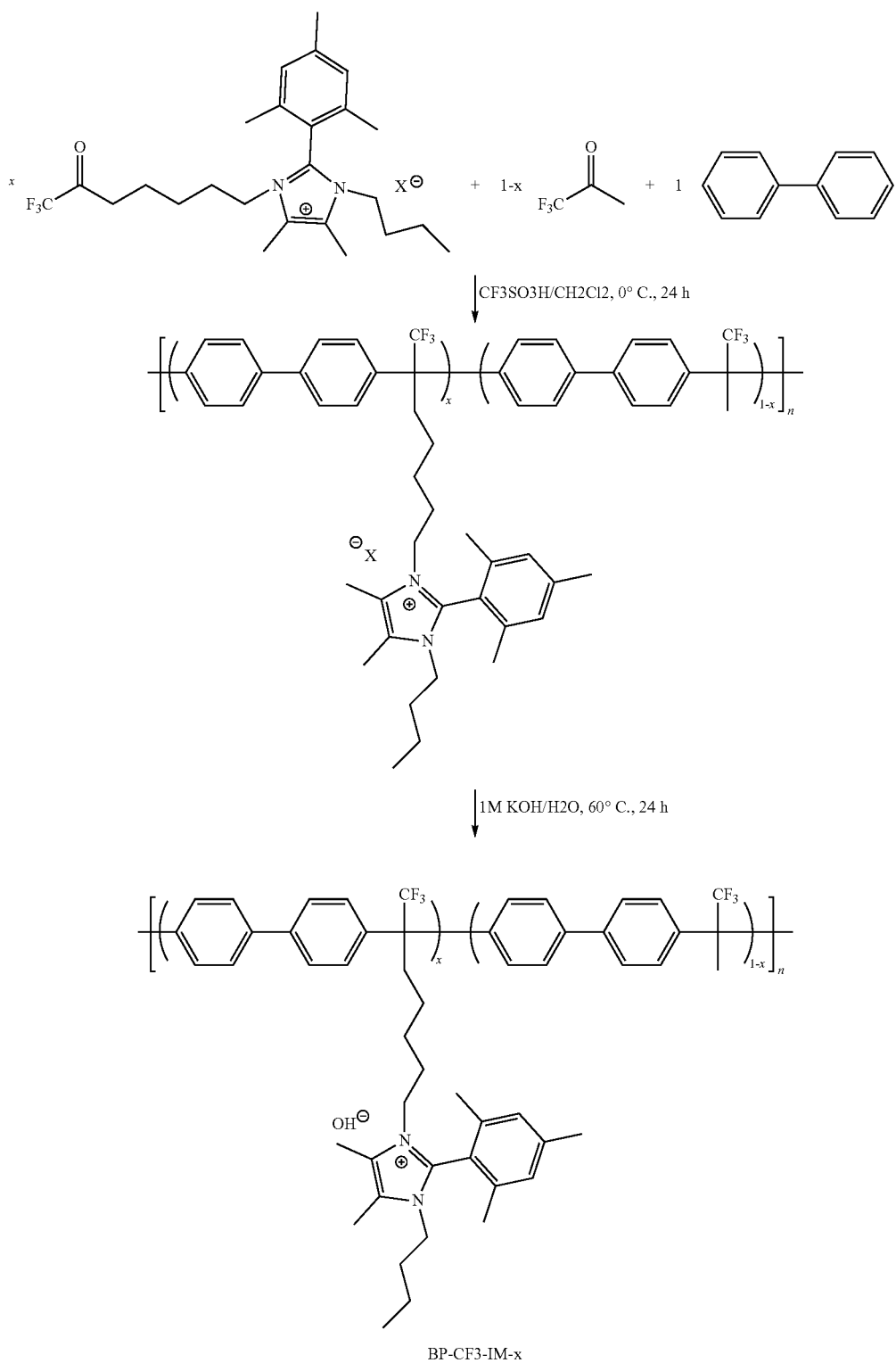

BP-CF3-IM-x

Example 5

Another method of preparing the TP-CF3-IM-x polymer of Example 2 is from the reaction of imidazolium functionalized 7-bromo-1,1,1-trifluoroheptan-2-one, 1,1,1-trifluoroacetone and p-terphenyl (referred to as TP-CF3-IM-x, wherein x is the mole ratio of imidazolium functionalized 7-bromo-1,1,1-trifluoroheptan-2-one to p-terphenyl and is from 1 to 100). TP-CF3-IM-x is prepared by two major steps: (1) synthesis of an imidazolium-functionalized polymer, and (2) membrane casting and hydroxide exchange. The reaction scheme is depicted below, wherein n is the number of repeat units in the polymer:

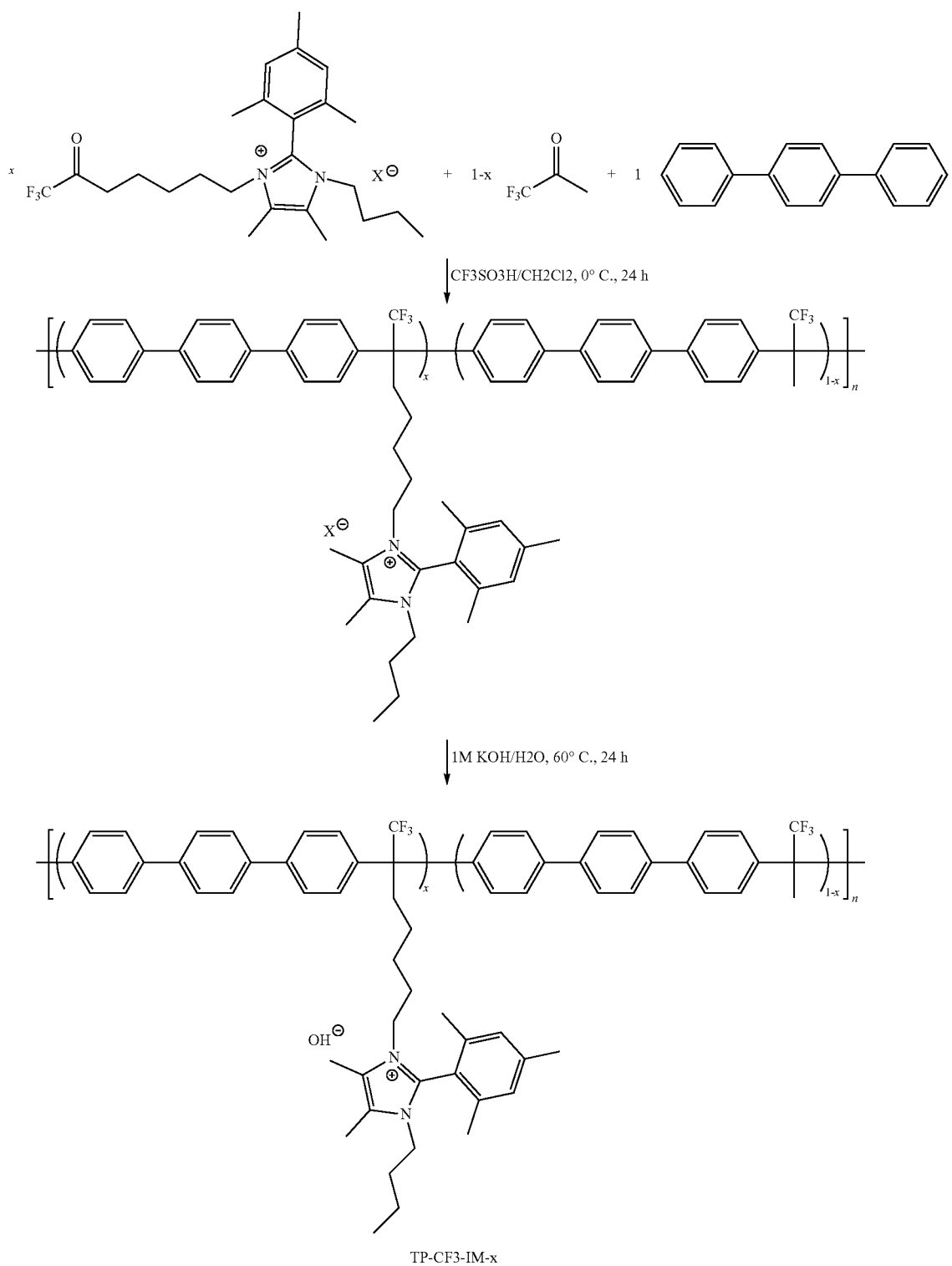

Example 6

Another method of preparing the m-TP-CF3-IM-x of Example 3 is from the reaction of imidazolium functionalized 7-bromo-1,1,1-trifluoroheptan-2-one, 1,1,1-trifluoroacetone and m-terphenyl (referred to as mTP-CF3-IM-x, wherein x is the mole ratio of imidazolium functionalized 7-bromo-1,1,1-trifluoroheptan-2-one to m-terphenyl and is from 1 to 100). mTP-CF3-IM-x is prepared by two major steps: (1) synthesis of an imidazolium-functionalized polymer, and (2) membrane casting and hydroxide exchange. The reaction scheme is depicted below, wherein n is the number of repeat units in the polymer:

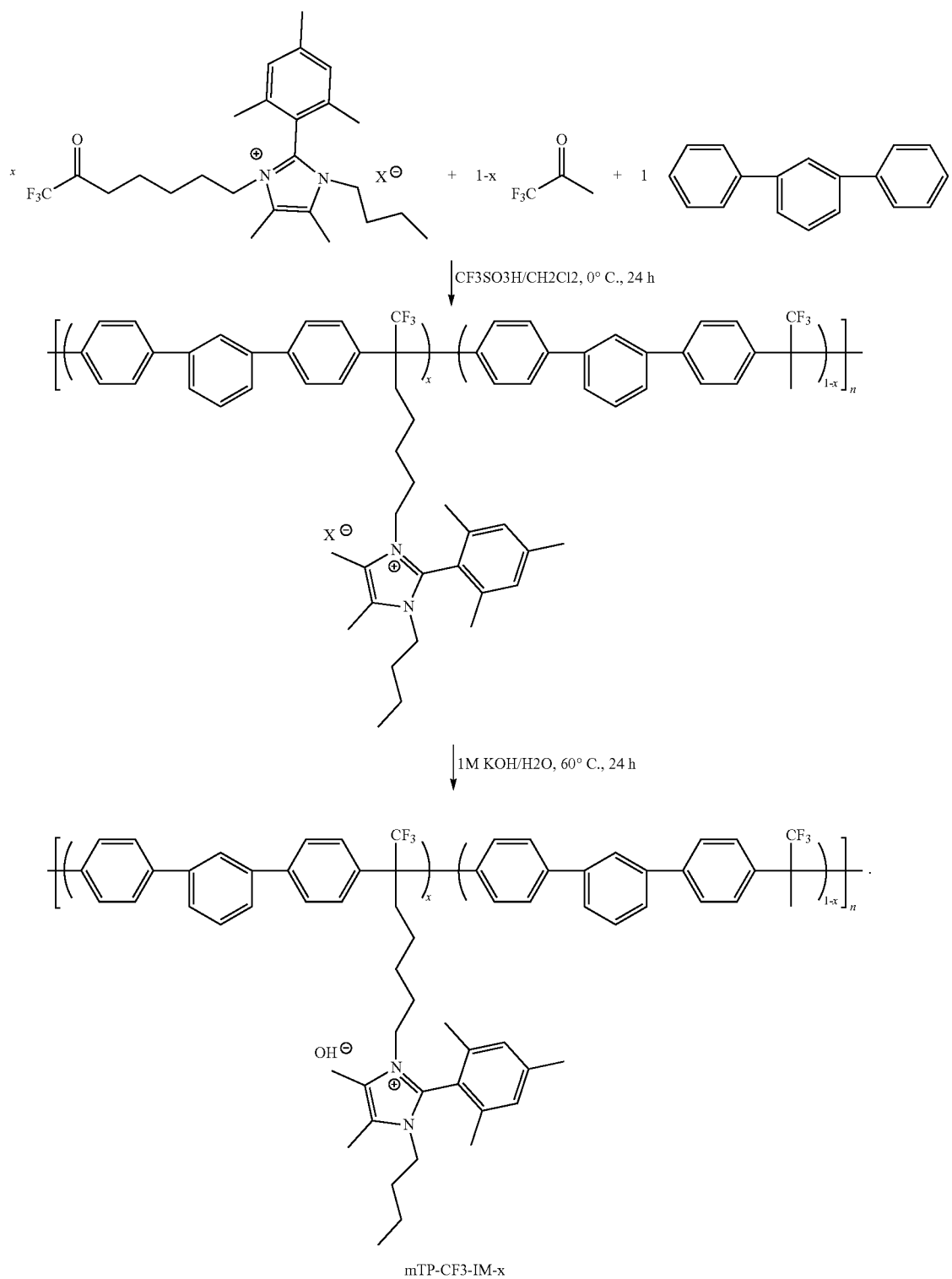

Example 7

An imidazolium-tethered poly(crown ether) polymer was prepared from 7-bromo-1,1,1-trifluoroheptan-2-one, 1,1,1-trifluoroacetone and dibenzo-18-crown-6 (referred to as PCE-C5-IM-x, wherein x is the mole ratio of 7-bromo-1,1,1-trifluoroheptan-2-one to dibenzo-18-crown-6 and is from 1 to 100). PCE-C5-IM-x was prepared by three major steps: (1) synthesis of a bromide-functionalized polymer, (2) synthesis of an imidazolium-functionalized polymer, and (3) membrane casting and hydroxide exchange. The reaction scheme is depicted below, wherein n is the number of repeat units in the polymer:

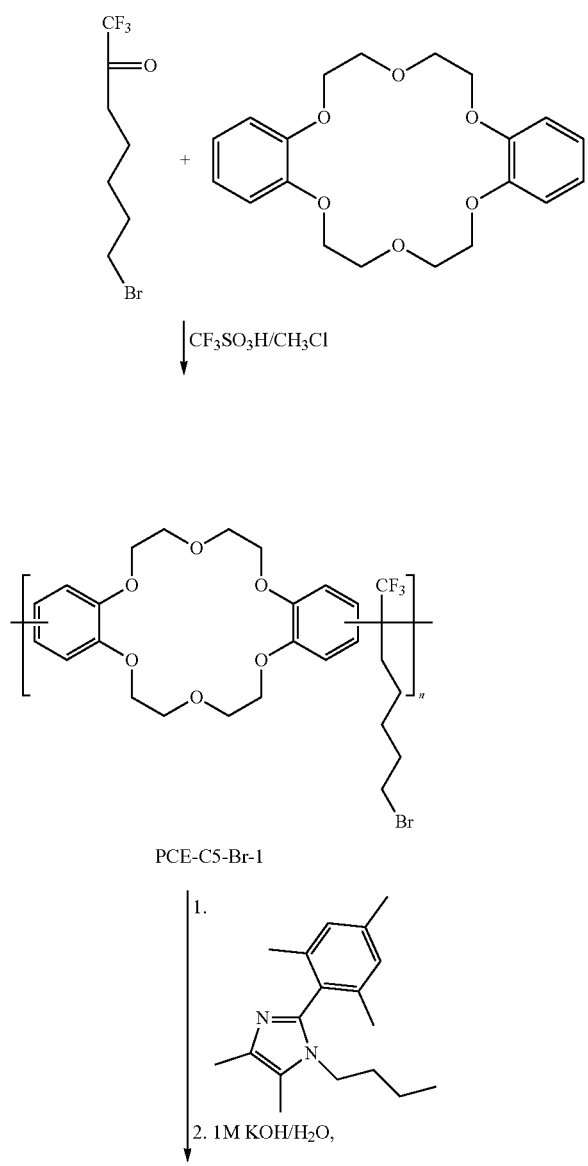

PCE-C5-Br-1

1.

2. 1M KOH/H₂O,

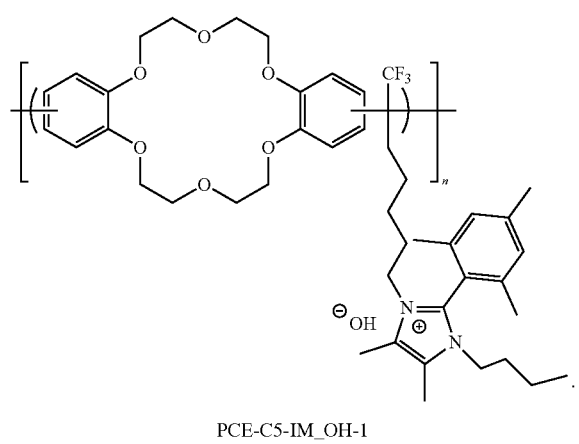

PCE-C5-IM_OH-1

Figure 10:
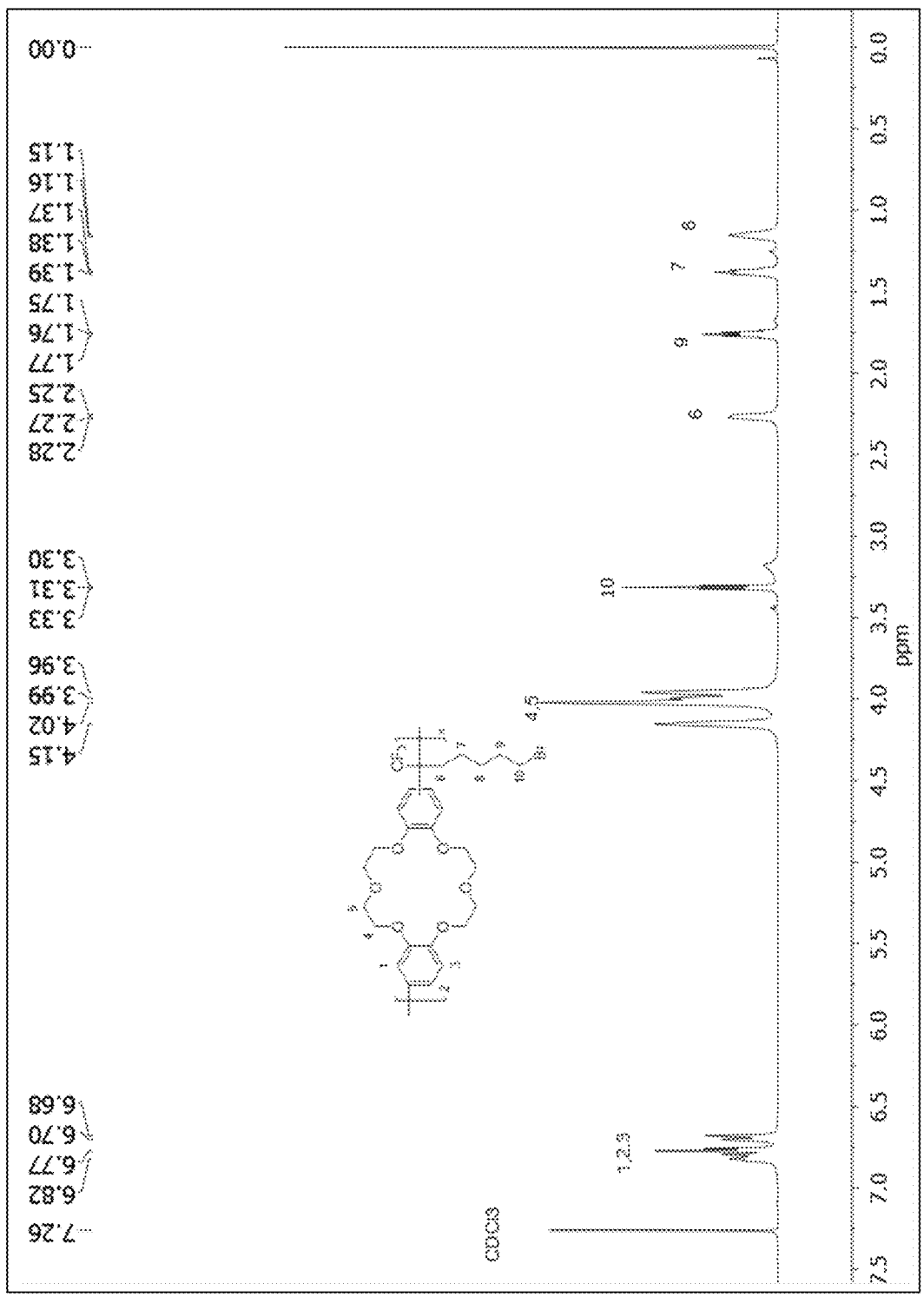
FIG. 10 depicts an 1H NMR spectrum of PCE-C5-Br-1 in CDCl3.

Synthesis of a bromide-functionalized polymer (PCE-C5-Br-1). To a 250 mL three-necked flask equipped with overhead mechanical stirrer, dibenzo-18-crown-6 (7.2082 g, 20.00 mmol) and 7-bromo-1,1,1-trifluoroheptan-2-one (5.9294 g, 24.00 mmol) were suspended into chloroform (35 mL). TFSA (30 mL) was then added dropwise slowly at −15° C. Thereafter, the reaction was continued at 0° C. for 8 h. The resulting viscous solution was poured slowly into ethanol. The white fibrous solid was filtered, washed with water and immersed in 1 M K2CO3 at 50° C. for 12 h. Finally, the white fibrous product was filtered, washed with water and dried completely at 60° C. under vacuum. The yield of the polymer was 95%. $^1$H NMR (CDCl$_3$, ·, ppm): 6.82-6.68 (6H), 4.15-3.96 (16H), 3.33 (2H), 2.27 (2H), 1.76 (2H), 1.38 (2H), 1.15 (2H) (see FIG. 10).

Figure 11:
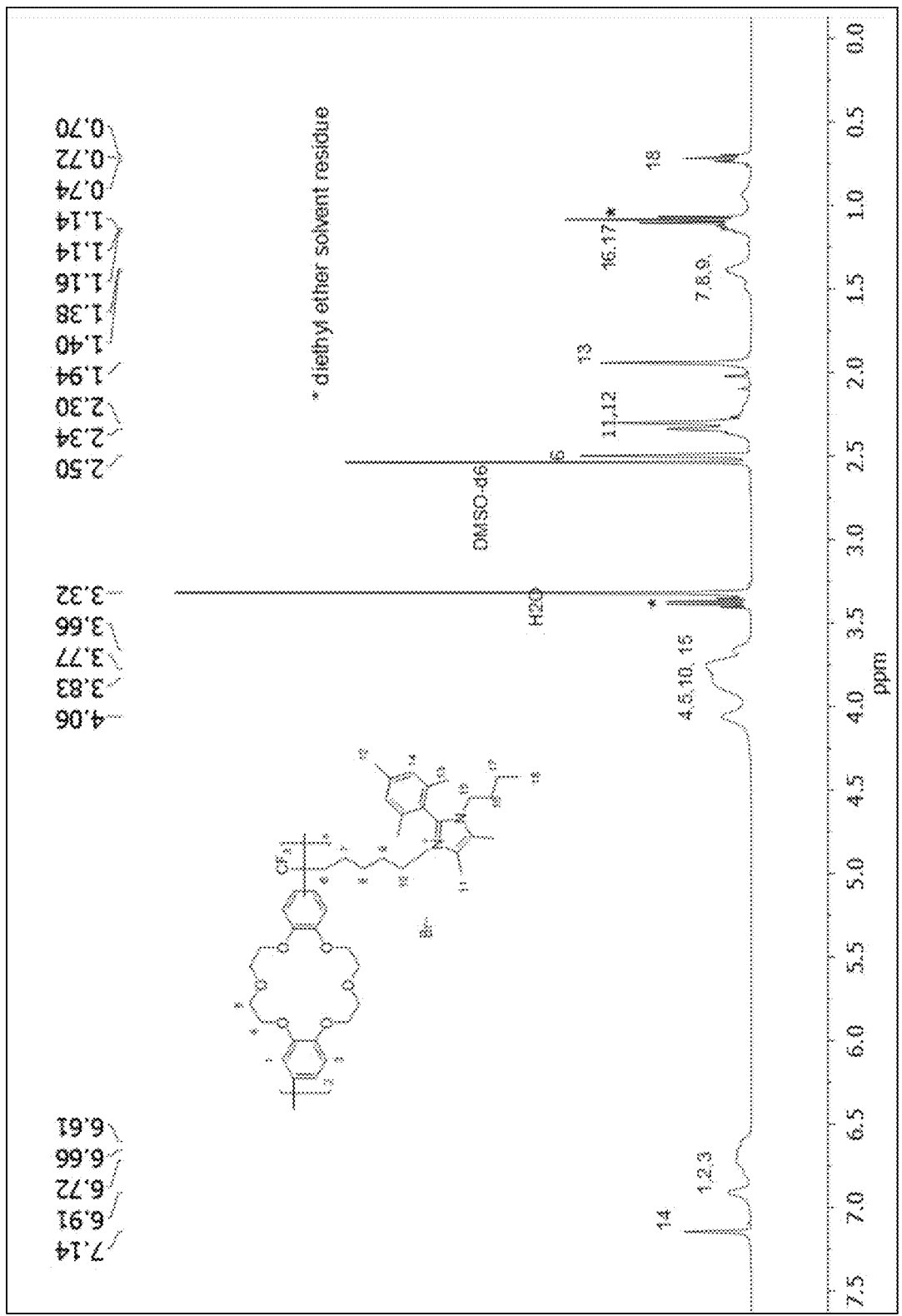
FIG. 11 depicts an 1H NMR spectrum of PCE-C5-IM-Br-1 in DMSO-d6.

Synthesis of imidazolium-functionalized polymer (PCE-C5-IM-Br-1) To a 50 mL one-necked flask equipped with magnetic bar, the bromide-functionalized polymer (1.0 g, 1.7 mmol) and the imidazole (0.5 g, 1.9 mmol) were added into DMSO (20 mL). The solution was stirred over 24 hours 60° C. The resulting yellow solution was used to cast a membrane. The membrane was washed consequently three times with hydrochloride solution (pH 1) and DI water, and dried completely at 60° C. under vacuum. The yield of the polymer PCE-C5-IM-Br-1 was 90%. 1H NMR (DMSO-d6, ·, ppm): 7.14 (2H), 6.91-6.61 (6H), 4.06-3.66 (20H), 2.34 (2H), 2.34-2.30 (9H), 1.94 (6H), 1.40-1.38 (6H), 1.16-1.14 (4H), 0.72 (3H) (see FIG. 11)

PCE-C5-IM OH-1 membrane casting and hydroxide exchange. Membrane was prepared by dissolving the PCE-C5-IM-Br-1 polymer (1.0 g) in NMP (10 mL) and casting on a clear glass plate at 80° C. for 8 hours. The membrane (in bromide form) was peeled off from a glass plate in contact with deionized (DI) water. The membrane in hydroxide form was obtained by ion exchange in 1 M KOH at 60° C. for 24 hours, followed by washing and immersion in DI water for 48 hours under argon to remove residual KOH.

Example 8

Another imidazolium-tethered poly (crown ether) polymer is prepared from 7-bromo-1,1,1-trifluoroheptan-2-one, 1,1,1-trifluoroacetone and dibenzo-18-crown-6 (referred to as PCE-C5-IM-x, wherein x is the mole ratio of 7-bromo-1,1,1-trifluoroheptan-2-one to dibenzo-18-crown-6 and is from 1 to 100). PCE-C5-IM-x is prepared by three major steps similar to that of PCE-C5-IM-1: (1) synthesis of a bromide-functionalized polymer, (2) synthesis of an imidazolium-functionalized polymer, and (3) membrane casting and hydroxide exchange. The reaction scheme is depicted below, wherein n is the number of repeat units in the polymer.

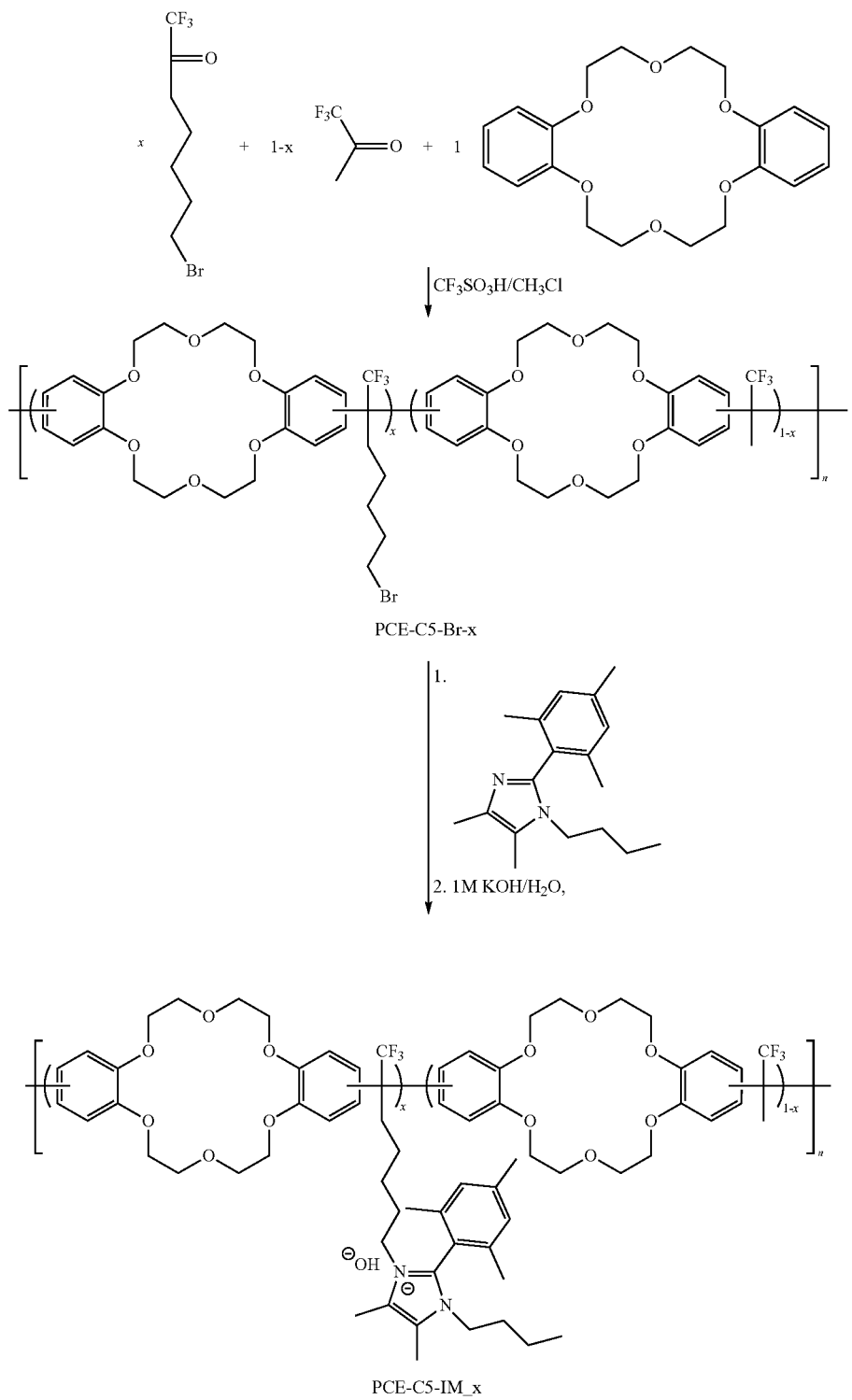

Example 9

Another method of preparing the PCE-C5-IM-x of Example 8 is from the reaction of imidazolium functionalized 7-bromo-1,1,1-trifluoroheptan-2-one, 1,1,1-trifluoroacetone and dibenzo-18-crown-6 (referred to as PCE-C5-IM-x, wherein x is the mole ratio of imidazolium functionalized 7-bromo-1,1,1-trifluoroheptan-2-one to PCE-C5-IM-x and is from 1 to 100). PCE-C5-IM-x is prepared by two major steps: (1) synthesis of an imidazolium-functionalized polymer, and (2) membrane casting and hydroxide exchange. The reaction scheme is depicted below, wherein n is the number of repeat units in the polymer:

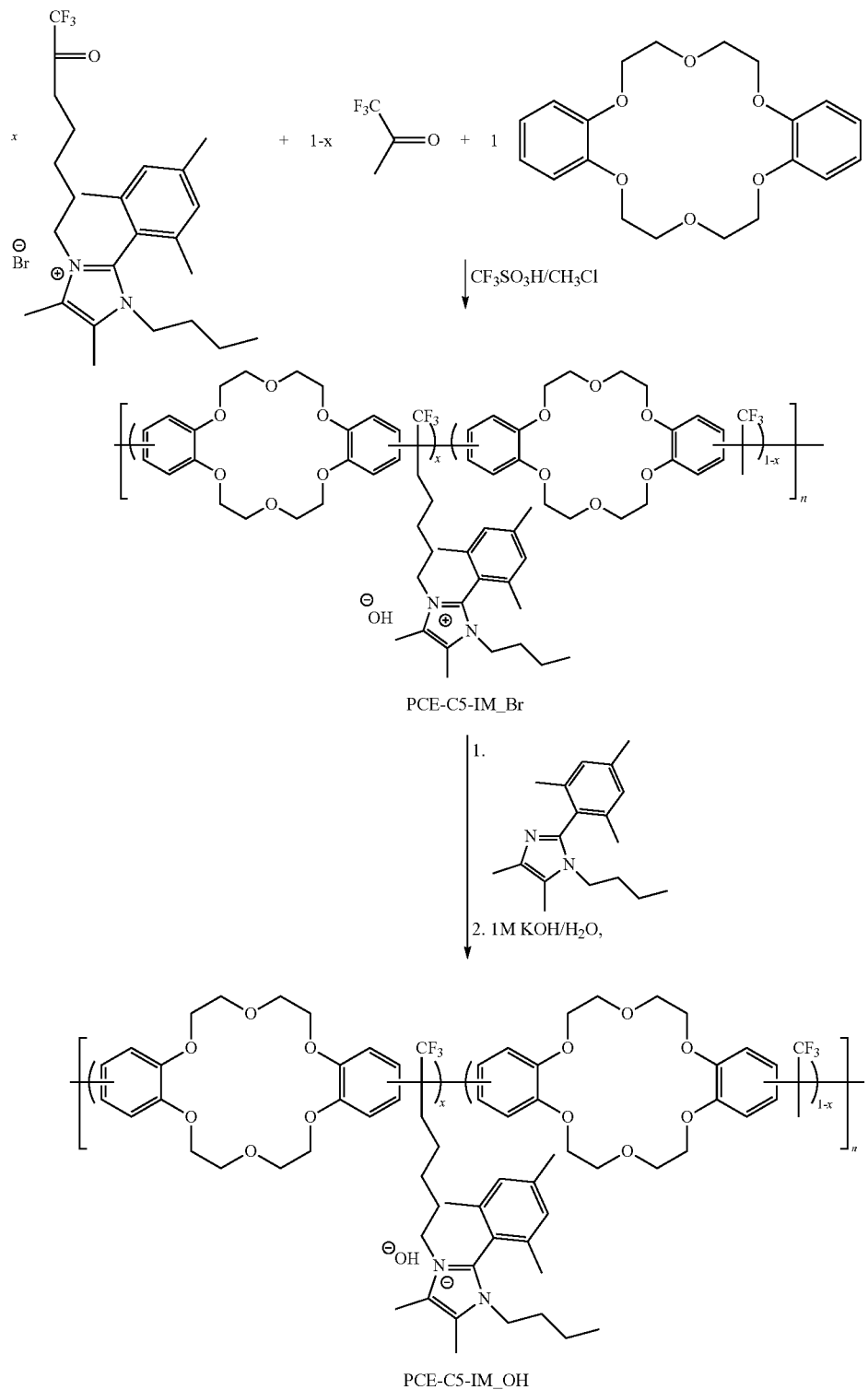

PCE-C5-IM_Br

PCE-C5-IM_OH

Example 10

A quaternary ammonium-tethered poly(crown ether) polymer was prepared from 7-bromo-1,1,1-trifluoroheptan-2-one and dibenzo-18-crown-6 (referred to as PCE-C5-QA-x, wherein x is the mole ratio of 7-bromo-1,1,1-trifluoroheptan-2-one to dibenzo-18-crown-6 and is from 1 to 100). PCE-C5-QA-x was prepared by three major steps: (1) synthesis of a bromide-functionalized polymer, (2) synthesis of a quaternary ammonium-functionalized polymer, and (3) membrane casting and hydroxide exchange. The reaction scheme is depicted below, wherein n is the number of repeat units in the polymer:

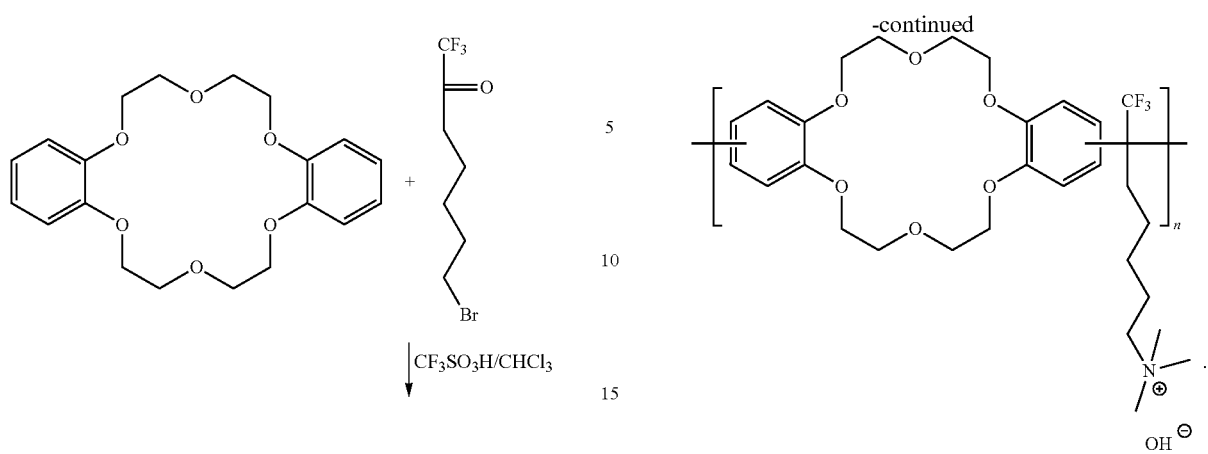

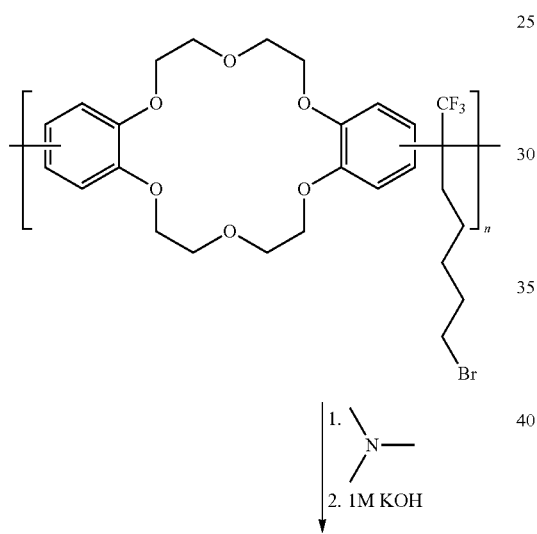

Example 11

A quaternary ammonium-tethered poly(crown ether) polymer was prepared from 7-bromo-1,1,1-trifluoroheptan-2-one, 1,1,1-trifluoroacetone and dibenzo-18-crown-6 (referred to as PCE-C5-IM-x, wherein x is the mole ratio of 7-bromo-1,1,1-trifluoroheptan-2-one to dibenzo-18-crown-6 and is from 1 to 100). PCE-C5-QA-x is prepared by three major steps: (1) synthesis of a bromide-functionalized polymer, (2) synthesis of a quaternary ammonium-functionalized polymer, and (3) membrane casting and hydroxide exchange. The reaction scheme is depicted below, wherein n is the number of repeat units in the polymer:

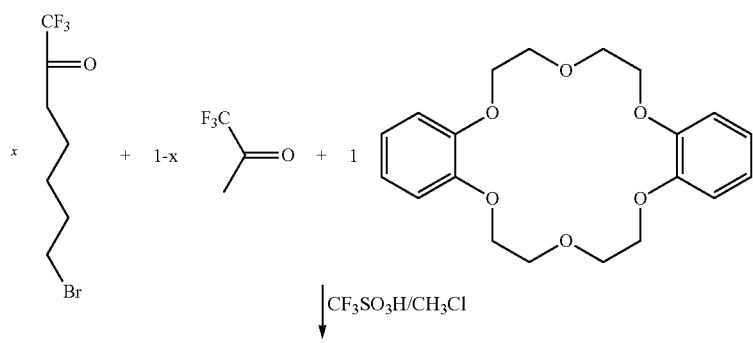

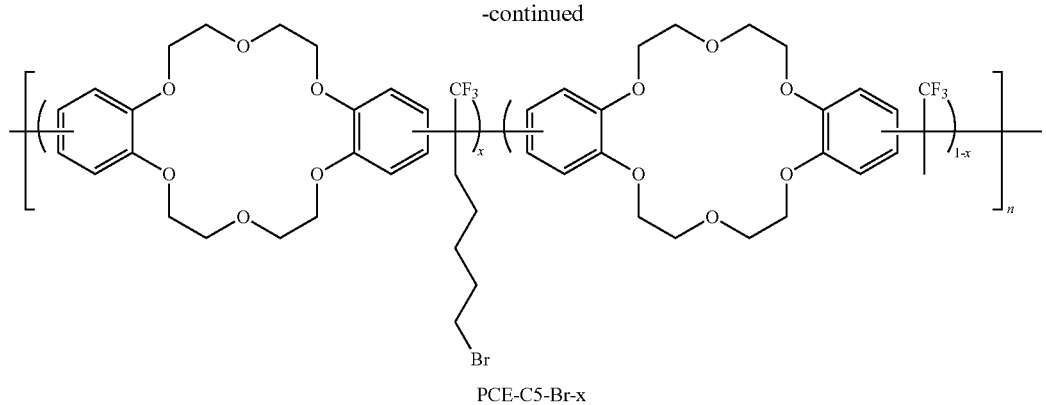

PCE-C5-Br-x

↓ 1. \N—/
  2. 1M KOH/H₂O,

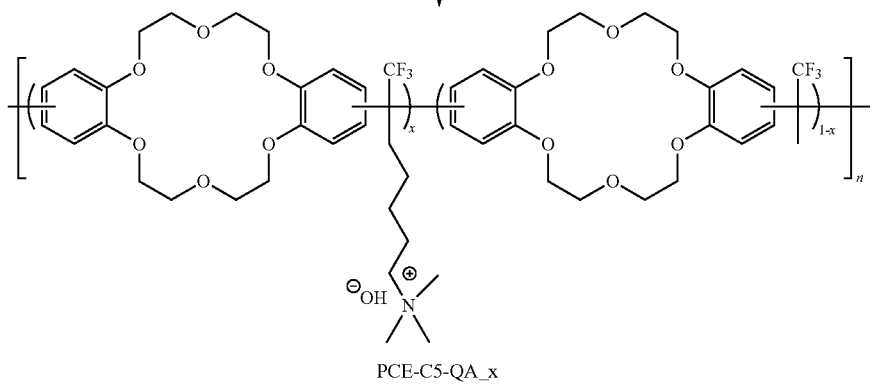

PCE-C5-QA_x

DEFINITIONS

The term "suitable substituent," as used herein, is intended to mean a chemically acceptable functional group, preferably a moiety that does not negate the activity of the inventive compounds. Such suitable substituents include, but are not limited to halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, HO—(C·O)— groups, heterocylic groups, cycloalkyl groups, amino groups, alkyl- and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, and arylsulfonyl groups. Those skilled in the art will appreciate that many substituents can be substituted by additional substituents.

The term "alkyl," as used herein, refers to a linear, branched or cyclic hydrocarbon radical, preferably having 1 to 32 carbon atoms (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons), and more preferably having 1 to 18 carbon atoms. Alkyl groups include, but are not limited to, methyl, ethyl, n-propyl, isopropyl, n-butyl, iso-butyl, secondary-butyl, and tertiary-butyl. Alkyl groups can be unsubstituted or substituted by one or more suitable substituents.

The term "alkenyl," as used herein, refers to a straight, branched or cyclic hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, more preferably having 1 to 18 carbon atoms, and having one or more carbon-carbon double bonds. Alkenyl groups include, but are not limited to, ethenyl, 1-propenyl, 2-propenyl (allyl), iso-propenyl, 2-methyl-1-propenyl, 1-butenyl, and 2-butenyl. Alkenyl groups can be unsubstituted or substituted by one or more suitable substituents, as defined above.

The term "alkynyl," as used herein, refers to a straight, branched or cyclic hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, more preferably having 1 to 18 carbon atoms, and having one or more carbon-carbon triple bonds. Alkynyl groups include, but are not limited to, ethynyl, propynyl, and butynyl. Alkynyl groups can be unsubstituted or substituted by one or more suitable substituents, as defined above.

The term "aryl" or "ar," as used herein alone or as part of another group (e.g., aralkyl), means monocyclic, bicyclic, or tricyclic aromatic radicals such as phenyl, naphthyl, tetrahydronaphthyl, indanyl and the like; optionally substituted by one or more suitable substituents, preferably 1 to 5 suitable substituents, as defined above. The term "aryl" also includes heteroaryl.

"Arylalkyl" or "aralkyl" means an aryl group attached to the parent molecule through an alkylene group. The number of carbon atoms in the aryl group and the alkylene group is selected such that there is a total of about 6 to about 18 carbon atoms in the arylalkyl group. A preferred arylalkyl group is benzyl.

The term "cycloalkyl," as used herein, refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1]heptanyl, bicyclo[3.2.1]octanyl and bicyclo[5.2.0]nonanyl, etc.); optionally containing 1 or 2 double bonds. Cycloalkyl groups can be unsubstituted or substituted by one or more suitable substituents, preferably 1 to 5 suitable substituents, as defined above.

The term "-ene" as used as a suffix as part of another group denotes a bivalent radical in which a hydrogen atom is removed from each of two terminal carbons of the group, or if the group is cyclic, from each of two different carbon atoms in the ring. For example, alkylene denotes a bivalent alkyl group such as ethylene (—CH2CH2—) or isopropylene (—CH2(CH3)CH2—). For clarity, addition of the -ene suffix is not intended to alter the definition of the principal word other than denoting a bivalent radical. Thus, continuing the example above, alkylene denotes an optionally substituted linear saturated bivalent hydrocarbon radical.

The term "ether" as used herein represents a bivalent (i.e., difunctional) group including at least one ether linkage (i.e., —O—).

The term "heteroaryl," as used herein, refers to a monocyclic, bicyclic, or tricyclic aromatic heterocyclic group containing one or more heteroatoms (e.g., 1 to 3 heteroatoms) selected from O, S and N in the ring(s). Heteroaryl groups include, but are not limited to, pyridyl, pyrazinyl, pyrimidinyl, pyridazinyl, thienyl, furyl, imidazolyl, pyrrolyl, oxazolyl (e.g., 1,3-oxazolyl, 1,2-oxazolyl), thiazolyl (e.g., 1,2-thiazolyl, 1,3-thiazolyl), pyrazolyl, tetrazolyl, triazolyl (e.g., 1,2,3-triazolyl, 1,2,4-triazolyl), oxadiazolyl (e.g., 1,2,3-oxadiazolyl), thiadiazolyl (e.g., 1,3,4-thiadiazolyl), quinolyl, isoquinolyl, benzothienyl, benzofuryl, and indolyl. Heteroaryl groups can be unsubstituted or substituted by one or more suitable substituents, preferably 1 to 5 suitable substituents, as defined above.

The term "hydrocarbon" as used herein describes a compound or radical consisting exclusively of the elements carbon and hydrogen.

The term "substituted" means that in the group in question, at least one hydrogen atom bound to a carbon atom is replaced with one or more substituent groups such as hydroxy (—OH), alkylthio, phosphino, amido (—CON(RA)(RB), wherein RA and RB are independently hydrogen, alkyl, or aryl), amino(—N(RA)(RB), wherein RA and RB are independently hydrogen, alkyl, or aryl), halo (fluoro, chloro, bromo, or iodo), silyl, nitro (—NO2), an ether (—ORA wherein RA is alkyl or aryl), an ester (—OC(O)RA wherein RA is alkyl or aryl), keto (—C(O)RA wherein RA is alkyl or aryl), heterocyclo, and the like. When the term "substituted" introduces or follows a list of possible substituted groups, it is intended that the term apply to every member of that group. That is, the phrase "optionally substituted alkyl or aryl" is to be interpreted as "optionally substituted alkyl or optionally substituted aryl." Likewise, the phrase "alkyl or aryl optionally substituted with fluoride" is to be interpreted as "alkyl optionally substituted with fluoride or aryl optionally substituted with fluoride."

The term "tethered" means that the group in question is bound to the specified polymer backbone. For example, an imidazolium-tethered poly (aryl alkylene) polymer is a polymer having imidazolium groups bound to a poly (aryl alkylene) polymer backbone.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A polymer comprising structural units of Formulae (1A); (3A) or (3'A); and optionally (4A), wherein the structural units of Formulae (1A), (3A), (3'A) and (4A) have the structures:

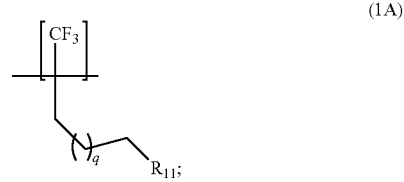

(1A)

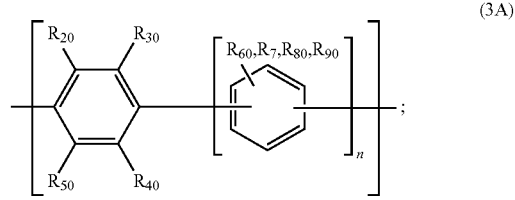

(3A)

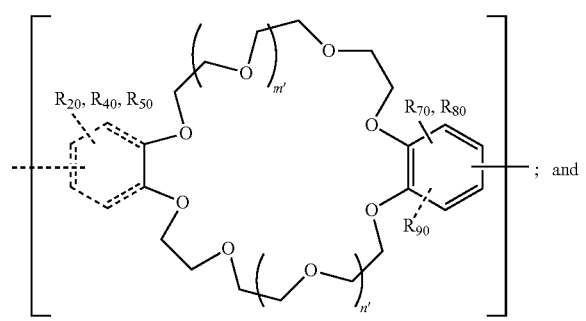

(3'A)

(4A)

wherein:

$R_{11}$ are each independently a quaternary ammonium or phosphonium group or a nitrogen-containing heterocyclic group or a salt thereof, the quaternary ammonium or phosphonium group having the formula (5A):

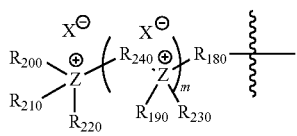

(5A)

and the nitrogen-containing heterocyclic group being an optionally substituted pyrrole, pyrroline, pyrazole, pyrazoline, imidazole, imidazoline, triazole, pyridine, triazine, pyrazine, pyridazine, pyrimidine, azepine, quinoline, piperidine, pyrrolidine, pyrazolidine, imidazolidine, azepane, isoxazole, isoxazoline, oxazole, oxazoline, oxadiazole, oxatriazole, dioxazole, oxazine, oxadiazine, isoxazolidine, morpholine, thiazole, isothiazole, oxathiazole, oxathiazine, or caprolactam, wherein each substituent is independently alkyl, alkenyl, alkynyl, aryl, or aralkyl;

$R_{20}$, $R_{30}$, $R_{40}$, $R_{50}$, $R_{60}$, $R_{70}$, $R_{80}$, $R_{90}$, $R_{130}$, $R_{140}$, $R_{150}$, $R_{160}$, and $R_{170}$ are each independently hydrogen, halide, alkyl, alkenyl, alkynyl or aryl, and the alkyl, alkenyl, alkynyl or aryl are optionally substituted with halide, and wherein $R_{30}$ and $R_{60}$ are optionally linked to form a five membered ring optionally substituted with halide or alkyl;

each $R_{100}$ is independently alkyl, alkenyl, alkynyl, or a substituent having formula (4B):

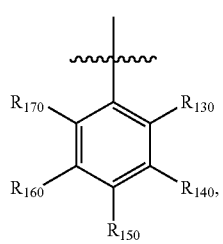

(4B)

and the alkyl, alkenyl, or alkynyl are optionally substituted with fluoride;

$R_{180}$ and $R_{240}$ are each independently alkylene;

$R_{190}$, $R_{200}$, $R_{210}$, $R_{220}$, and $R_{230}$ are each independently alkyl, alkenyl, or alkynyl;

q is 0, 1, 2, 3, 4, 5, 6, 7, 8, 9, 10, 11, 12, 13, 14, 15, 16, 17, 18, 19, or 20;

m is 0, 1, 2, 3, 4, 5 or 6;

n is 0, 1, 2 or 3;

each m' and each n' is independently 0, 1 or 2;

each n' is independently 0, 1 or 2;

$X^-$ is an anion; and

Z is P when the structural unit of formula (3A) is present in the polymer but the structural unit of formula (3'A) is not present in the polymer, and Z is N or P when the structural unit of formula (3'A) is present in the polymer.

2. A polymer comprising a reaction product of a polymerization mixture comprising (i) a cation-functionalized trifluoroketone monomer having the formula:

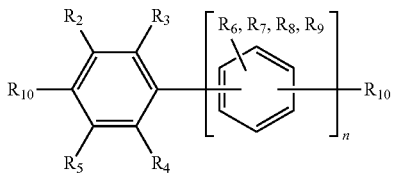

(1)

(ii) an aromatic monomer having the formula:

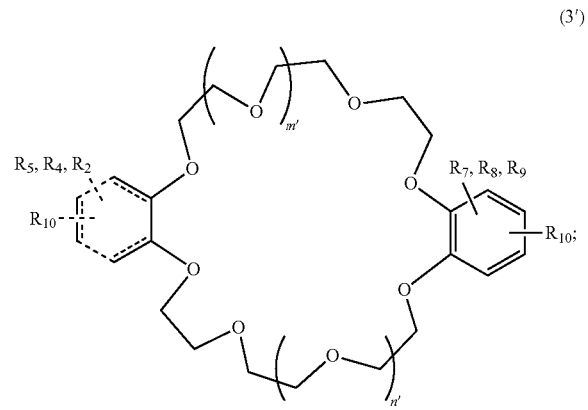

(3)

or a crown ether monomer having the formula:

(3')

and (iii) optionally, a trifluoromethyl ketone monomer having the formula:

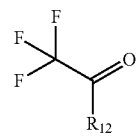

(4)

wherein:

$R_1$ are each independently a quaternary ammonium or phosphonium group or a nitrogen-containing heterocyclic group or a salt thereof, the quaternary ammonium or phosphonium group having the formula (5A):

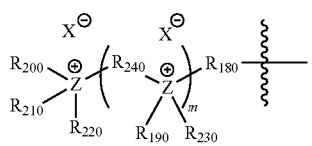

(5A)

and the nitrogen-containing heterocyclic group being an optionally substituted pyrrole, pyrroline, pyrazole, pyrazoline, imidazole, imidazoline, triazole, pyridine, triazine, pyrazine, pyridazine, pyrimidine, azepine, quinoline, piperidine, pyrrolidine, pyrazolidine, imidazolidine, azepane, isoxazole, isoxazoline, oxazole, oxazoline, oxadiazole, oxatriazole, dioxazole, oxazine, oxadiazine, isoxazolidine, morpholine, thiazole, isothiazole, oxathiazole, oxathiazine, or caprolactam, wherein each substituent is independently alkyl, alkenyl, alkynyl, aryl, or aralkyl;

$R_2, R_3, R_4, R_5, R_6, R_7, R_8, R_9, R_{10}, R_{13}, R_{14}, R_{15}, R_{16}$, and $R_{17}$ are each independently hydrogen, halide, alkyl, alkenyl, alkynyl or aryl, and the alkyl, alkenyl, alkynyl or aryl are optionally substituted with halide, and wherein $R_3$ and $R_6$ are optionally linked to form a five membered ring optionally substituted with halide or alkyl;

each $R_{12}$ is independently alkyl, alkenyl, alkynyl, or a substituent of formula (4C):

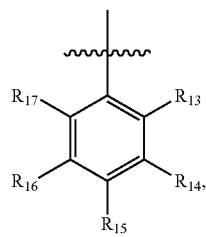

(4C)

and the alkyl, alkenyl, or alkynyl are optionally substituted with fluoride;

$R_{180}$ and $R_{240}$ are each independently alkylene;

$R_{190}, R_{200}, R_{210}, R_{220}$, and $R_{230}$ are each independently alkyl, alkenyl, or alkynyl;

m is 0, 1, 2, 3, 4, 5 or 6;

n is 0, 1, 2 or 3;

each m' and each n' is independently 0, 1 or 2;

q is 0, 1, 2, 3, 4, 5, 6, 7, 8, 9, 10, 11, 12, 13, 14, 15, 16, 17, 18, 19, or 20;

$X^-$ is an anion; and

Z is P when the aromatic monomer of formula (3) is present in the polymerization mixture but the crown ether monomer of formula (3') is not present in the polymerization mixture, and Z is N or P when the crown ether monomer of formula (3') is present in the polymerization mixture.

3. A polymer comprising a second reaction product of a second polymerization mixture comprising:
 a quaternary ammonium or phosphonium compound or a nitrogen-containing heterocycle or a salt thereof; and
 an intermediate polymer;
wherein:
 the intermediate polymer comprises a first reaction product of a first polymerization mixture comprising:
 (i) a halogenated trifluoromethyl ketone monomer having the formula:

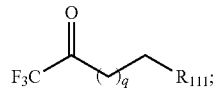

(2)

(ii) an aromatic monomer having the formula:

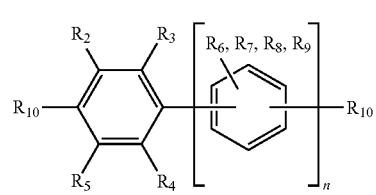

(3)

or
a crown ether monomer having the formula:

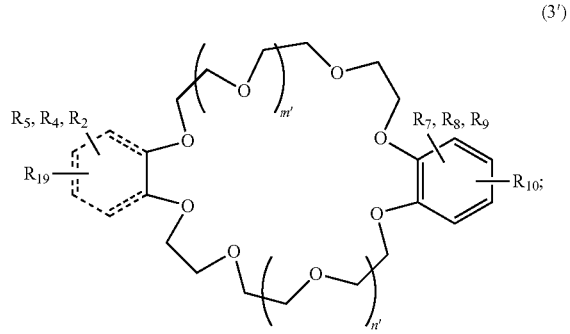

(3')

and
(iii) optionally, a trifluoromethyl ketone monomer having the formula:

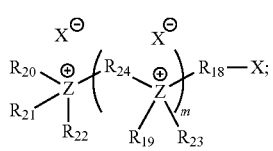

(4)

wherein:
 the quaternary ammonium or phosphonium compound has the formula (5):

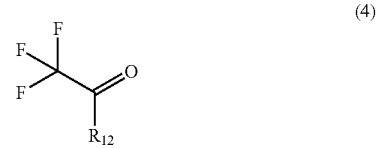

(5)

the nitrogen-containing heterocycle is an optionally substituted pyrrole, pyrroline, pyrazole, pyrazoline, imidazole, imidazoline, triazole, pyridine, triazine, pyrazine, pyridazine, pyrimidine, azepine, quinoline, piperidine, pyrrolidine, pyrazolidine, imidazolidine, azepane, isoxazole, isoxazoline, oxazole, oxazoline, oxadiazole, oxatriazole, dioxazole, oxazine, oxadiazine, isoxazolidine, morpholine, thiazole, isothiazole, oxathiazole, oxathiazine, or caprolactam, wherein each substituent is independently alkyl, alkenyl, alkynyl, aryl, or aralkyl;

$R_2, R_3, R_4, R_5, R_6, R_7, R_8, R_9, R_{10}, R_{13}, R_{14}, R_{15}, R_{16}$, and $R_{17}$ are each independently hydrogen, halide, alkyl, alkenyl, alkynyl or aryl, and the alkyl, alkenyl, alkynyl or aryl are optionally substituted with halide, and wherein $R_3$ and $R_6$ are optionally linked to form a five membered ring optionally substituted with halide or alkyl;

each $R_{12}$ is independently alkyl, alkenyl, alkynyl, or a substituent of formula (4C):

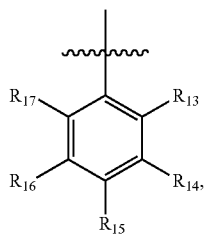

(4C)

and the alkyl, alkenyl, or alkynyl are optionally substituted with fluoride;

$R_{18}$ and $R_{24}$ are each independently alkylene;

$R_{19}$, $R_{20}$, $R_{21}$, $R_{22}$, and $R_{23}$ are each independently alkyl, alkenyl, or alkynyl;

$R_{111}$ is a halide;

m is 0, 1, 2, 3, 4, 5 or 6;

n is 0, 1, 2 or 3;

each m' and each n' is independently 0, 1 or 2;

q is 0, 1, 2, 3, 4, 5, 6, 7, 8, 9, 10, 11, 12, 13, 14, 15, 16, 17, 18, 19, or 20;

$X^-$ is an anion; and

Z is P when the aromatic monomer of formula (3) is present in the first polymerization mixture but the crown ether monomer of formula (3') is not present in the first polymerization mixture, and Z is N or P when the crown ether monomer of formula (3') is present in the first polymerization mixture.

4. An anion exchange polymer comprising a reaction product of a base and the polymer of claim 1.

5. The polymer of claim 4, wherein the base comprises a hydroxide-, bicarbonate-, or carbonate-containing base.

6. The polymer of claim 5, wherein the hydroxide-containing base comprises sodium hydroxide or potassium hydroxide; the bicarbonate-containing base comprises sodium bicarbonate or potassium bicarbonate; or the carbonate-containing base comprises sodium carbonate or potassium carbonate.

7. The polymer of claim 1, wherein $R_{11}$ is the nitrogen-containing heterocyclic group or salt thereof.

8. The polymer of claim 7, wherein the nitrogen-containing heterocyclic group comprises a fully substituted pyrrole, pyrroline, pyrazole, pyrazoline, imidazole, imidazoline, triazole, pyridine, triazine, pyrazine, pyridazine, pyrimidine, azepine, or quinoline, wherein each substituent is independently alkyl or aryl.

9. The polymer of claim 7, wherein the nitrogen-containing heterocyclic group comprises an imidazolium having the formula (6A):

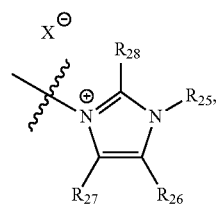

(6A)

wherein:

$R_{25}$, $R_{26}$, $R_{27}$, and $R_{28}$ are each independently hydrogen, halide, alkyl, alkenyl, alkynyl or aryl, and the alkyl, alkenyl, alkynyl or aryl are optionally substituted with halide.

10. The polymer of claim 9, wherein $R_{28}$ is 2,4,6-alkylphenyl, and $R_{25}$, $R_{26}$, and $R_{27}$ are each independently $C_1$-$C_6$ alkyl.

11. The polymer of claim 7, wherein the nitrogen-containing heterocyclic group has the formula

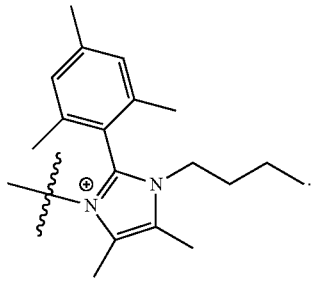 [SMILES: *[n+]1c(C)c(C)n(CCCC)c1-c1c(C)cc(C)cc1C]

12. The polymer of claim 1, wherein:

the quaternary ammonium or phosphonium group of the formula (5A) has $R_{180}$ and $R_{240}$ each independently being $C_1$-$C_{22}$ alkylene; $R_{190}$, $R_{200}$, $R_{210}$, $R_{220}$, and $R_{230}$ are each independently $C_1$-$C_6$ alkyl; m is 0, 1, 2, 3, 4, 5, or 6; and Z is N or P; or the quaternary ammonium or phosphonium group of the formula (5A) has $R_{180}$ and $R_{240}$ each independently being $C_1$-$C_6$ alkylene; $R_{190}$, $R_{200}$, $R_{210}$, $R_{220}$, and $R_{230}$ are each independently $C_1$-$C_6$ alkyl; m is 0, 1, 2, or 3; and Z is N or P; or the quaternary ammonium or phosphonium group of the formula (5A) has $R_{180}$ and $R_{240}$ each independently being $C_8$-$C_{22}$ alkylene; $R_{190}$, $R_{200}$, $R_{210}$, $R_{220}$, and $R_{230}$ are each independently $C_1$-$C_6$ alkyl; m is 0, 1, 2, or 3; and Z is N or P; or the quaternary ammonium or phosphonium group of the formula (5A) has $R_{180}$ and $R_{240}$ each $C_2$-$C_6$ alkylene; $R_{190}$, $R_{200}$, $R_{210}$, $R_{220}$, and $R_{230}$ are each independently methyl; m is 1; and Z is N or P; or the quaternary ammonium or phosphonium group of the formula (5A) has $R_{180}$ and $R_{240}$ each n-hexylene; $R_{190}$, $R_{200}$, $R_{210}$, $R_{220}$, and $R_{230}$ are each independently methyl; m is 1; and Z is N or P.

13. The polymer of claim 1, wherein $R_{11}$ is the quaternary phosphonium group.

14. The polymer of claim 1, wherein $R_{11}$ is the quaternary ammonium group.

15. The polymer of claim 2, wherein the aromatic monomer of formula (3) comprises biphenyl, para-terphenyl, meta-terphenyl, para-quaterphenyl, 9,9-dimethyl-9H-fluorene, or benzene.

16. The polymer of claim 1, wherein:
in the structural unit of formula (3A), at least one of $R_{20}$, $R_{30}$, $R_{40}$, $R_{50}$, $R_{60}$, $R_{70}$, $R_{80}$, and $R_{90}$ is halide or aryl, and the aryl is optionally substituted with halide; or in the structural unit of formula (3A), $R_{30}$ and $R_{60}$ are linked to form a five membered ring optionally substituted with halide or alkyl; or in the structural unit of formula (3'A), $R_{20}$, $R_{40}$, $R_{50}$, $R_{70}$, $R_{80}$, and $R_{90}$ are each hydrogen.

17. The polymer of claim 2, wherein the reaction product of the polymerization mixture further comprises the trifluoromethyl ketone monomer of formula (4).

18. The polymer of claim 17, wherein the trifluoromethyl ketone monomer comprises 2,2,2-trifluoroacetophenone or 1,1,1-trifluoroacetone.

19. The polymer of claim 1, wherein:
in the structural unit of formula (4A), $R_{100}$ is alkyl, alkenyl, or alkynyl, and the alkyl, alkenyl, or alkynyl is optionally substituted with fluoride; or in the structural unit of formula (4A), $R_{100}$ is the substituent of formula (4B) and at least one of $R_{130}$, $R_{140}$, $R_{150}$, $R_{160}$ and $R_{170}$ is halide or aryl, and the aryl is optionally substituted with fluoride; or $R_{20}$, $R_{30}$, $R_{40}$, $R_{50}$, $R_{60}$, $R_{70}$, $R_{80}$, $R_{90}$, $R_{130}$, $R_{140}$, $R_{150}$, $R_{160}$, and $R_{170}$ are each independently hydrogen, or alkyl optionally substituted with fluoride, and $R_{100}$ is alkyl optionally substituted with fluoride or the substituent of formula (4B); or $R_{20}$, $R_{30}$, $R_{40}$, $R_{50}$, $R_{60}$, $R_{70}$, $R_{80}$, $R_{90}$, $R_{130}$, $R_{140}$, $R_{150}$, $R_{160}$, and $R_{170}$ are each independently hydrogen, methyl, ethyl, propyl, butyl, pentyl, or hexyl, or methyl, ethyl, propyl, butyl, pentyl, or hexyl optionally substituted with fluoride, and $R_{100}$ is methyl, ethyl, propyl, butyl, pentyl, or hexyl optionally substituted with fluoride or substituent of formula (4B).

20. The polymer of claim 1, wherein $X^-$ comprises a halide, $BF_4^-$, $PF_6^-$, $CO_3^{2-}$, $OH^-$ or $HCO_3^-$.

21. The polymer of claim 1, wherein:
a sum of the mole fractions of the structural unit of Formula (1A) and Formula (4A) in the polymer can be about equal to a sum of the mole fractions of the structural units of Formulae (3A) and (3'A) in the polymer, and the ratio of the mole fraction of the structural unit of Formula (1A) in the polymer to the sum of the mole fractions of the structural units of Formulae (3A) and (3'A) in the polymer can be from about 0.01 to 1; or a mole ratio of a sum of the mole fractions of the structural unit of Formula (1A) and Formula (4A) to a sum of the mole fractions of Formulae (3A) and (3'A) in the polymer can be from about 0.95:1 to about 1.4:1, and the ratio of the mole fraction of the structural unit of Formula (1A) to the sum of the mole fractions of the structural units of Formulae (3A) and (3'A) can be from about 0.01 to 1; or a mole ratio of the sum of the mole fractions of the structural unit of Formula (1A) and Formula (4A) to the sum of the mole fractions of Formulae (3A) and (3'A) in the polymer can be from about 1:1 to about 1.2:1.

22. A polymer of claim 1 wherein X is hydroxide, the nitrogen-containing heterocyclic group has the formula

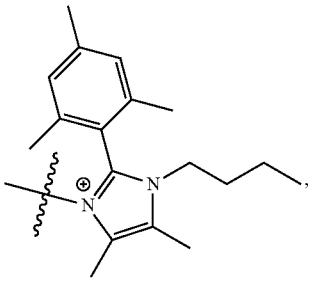 [SMILES: *[n+]1c(C)c(C)n(CCCC)c1-c1c(C)cc(C)cc1C]

and the polymer having water uptake of not more than 47% based on the dry weight of the polymer when immersed in pure water at 80° C., or having hydroxide conductivity in pure water at 20° C. of at least 31 mS/cm, wherein at least one of the following:
the polymer is stable to degradation (as evidenced by no change in the 1H NMR spectra) when immersed in 1 M potassium hydroxide at 130° C. for 1,200 hours; or the polymer is stable to degradation (as evidenced by no change in the 1H NMR spectra) when immersed in 10 M potassium hydroxide at 80° C. for 300 hours; or the polymer is stable to degradation (as evidenced by no change in the 1H NMR spectra) when kept under relative humidity of 23.3% and 50.9% at 95° C. for 300 hours; or the polymer has a tensile strength of at least 30 MPa and/or elongation at break of at least 250%.

23. A polymer of claim 1 wherein X is hydroxide, the nitrogen-containing heterocyclic group has the formula

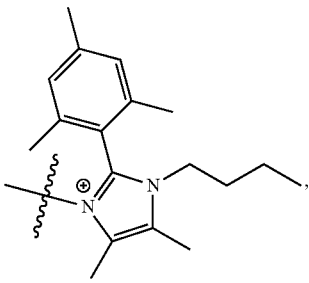 [SMILES: *[n+]1c(C)c(C)n(CCCC)c1-c1c(C)cc(C)cc1C]

and the polymer having:
a peak power density of at least 130 mW/cm2 when the polymer is used as an hydroxide exchange membrane of an hydroxide exchange membrane fuel cell and is loaded at 20% as an hydroxide exchange ionomer in cathodic and anodic catalyst layers of the fuel cell, the fuel cell having 0.4 mgPt cm−2 PtRu/C on anode, and test conditions being H2 flow rate of 1.0 L/min, O2 flow rate of 2.0 L/min, cell temperature of 95° C., anode and cathode humidifier temperature at 90° C., and 97° C., respectively; or a current density of at least 20 mA/cm2 when the voltage is at 1.8 volts when the polymer is used as an hydroxide exchange membrane of an hydroxide exchange membrane water electrolyzer and is loaded at 30% as an hydroxide exchange ionomer in cathodic and anodic catalyst layers of the electrolyzer, the electrolyzer having 4.0 mg cm−2 for Pt/C catalyst on cathode and 2.9 mg cm−2 for IrO2 catalyst on anode, and test conditions being water flow rate of 3.0 mL/min, electrolyzer temperature and water temperature of 80° C.

24. An anion exchange polymer comprising a reaction product of a base and the polymer of claim 2.

25. A method of making an anion exchange polymer membrane comprising the polymer of claim 24, the method comprising:
   reacting the halogenated trifluoroketone monomer, the optional trifluoromethyl ketone monomer, and the aromatic monomer or the crown ether monomer in the presence of an organic solvent and a polymerization catalyst to form a halogen-functionalized polymer;
   reacting the halogen-functionalized polymer with the quaternary phosphonium compound or the nitrogen-containing heterocycle or a salt thereof in the presence of an organic solvent to form a cation-functionalized polymer;
   dissolving the cation-functionalized polymer in a solvent to form a polymer solution;
   casting the polymer solution to form a polymer membrane; and
   exchanging anions of the polymer membrane with hydroxide, bicarbonate, or carbonate ions or a combination thereof to form the anion exchange polymer membrane.

26. An anion exchange membrane, optionally configured and sized to be suitable for use in a fuel cell, electrolyzer, electrodialyzer, solar hydrogen generator, flow battery, desalinator, sensor, demineralization of water, ultra-pure water production, waste water treatment, ion exchanger, or $CO_2$ separator, and comprising the polymer of claim 4.

27. An anion exchange membrane fuel cell, electrolyzer, electrodialyzer, solar hydrogen generator, flow battery, desalinator, sensor, demineralizer, water purifier, waste water treatment system, ion exchanger, or $CO_2$ separator comprising the polymer of claim 4.

28. A reinforced electrolyte membrane, optionally configured and sized to be suitable for use in a fuel cell, electrolyzer, electrodialyzer, solar hydrogen generator, flow battery, desalinator, sensor, demineralizer, water purifier, waste water treatment system, ion exchanger, or $CO_2$ separator, the membrane comprising a porous substrate impregnated with the polymer of claim 4.

29. The polymer of claim 2, wherein $R_1$ is the nitrogen-containing heterocyclic group or salt thereof.

30. The polymer of claim 29, wherein the nitrogen-containing heterocyclic group comprises a fully substituted pyrrole, pyrroline, pyrazole, pyrazoline, imidazole, imidazoline, triazole, pyridine, triazine, pyrazine, pyridazine, pyrimidine, azepine, or quinoline, wherein each substituent is independently alkyl or aryl.

31. The polymer of claim 3, wherein $R_{111}$ is the nitrogen-containing heterocycle or a salt thereof.

32. The polymer of claim 31, wherein the nitrogen-containing heterocycle comprises a fully substituted pyrrole, pyrroline, pyrazole, pyrazoline, imidazole, imidazoline, triazole, pyridine, triazine, pyrazine, pyridazine, pyrimidine, azepine, or quinoline, wherein each substituent is independently alkyl or aryl.

33. The polymer of claim 2, wherein $R_1$ is the quaternary phosphonium group.

34. The polymer of claim 3, wherein the second polymerization mixture comprises the quaternary phosphonium compound.

35. The polymer of claim 2, wherein:
   the quaternary ammonium or phosphonium group of the formula (5A) has $R_{180}$ and $R_{240}$ each independently being $C_1$-$C_{22}$ alkylene; $R_{190}$, $R_{200}$, $R_{210}$, $R_{220}$, and $R_{230}$ are each independently $C_1$-$C_6$ alkyl; m is 0, 1, 2, 3, 4, 5, or 6; and Z is N or P; or
   the quaternary ammonium or phosphonium group of the formula (5A) has $R_{180}$ and $R_{240}$ each independently being $C_1$-$C_6$ alkylene; $R_{190}$, $R_{200}$, $R_{210}$, $R_{220}$, and $R_{230}$ are each independently $C_1$-$C_6$ alkyl; m is 0, 1, 2, or 3; and Z is N or P; or
   the quaternary ammonium or phosphonium group of the formula (5A) has $R_{180}$ and $R_{240}$ each independently being $C_8$-$C_{22}$ alkylene; $R_{190}$, $R_{200}$, $R_{210}$, $R_{220}$, and $R_{230}$ are each independently $C_1$-$C_6$ alkyl; m is 0, 1, 2, or 3; and Z is N or P; or
   the quaternary ammonium or phosphonium group of the formula (5A) has $R_{180}$ and $R_{240}$ each $C_2$-$C_6$ alkylene; $R_{190}$, $R_{200}$, $R_{210}$, $R_{220}$, and $R_{230}$ are each independently methyl; m is 1; and Z is N or P; or
   the quaternary ammonium or phosphonium group of the formula (5A) has $R_{180}$ and $R_{240}$ each n-hexylene; $R_{190}$, $R_{200}$, $R_{210}$, $R_{220}$, and $R_{230}$ are each independently methyl; m is 1; and Z is N or P.

36. The polymer of claim 3, wherein:
   the quaternary ammonium or phosphonium compound of the formula (5) has $R_{18}$ and $R_{24}$ each independently being $C_1$-$C_{22}$ alkylene; $R_{19}$, $R_{20}$, $R_{21}$, $R_{22}$, and $R_{23}$ are each independently $C_1$-$C_6$ alkyl; m is 0, 1, 2, 3, 4, 5, or 6; and Z is N or P; or
   the quaternary ammonium or phosphonium compound of the formula (5) has $R_{18}$ and $R_{24}$ each independently being $C_1$-$C_6$ alkylene; $R_{19}$, $R_{20}$, $R_{21}$, $R_{22}$, and $R_{23}$ are each independently $C_1$-$C_6$ alkyl; m is 0, 1, 2, or 3; and Z is N or P; or
   the quaternary ammonium or phosphonium compound of the formula (5) has $R_{18}$ and $R_{24}$ each independently being $C_8$-$C_{22}$ alkylene; $R_{19}$, $R_{20}$, $R_{21}$, $R_{22}$, and $R_{23}$ are each independently $C_1$-$C_6$ alkyl; m is 0, 1, 2, or 3; and Z is N or P; or
   the quaternary ammonium or phosphonium compound of the formula (5) has $R_{18}$ and $R_{24}$ each $C_2$-$C_6$ alkylene; $R_{19}$, $R_{20}$, $R_{21}$, $R_{22}$, and $R_{23}$ are each independently methyl; m is 1; and Z is N or P; or
   the quaternary ammonium or phosphonium compound of the formula (5) has $R_{18}$ and $R_{24}$ each n-hexylene ; $R_{19}$, $R_{20}$, $R_{21}$, $R_{22}$, and $R_{23}$ are each independently methyl; m is 1; and Z is N or P.

37. The polymer of claim 2, wherein:
   in the aromatic monomer of formula (3), at least one of $R_2$, $R_3$, $R_4$, $R_5$, $R_6$, $R_7$, $R_8$, $R_9$, and $R_{10}$ is halide or aryl, and the aryl is optionally substituted with halide; or
   in the aromatic monomer of formula (3), $R_3$ and $R_6$ are linked to form a five membered ring optionally substituted with halide or alkyl; or
   in the crown ether monomer of formula (3'), $R_2$, $R_4$, $R_5$, $R_7$, $R_8$, $R_9$, and $R_{10}$ are hydrogen.

38. The polymer of claim 3, wherein:
   in the aromatic monomer of formula (3), at least one of $R_2$, $R_3$, $R_4$, $R_5$, $R_6$, $R_7$, $R_8$, $R_9$, and $R_{10}$ is halide or aryl, and the aryl is optionally substituted with halide; or
   in the aromatic monomer of formula (3), $R_3$ and $R_6$ are linked to form a five membered ring optionally substituted with halide or alkyl; or
   in the crown ether monomer of formula (3'), $R_2$, $R_4$, $R_5$, $R_7$, $R_8$, $R_9$, and $R_{10}$ are hydrogen.

39. The polymer of claim 1, wherein the polymer comprises the structural unit of formula (4A).

40. The polymer of claim 3, wherein the first reaction product of the first polymerization mixture further comprises the trifluoromethyl ketone monomer of formula (4).

41. A method of making an anion exchange polymer membrane comprising the polymer of claim 24, the method comprising:
reacting the cation-functionalized trifluoroketone monomer, the optional trifluoromethyl ketone monomer, and the aromatic monomer or the crown ether monomer in the presence of an organic solvent and a polymerization catalyst to form a cation-functionalized intermediate polymer;
dissolving the cation-functionalized intermediate polymer in a solvent to form a polymer solution;
casting the polymer solution to form a polymer membrane; and
exchanging anions of the polymer membrane with hydroxide, bicarbonate, or carbonate ions or a combination thereof to form the anion exchange polymer membrane.

42. The polymer of claim 2, wherein:
in the trifluoromethyl ketone monomer of formula (4), $R_{12}$ is alkyl, alkenyl, or alkynyl, and the alkyl, alkenyl, or alkynyl is optionally substituted with fluoride; or
in the trifluoromethyl ketone monomer of formula (4), $R_{12}$ is the substituent of formula (4C) and at least one of $R_{13}$, $R_{14}$, $R_{15}$, $R_{16}$ and $R_{17}$ is halide or aryl, and the aryl is optionally substituted with fluoride; or
$R_2$, $R_3$, $R_4$, $R_5$, $R_6$, $R_7$, $R_8$, $R_9$, $R_{10}$, $R_{13}$, $R_{14}$, $R_{15}$, $R_{16}$, and $R_{17}$ are each independently hydrogen, or alkyl optionally substituted with fluoride, and $R_{12}$ is alkyl optionally substituted with fluoride or the substituent of formula (4C); or
$R_2$, $R_3$, $R_4$, $R_5$, $R_6$, $R_7$, $R_8$, $R_9$, $R_{10}$, $R_{13}$, $R_{14}$, $R_{15}$, $R_{16}$, and $R_{17}$ are each independently hydrogen, methyl, ethyl, propyl, butyl, pentyl, or hexyl, or methyl, ethyl, propyl, butyl, pentyl, or hexyl optionally substituted with fluoride, and $R_{12}$ is methyl, ethyl, propyl, butyl, pentyl, or hexyl optionally substituted with fluoride or the substituent of formula (4C).

43. The polymer of claim 3, wherein:
in the trifluoromethyl ketone monomer of formula (4), $R_{12}$ is alkyl, alkenyl, or alkynyl, and the alkyl, alkenyl, or alkynyl is optionally substituted with fluoride; or
in the trifluoromethyl ketone monomer of formula (4), $R_{12}$ is the substituent of formula (4C) and at least one of $R_{13}$, $R_{14}$, $R_{15}$, $R_{16}$ and $R_{17}$ is halide or aryl, and the aryl is optionally substituted with fluoride; or
$R_2$, $R_3$, $R_4$, $R_5$, $R_6$, $R_7$, $R_8$, $R_9$, $R_{10}$, $R_{13}$, $R_{14}$, $R_{15}$, $R_{16}$, and $R_{17}$ are each independently hydrogen, or alkyl optionally substituted with fluoride, and $R_{12}$ is alkyl optionally substituted with fluoride or the substituent of formula (4C); or
$R_2$, $R_3$, $R_4$, $R_5$, $R_6$, $R_7$, $R_8$, $R_9$, $R_{10}$, $R_{13}$, $R_{14}$, $R_{15}$, $R_{16}$, and $R_{17}$ are each independently hydrogen, methyl, ethyl, propyl, butyl, pentyl, or hexyl, or methyl, ethyl, propyl, butyl, pentyl, or hexyl optionally substituted with fluoride, and $R_{12}$ is methyl, ethyl, propyl, butyl, pentyl, or hexyl optionally substituted with fluoride or the substituent of formula (4C).

44. An anion exchange membrane, optionally configured and sized to be suitable for use in a fuel cell, electrolyzer, electrodialyzer, solar hydrogen generator, flow battery, desalinator, sensor, demineralization of water, ultra-pure water production, waste water treatment, ion exchanger, or $CO_2$ separator, and comprising the polymer of claim 24.

45. An anion exchange membrane fuel cell, electrolyzer, electrodialyzer, solar hydrogen generator, flow battery, desalinator, sensor, demineralizer, water purifier, waste water treatment system, ion exchanger, or $CO_2$ separator comprising the polymer of claim 24.

46. A reinforced electrolyte membrane, optionally configured and sized to be suitable for use in a fuel cell, electrolyzer, electrodialyzer, solar hydrogen generator, flow battery, desalinator, sensor, demineralizer, water purifier, waste water treatment system, ion exchanger, or $CO_2$ separator, the membrane comprising a porous substrate impregnated with the polymer of claim 24.

47. An anion exchange polymer comprising a reaction product of a base and the polymer of claim 3.

48. An anion exchange membrane, optionally configured and sized to be suitable for use in a fuel cell, electrolyzer, electrodialyzer, solar hydrogen generator, flow battery, desalinator, sensor, demineralization of water, ultra-pure water production, waste water treatment, ion exchanger, or $CO_2$ separator, and comprising the polymer of claim 47.

49. An anion exchange membrane fuel cell, electrolyzer, electrodialyzer, solar hydrogen generator, flow battery, desalinator, sensor, demineralizer, water purifier, waste water treatment system, ion exchanger, or $CO_2$ separator comprising the polymer of claim 47.

50. A reinforced electrolyte membrane, optionally configured and sized to be suitable for use in a fuel cell, electrolyzer, electrodialyzer, solar hydrogen generator, flow battery, desalinator, sensor, demineralizer, water purifier, waste water treatment system, ion exchanger, or $CO_2$ separator, the membrane comprising a porous substrate impregnated with the polymer of claim 47.

51. The polymer of claim 2, wherein $R_1$ is the quaternary ammonium group.

52. The polymer of claim 3, wherein the second polymerization mixture comprises the quaternary ammonium compound.

* * * * *